US011465233B2

(12) United States Patent
Kakizaki et al.

(10) Patent No.: US 11,465,233 B2
(45) Date of Patent: Oct. 11, 2022

(54) LASER PROCESSING SYSTEM AND LASER PROCESSING METHOD

(71) Applicant: Gigaphoton Inc., Tochigi (JP)

(72) Inventors: Kouji Kakizaki, Oyama (JP); Osamu Wakabayashi, Oyama (JP)

(73) Assignee: Gigaphoton Inc., Tochigi (JP)

(*) Notice: Subject to any disclaimer, the term of this patent is extended or adjusted under 35 U.S.C. 154(b) by 856 days.

(21) Appl. No.: 16/378,102

(22) Filed: Apr. 8, 2019

(65) Prior Publication Data

US 2019/0283179 A1 Sep. 19, 2019

Related U.S. Application Data

(63) Continuation of application No. PCT/JP2016/085410, filed on Nov. 29, 2016.

(51) Int. Cl.
*B23K 26/06* (2014.01)
*B23K 26/0622* (2014.01)
(Continued)

(52) U.S. Cl.
CPC ........ *B23K 26/0626* (2013.01); *B23K 26/032* (2013.01); *B23K 26/064* (2015.10);
(Continued)

(58) Field of Classification Search
CPC ............ B23K 2101/40; B23K 2103/56; B23K 26/40; B23K 26/362; B23K 26/16;
(Continued)

(56) References Cited

U.S. PATENT DOCUMENTS

| 6,553,042 B2 * | 4/2003 | Shio | H01S 3/13 |
| | | | 372/55 |
| 2001/0053162 A1* | 12/2001 | Shio | H01S 3/13 |
| | | | 372/9 |

(Continued)

FOREIGN PATENT DOCUMENTS

| JP | H03-157917 A | 7/1991 |
| JP | H07-263779 A | 10/1995 |

(Continued)

OTHER PUBLICATIONS

An Office Action issued by the State Intellectual Property Office of the People's Republic of China dated May 13, 2020, which corresponds to Chinese Patent Application No. 201680089816.3 and is related to U.S. Appl. No. 16/378,102 with English language translation.

(Continued)

*Primary Examiner* — Jimmy Chou
(74) *Attorney, Agent, or Firm* — Studebaker & Brackett PC

(57) ABSTRACT

A laser processing system includes: a wavelength-variable laser device configured to output each of a laser beam at an absorption line as a wavelength at which light is absorbed by oxygen and a laser beam at a non-absorption line as a wavelength at which the amount of light absorption by oxygen is smaller than at the absorption line; an optical system configured to irradiate a workpiece with the laser beam; and a laser control unit configured to control the wavelength-variable laser device, set the wavelength of the laser beam output from the wavelength-variable laser device to be the non-absorption line when laser processing is performed on the surface of the workpiece in gas containing oxygen, and set the wavelength of the laser beam output from the wavelength-variable laser device to be the absorp- (Continued)

tion line when ozone cleaning is performed on the surface of the workpiece in gas containing oxygen.

10 Claims, 34 Drawing Sheets

(51) Int. Cl.
| | |
|---|---|
| *B23K 26/064* | (2014.01) |
| *B23K 26/03* | (2006.01) |
| *B23K 26/08* | (2014.01) |
| *B23K 26/12* | (2014.01) |
| *B23K 26/16* | (2006.01) |
| *B23K 26/362* | (2014.01) |
| *B23K 26/40* | (2014.01) |
| *H01S 3/13* | (2006.01) |
| *H01S 3/225* | (2006.01) |
| *H01S 3/23* | (2006.01) |
| *B23K 26/14* | (2014.01) |
| *B23K 103/00* | (2006.01) |
| *B23K 101/40* | (2006.01) |

(52) U.S. Cl.
CPC .......... *B23K 26/0622* (2015.10); *B23K 26/08* (2013.01); *B23K 26/126* (2013.01); *B23K 26/128* (2013.01); *B23K 26/14* (2013.01); *B23K 26/16* (2013.01); *B23K 26/362* (2013.01); *B23K 26/40* (2013.01); *H01S 3/13* (2013.01); *H01S 3/225* (2013.01); *H01S 3/2251* (2013.01); *H01S 3/2308* (2013.01); *B23K 2101/40* (2018.08); *B23K 2103/56* (2018.08)

(58) Field of Classification Search
CPC .... B23K 26/14; B23K 26/128; B23K 26/126; B23K 26/08; B23K 26/032; B23K 26/064; B23K 26/0622; B23K 26/0626; H01S 3/2308; H01S 3/2251; H01S 3/225; H01S 3/13
USPC ............ 372/50.121, 55, 56, 57, 58; 264/400
See application file for complete search history.

(56) References Cited

U.S. PATENT DOCUMENTS

| | | | |
|---|---|---|---|
| 2002/0041617 A1 | 4/2002 | Itakura et al. | |
| 2003/0043876 A1* | 3/2003 | Lublin | ................ G03F 7/70025 |
| | | | 372/55 |
| 2003/0091087 A1* | 5/2003 | Ershov | .................. H01S 3/0385 |
| | | | 372/55 |
| 2003/0219056 A1* | 11/2003 | Yager | .................. G03F 7/70041 |
| | | | 372/57 |
| 2003/0219057 A1* | 11/2003 | Govorkov | ............... H01S 3/225 |
| | | | 372/57 |
| 2006/0001853 A1 | 1/2006 | Hase et al. | |
| 2017/0093119 A1 | 3/2017 | Suzuki et al. | |

FOREIGN PATENT DOCUMENTS

| | | |
|---|---|---|
| JP | H10-284792 A | 10/1998 |
| JP | H11-224839 A | 8/1999 |
| JP | 2000-031574 A | 1/2000 |
| JP | 2001-300450 A | 10/2001 |
| JP | 2002-118308 A | 4/2002 |
| JP | 3799060 B2 | 7/2006 |
| JP | 2010-066597 A | 3/2010 |
| WO | 97/03846 A1 | 2/1997 |
| WO | 00/41225 A1 | 7/2000 |
| WO | 2016/006099 A1 | 1/2016 |

OTHER PUBLICATIONS

The extended European search report issued by the European Patent Office dated Jan. 8, 2020, which corresponds to European Patent Application No. 16922686.7-1016 and is related to U.S. Appl. No. 16/378,102.
International Search Report issued in PCT/JP2016/085410; dated Jan. 24, 2017.
International Preliminary Report on Patentability and Written Opinion issued in PCT/JP2016/085410; dated Jun. 4, 2019.
An Office Action; "Notice of Reasons for Refusal," mailed by the Japanese Patent Office dated Oct. 26, 2020, which corresponds to Japanese Patent Application No. 2018-553542 and is related to U.S. Appl. No. 16/378,102; with English language translation.

* cited by examiner

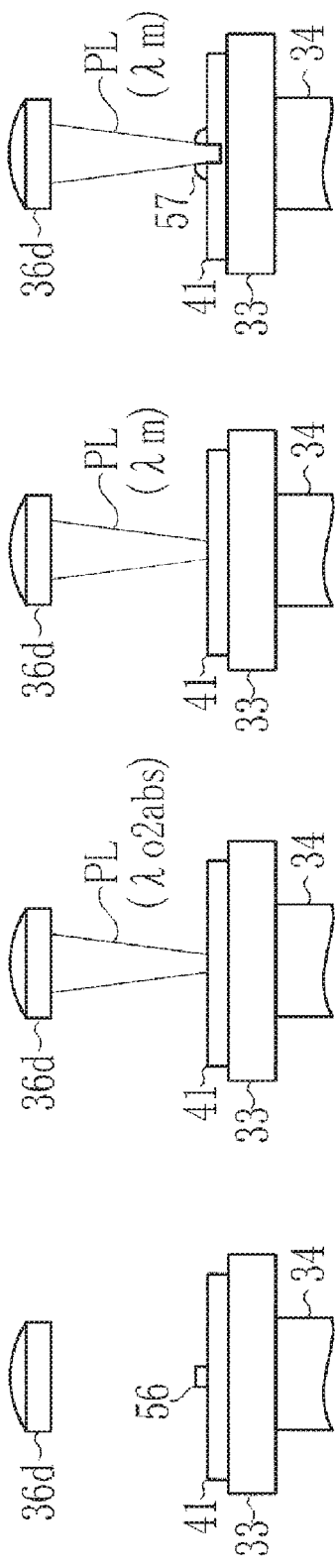
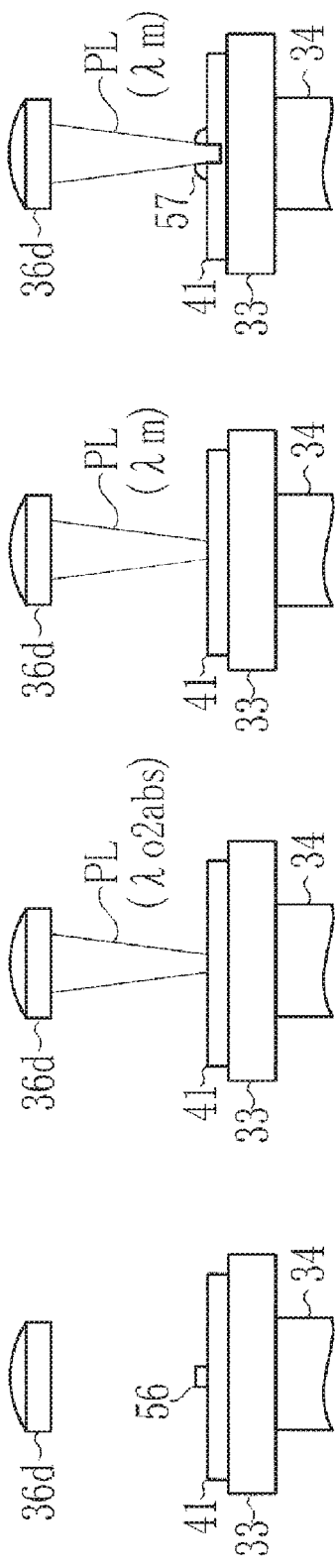
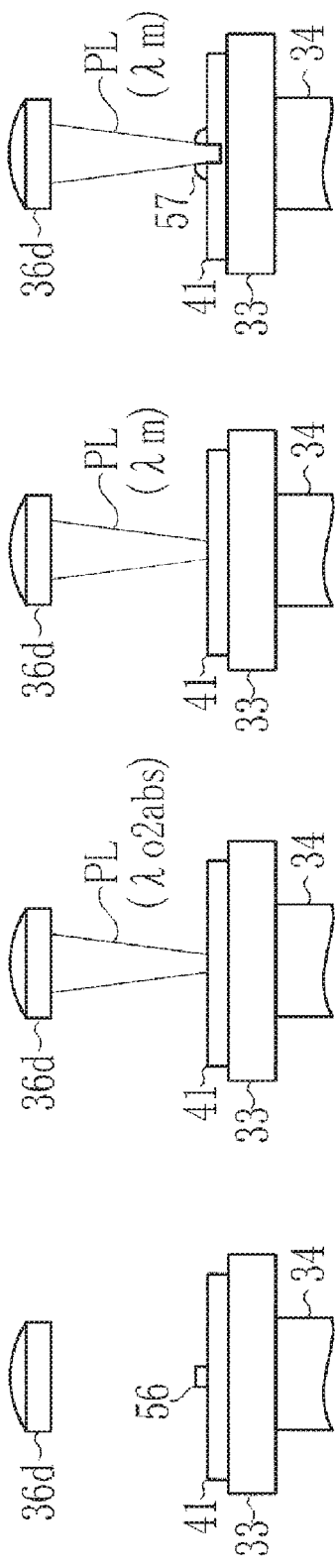
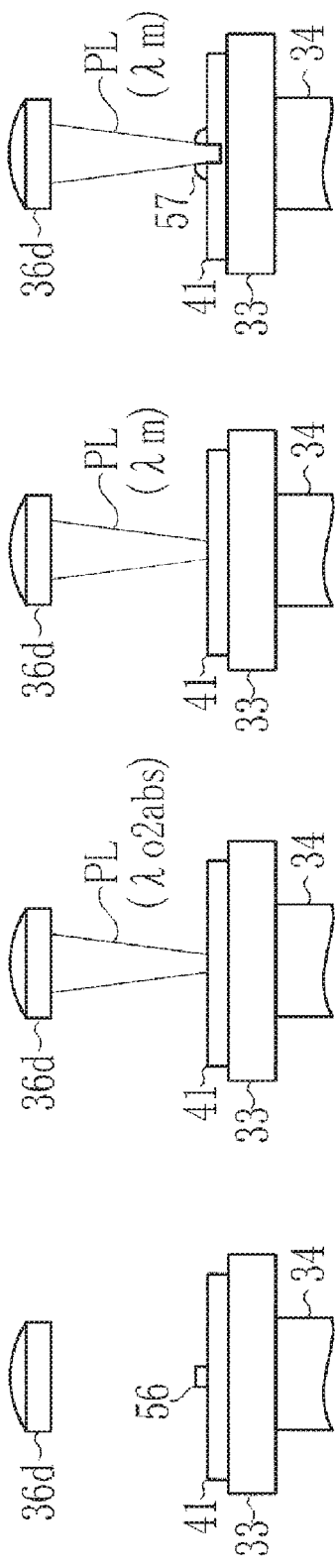
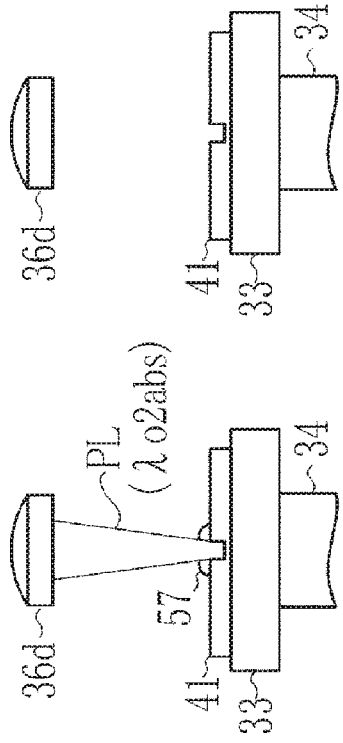
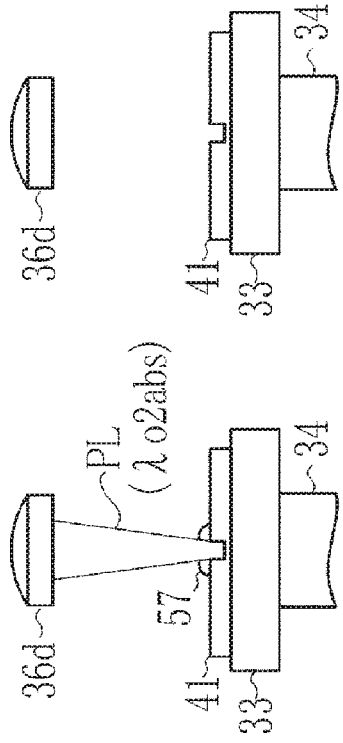

Fig. 24

| N | λN | DebN |
|---|---|---|
| 1 | λ1 | Deb1 |
| 2 | λ2 | Deb2 |
| 3 | λ3 | Deb3 |
| 4 | λ4 | Deb4 |
| 5 | λ5 | Deb5 |
| 6 | λ6 | Deb6 |
| 7 | λ7 | Deb7 |
| 8 | λ8 | Deb8 |
| 9 | λ9 | Deb9 |

67

LASER PROCESSING SYSTEM AND LASER PROCESSING METHOD

CROSS-REFERENCE TO RELATED APPLICATIONS

The present application is a continuation application of International Application No. PCT/JP2016/085410 filed on Nov. 29, 2016. The content of the application is incorporated herein by reference in its entirety.

BACKGROUND

1. Technical Field

The present disclosure relates to a laser processing system and a laser processing method.

2. Related Art

Improvement of the resolution of a semiconductor exposure device has been requested along with miniaturization and high integration of a semiconductor integrated circuit. Hereinafter, the semiconductor exposure device is simply referred to as an "exposure device". Thus, the wavelength of light output from an exposure light source has been shortened. A gas laser device is used as the exposure light source in place of a conventional mercury lamp. Currently used exposure gas laser devices are a KrF excimer laser device configured to output ultraviolet having a wavelength of 248 nm and an ArF excimer laser device configured to output ultraviolet having a wavelength of 193 nm.

The current exposure technology in practical use is, for example, liquid immersion exposure in which the gap between a projection lens on the exposure device side and a wafer is filled with liquid to change the refractive index of the gap so that the apparent wavelength of the exposure light source is shortened. When the liquid immersion exposure is performed by using the ArF excimer laser device as the exposure light source, the wafer is irradiated with ultraviolet light having a wavelength of 134 nm in the water. This technology is called ArF liquid immersion exposure. The ArF liquid immersion exposure is also called ArF liquid immersion lithography.

The KrF and ArF excimer laser devices each have a wide spectrum line width of 350 to 400 pm approximately due to spontaneous oscillation, and thus suffers chromatic aberration of a laser beam (ultraviolet light) projected on the wafer in a reduced size through the projection lens on the exposure device side, which leads to decrease of the resolution. To avoid this, the spectrum line width of a laser beam output from the gas laser device needs to be narrowed until the chromatic aberration becomes negligible. The spectrum line width is also called spectrum width. Thus, a line narrowing module including a line narrowing element is provided in a laser resonator of the gas laser device to achieve the spectrum width narrowing. The line narrowing element may be, for example, an etalon or a grating. A laser device having a narrowed spectrum width in this manner is referred to as a line narrowing laser device.

An excimer laser beam has a pulse width of several tens ns approximately and a short wavelength of 248.4 nm or 193.4 nm. With these characteristics, the excimer laser beam is sometimes used in direct processing of a polymer material, a glass material, and the like in addition to exposure usage. Bonding of a polymer material can be disconnected by the excimer laser beam having photon energy higher than the bond energy. Accordingly, non-heating processing is possible, and it is known that a clean processing shape is obtained. For example, glass and ceramics have high absorbance for the excimer laser beam, and thus it is known that materials difficult to process with visible and infrared laser beams can be processed with the excimer laser beam.

LIST OF DOCUMENTS

Patent Documents

Patent Document 1: Japanese Unexamined Patent Application Publication No. 10-284792
Patent Document 2: Japanese Unexamined Patent Application Publication No. 11-224839
Patent Document 3: Japanese Patent No. 3799060
Patent Document 4: Japanese Unexamined Patent Application Publication No. 3-157917
Patent Document 5: Japanese Unexamined Patent Application Publication No. 2000-031574

SUMMARY

A laser processing system according to an aspect of the present disclosure performs laser processing by irradiating a workpiece with a laser beam, and includes a wavelength-variable laser device, an optical system, and a laser control unit. The wavelength-variable laser device outputs each of a laser beam at an absorption line as a wavelength at which light is absorbed by oxygen and a laser beam at a non-absorption line as a wavelength at which the amount of light absorption by oxygen is smaller than at the absorption line. The optical system irradiates the workpiece with the laser beam. The laser control unit controls the wavelength-variable laser device, sets the wavelength of the laser beam output from the wavelength-variable laser device to be the non-absorption line when laser processing is performed on a surface of the workpiece in gas containing oxygen, and sets the wavelength of the laser beam output from the wavelength-variable laser device to be the absorption line when ozone cleaning is performed on the surface of the workpiece in gas containing oxygen.

A laser processing method according to another aspect of the present disclosure performs laser processing by irradiating a workpiece with a laser beam, and includes a non-absorption line setting step, a laser processing step, a first absorption line setting step, and a debris cleaning step. The non-absorption line setting step sets the wavelength of the laser beam output from the wavelength-variable laser device to be a non-absorption line as a wavelength at which the amount of light absorption is smaller than at an absorption line as a wavelength at which light is absorbed by oxygen. The laser processing step performs the laser processing by irradiating the workpiece with the laser beam at the non-absorption line in gas containing oxygen. The first absorption line setting step sets the wavelength of the laser beam output from the wavelength-variable laser device to be the absorption line. The debris cleaning step performs ozone cleaning of debris on the surface of the workpiece by irradiating the workpiece with the laser beam at the absorption line in gas containing oxygen.

A laser processing system according to another aspect of the present disclosure performs laser processing by irradiating a workpiece with a laser beam, and includes a wavelength-variable laser device, an optical system, a laser control unit, and an optimum wavelength selection unit. The wavelength-variable laser device is capable of changing the wavelength of the laser beam between an absorption line as a wavelength at which light is absorbed by oxygen and a non-absorption line as a wavelength at which the amount of light absorption by oxygen is smaller than at the absorption line and outputting the laser beam. The optical system irradiates the workpiece with the laser beam. The laser control unit controls the wavelength-variable laser device so that the surface of the workpiece is irradiated with the laser beam at a plurality of wavelengths, while changing the wavelength of the laser beam between the absorption line and the non-absorption line in preprocessing before main processing of the laser processing on the workpiece. The optimum wavelength selection unit selects an optimum wavelength of the laser beam to be used in the main processing based on a processing state in the preprocessing performed at the wavelengths.

A laser processing method according to another aspect of the present disclosure performs laser processing by irradiating a workpiece with a laser beam, and includes a preprocessing step and a wavelength selection step. The preprocessing step performs preprocessing before main processing of the laser processing on the workpiece by irradiating the surface of the workpiece with the laser beam at a plurality of wavelengths while changing the wavelength of the laser beam output from the wavelength-variable laser device between an absorption line as a wavelength at which light is absorbed by oxygen and a non-absorption line as a wavelength at which the amount of light absorption by oxygen is smaller than at the absorption line by using a wavelength-variable laser device capable of changing the wavelength of the laser beam between the absorption line and the non-absorption line and outputting the laser beam. The wavelength selection step selects the wavelength of the laser beam to be used in the main processing based on a processing state in the preprocessing performed at the wavelengths.

BRIEF DESCRIPTION OF THE DRAWINGS

Embodiments of the present disclosure will be described below as examples with reference to the accompanying drawings.

FIGS. 11A to 11F illustrate transition of the state of a workpiece when the laser processing and the ozone cleaning are performed in the first embodiment. FIG. 11A illustrates the state before the surface cleaning. FIG. 11B illustrates the state in the surface cleaning. FIG. 11C illustrates the state right after start of the laser processing. FIG. 11D illustrates the state after the laser processing. FIG. 11E illustrates the state in the debris cleaning. FIG. 11F illustrates the state after the debris cleaning.

FIG. 17A illustrates the state before the surface cleaning. FIG. 17B illustrates the state in the surface cleaning. FIG. 17C illustrates the state right after start of the laser processing. FIG. 17D illustrates the state after the laser processing. FIG. 17E illustrates the state in the debris cleaning. FIG. 17F illustrates the state after the debris cleaning.

FIG. 24 is an explanatory diagram of an evaluation value table.

DESCRIPTION OF EMBODIMENTS

<Contents>
1. Overview
2. Laser processing system according to comparative example
 2.1 Configuration of laser processing system
 2.2 Operation of laser processing system
 2.3 Problem
3. Laser processing system of first embodiment
 3.1 Configuration
 3.2 Operation
 3.3 Effect
 3.4 Modification
4. Laser processing system of second embodiment
 4.1 Configuration
 4.2 Operation
 4.3 Effect
 4.4 Modification
5. Laser processing system of third embodiment
 5.1 Configuration
 5.2 Operation
 5.3 Effect
6. Modification of laser processing device
 6.1 Modification 1
 6.2 Modification 2
 6.3 Modification 3
7. Modifications of laser device
 7.1 Modification 1
 7.2 Modification 2
8. Modification of solid-state laser device in Modification 2 of 7.2

Embodiments of the present disclosure will be described below in detail with reference to the accompanying drawings. The embodiments described below are examples of the present disclosure, and do not limit the contents of the present disclosure. Not all configurations and operations described in each embodiment are necessarily essential as configurations and operations of the present disclosure. Components identical to each other are denoted by an identical reference sign, and duplicate description thereof will be omitted.

1. Overview

The present disclosure relates to a laser processing system configured to perform laser processing by irradiating a workpiece with a laser beam.

Figure 1:
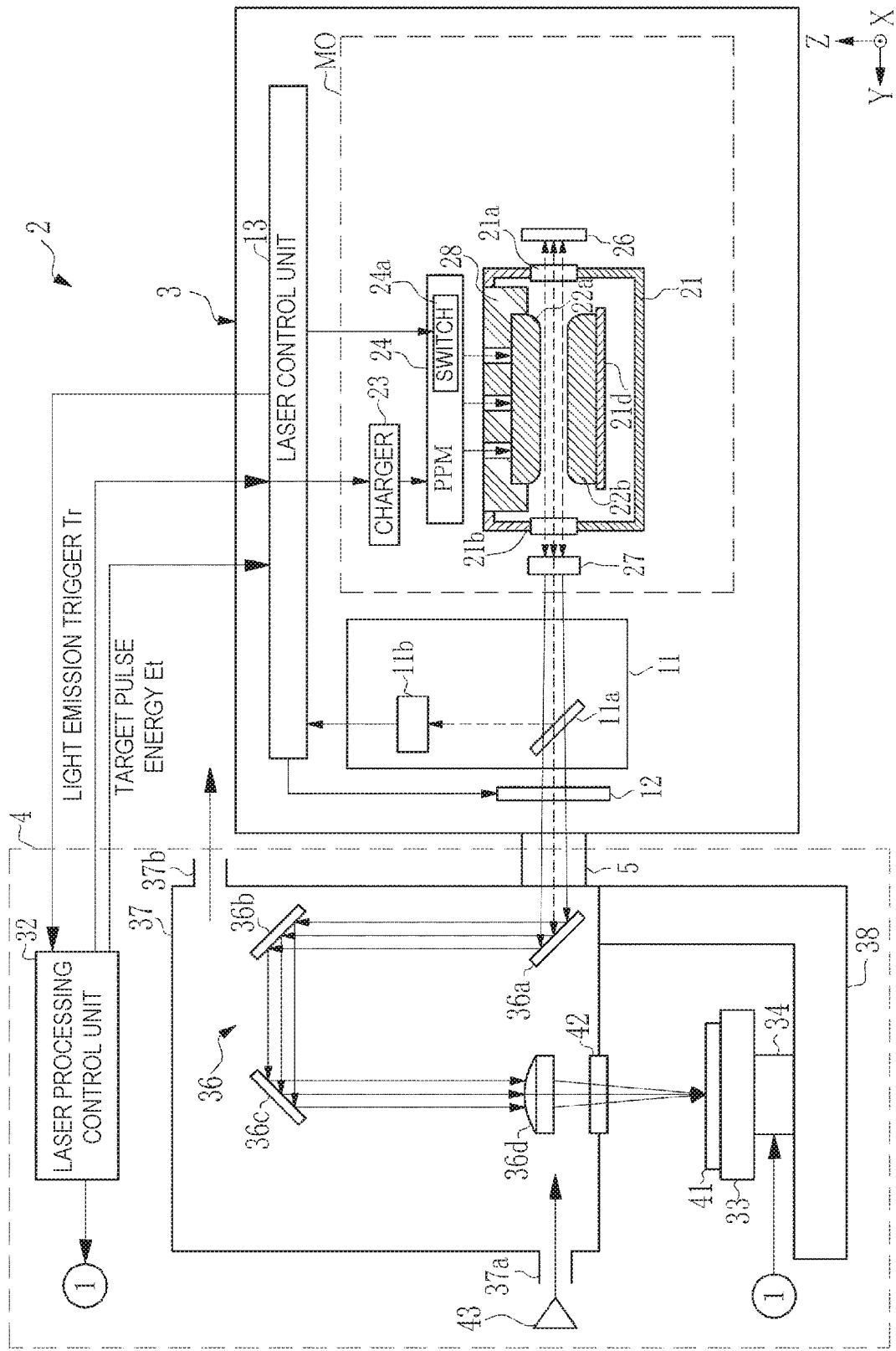
FIG. 1 schematically illustrates the configuration of a laser processing system according to a comparative example.

2. Laser Processing System According to Comparative Example 2.1 Configuration of Laser Processing System FIG. 1 schematically illustrates the configuration of a laser processing system according to a comparative example. A laser processing system 2 includes a laser device 3 and a laser processing device 4. The laser device 3 and the laser processing device 4 are connected with each other through an optical path tube 5.

The laser device 3 includes a master oscillator MO, a monitor module 11, a shutter 12, and a laser control unit 13. The laser device 3 is an ArF excimer laser device that uses ArF laser gas containing argon (Ar) and fluorine (F) as laser media. The laser device 3 outputs a pulse laser beam having a central wavelength of 193.40 nm approximately.

The master oscillator MO includes a laser chamber 21, a pair of electrodes 22a and 22b, a charger 23, and a pulse power module (PPM) 24. FIG. 1 illustrates an internal configuration of the laser chamber 21 in a direction substantially orthogonal to the traveling direction of a laser beam.

The laser chamber 21 encapsulates the ArF laser gas. The pair of electrodes 22a and 22b is disposed in the laser chamber 21 as electrodes for exciting the laser media by electric discharge.

An opening is formed in the laser chamber 21 and blocked by an insulating member 28. The electrode 22a is supported by the insulating member 28, and the electrode 22b is supported by a return plate 21d. The return plate 21d is connected with the inner surface of the laser chamber 21 through a wire (not illustrated). A conductive member is embedded in the insulating member 28. The conductive member applies, to the electrode 22a, high voltage supplied from the pulse power module 24.

The charger 23 is a direct-current power supply device configured to charge a charging capacitor (not illustrated) in the pulse power module 24 at a predetermined voltage. The pulse power module 24 includes a switch 24a controlled by the laser control unit 13. When the switch 24a being off is turned on, the pulse power module 24 generates pulse high voltage from electric energy held at the charger 23, and applies the high voltage between the electrodes 22a and 22b.

When the high voltage is applied between the electrodes 22a and 22b, insulation between the electrodes 22a and 22b is broken, and electric discharge occurs. Each laser medium in the laser chamber 21 is excited by the energy of the electric discharge and transitions to a higher energy level. Thereafter, as the excited laser media transitions to a lower energy level, light is emitted in accordance with the difference between the energy levels.

Windows 21a and 21b are provided at both ends of the laser chamber 21. Light generated in the laser chamber 21 is emitted out of the laser chamber 21 through the windows 21a and 21b.

The master oscillator MO further includes a rear mirror 26 and an output coupling mirror 27. The rear mirror 26 is coated with a high reflection film, and the output coupling mirror 27 is coated with a partial reflection film. The rear mirror 26 reflects, at high reflectance, light emitted through the window 21a of the laser chamber 21, and returns the light to the laser chamber 21. The output coupling mirror 27 transmits and outputs part of light output through the window 21b of the laser chamber 21, and reflects the other part back into the laser chamber 21.

Thus, the rear mirror 26 and the output coupling mirror 27 constitute an optical resonator. The laser chamber 21 is disposed on the optical path of the optical resonator. While traveling forward and backward between the rear mirror 26 and the output coupling mirror 27, light emitted from the laser chamber 21 is amplified each time the light passes through a laser gain space between the electrode 22a and the electrode 22b. Part of the amplified light is output as a pulse laser beam through the output coupling mirror 27.

The monitor module 11 is disposed on the optical path of the pulse laser beam emitted from the master oscillator MO. The monitor module 11 includes, for example, a beam splitter 11a and an optical sensor 11b.

The beam splitter 11a transmits, toward the shutter 12 at high transmittance, the pulse laser beam emitted from the master oscillator MO, and reflects part of the pulse laser beam toward a light-receiving surface of the optical sensor 11b. The optical sensor 11b detects the pulse energy of the pulse laser beam incident on the light-receiving surface, and outputs data of the detected pulse energy to the laser control unit 13.

The laser control unit 13 communicates various signals with a laser processing control unit 32. For example, the laser control unit 13 receives, for example, data of a light emission trigger Tr and a target pulse energy Et from the laser processing control unit 32. The laser control unit 13 transmits a setting signal for a charging voltage to the charger 23, and transmits a command signal for turning on or off the switch 24a to the pulse power module 24.

The laser control unit 13 receives the pulse energy data from the monitor module 11, and controls the charging voltage of the charger 23 with reference to the received pulse energy data. The pulse energy of the pulse laser beam is controlled through the control of the charging voltage of the charger 23.

The shutter 12 is disposed on the optical path of the pulse laser beam having transmitted through the beam splitter 11a of the monitor module 11. The laser control unit 13 controls the shutter 12 to close until the difference between the pulse energy received from the monitor module 11 and the target pulse energy Et becomes within an allowable range after start of laser oscillation. When the difference between the pulse energy received from the monitor module 11 and the target pulse energy Et becomes within the allowable range, the laser control unit 13 controls the shutter 12 to open. The laser control unit 13 transmits, in synchronization with a signal for opening and closing the shutter 12, a signal indicating that it has become possible to receive the light emission trigger Tr of the pulse laser beam to the laser processing control unit 32.

The laser processing device 4 includes the laser processing control unit 32, a table 33, an XYZ stage 34, an optical system 36, a housing 37, and a frame 38. The optical system 36 is disposed in the housing 37. The housing 37 and the XYZ stage 34 are fixed to the frame 38.

The table 33 supports a workpiece 41. The workpiece 41 is a target to be irradiated with the pulse laser beam and subjected to laser processing, and is, for example, a material containing carbon atoms. The XYZ stage 34 supports the table 33. The XYZ stage 34 is movable in an λ-axis direction, a Y-axis direction, and a Z-axis direction, and the position of the workpiece 41 can be adjusted by adjusting the position of the table 33. The XYZ stage 34 adjusts the position of the workpiece 41 so that the workpiece 41 is irradiated with the pulse laser beam emitted from the optical system 36.

The optical system 36 includes, for example, high reflectance mirrors 36a to 36c and a light condensing lens 36d. The high reflectance mirrors 36a to 36c and the light condensing lens 36d are each fixed to a holder (not illustrated) and disposed at a predetermined position in the housing 37.

The high reflectance mirrors 36a to 36c each reflect the pulse laser beam in the ultraviolet region at high reflectance. The high reflectance mirror 36a reflects, toward the high reflectance mirror 36b, the pulse laser beam input from the laser device 3, and the high reflectance mirror 36b reflects the pulse laser beam toward the high reflectance mirror 36c. The high reflectance mirror 36c reflects the pulse laser beam toward the light condensing lens 36d. In the high reflectance mirrors 36a to 36c, for example, the surface of a transparent substrate made of synthetic quartz or calcium fluoride is coated with a reflection film that highly reflects the pulse laser beam.

The light condensing lens 36d is disposed to condense the incident pulse laser beam on the surface of the workpiece 41 through a window 42. The window 42 is disposed on the optical path between the light condensing lens 36d and the workpiece 41, and fixed to an opening provided to the housing 37 while being sealed by an O ring (not illustrated).

Nitrogen ($N_2$) gas, which is inert gas, always flows inside the housing 37 while the laser processing system 2 is in operation. The housing 37 is provided with an intake port 37a through which the nitrogen gas is taken into the housing 37, and a discharge port 37b through which the nitrogen gas is externally discharged from the housing 37. The intake port 37a and the discharge port 37b can be connected with an intake pipe and a discharge pipe (not illustrated). When connected with the intake pipe and the discharge pipe, the intake port 37a and the discharge port 37b are each sealed by an O ring (not illustrated) to prevent mixture of outside air into the housing 37. The intake port 37a is connected with a nitrogen gas supply source 43.

The nitrogen gas also flows inside the optical path tube 5. The optical path tube 5 is sealed by O rings at a connection part with the laser processing device 4 and at a connection part with the laser device 3.

Air fills a space between the workpiece 41 and the window 42 through which the pulse laser beam is emitted toward the workpiece 41.

2.2 Operation of Laser Processing System

Figure 2:
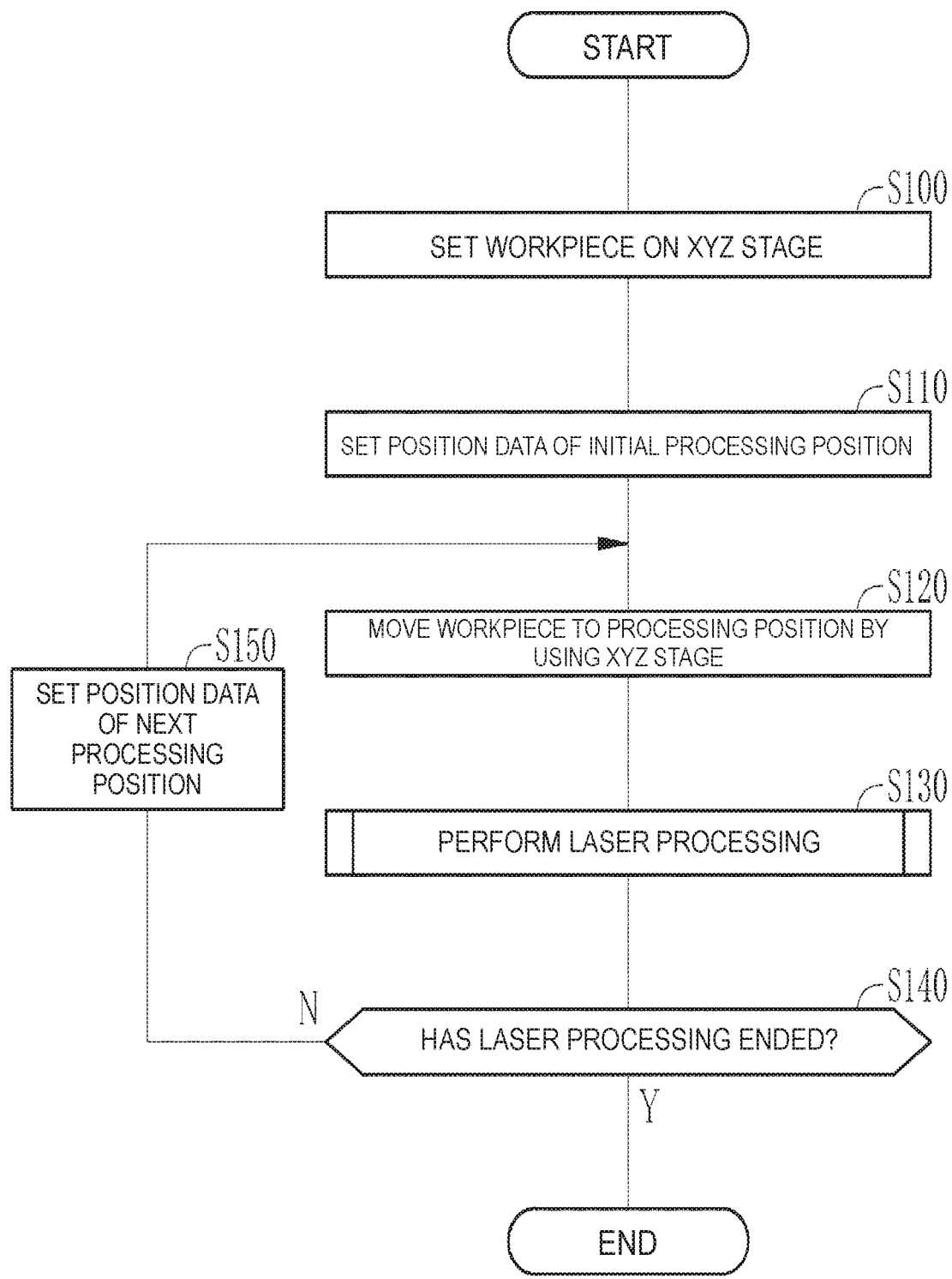
FIG. 2 is a flowchart illustrating a laser processing procedure of the comparative example.
Figure 3:
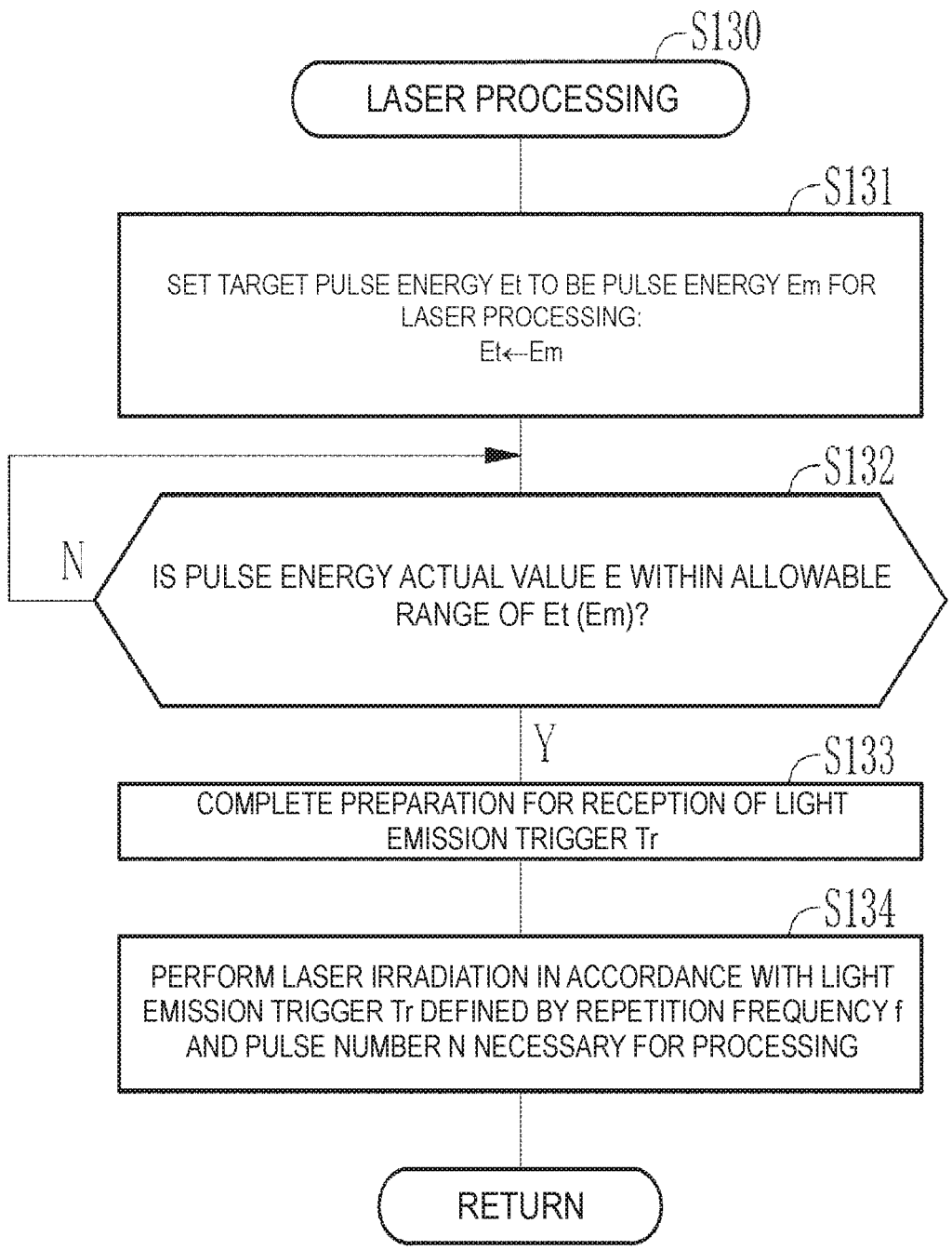
FIG. 3 is a flowchart illustrating the processing procedure of laser processing of the comparative example.

The following describes the operation of the laser processing system 2 with reference to FIGS. 2 and 3. As illustrated in FIG. 2, when laser processing is performed, the workpiece 41 is set on the table 33 of the XYZ stage 34 (S100). The laser processing control unit 32 sets position data of an initial processing position to the XYZ stage 34 (S110). The XYZ stage 34 moves the workpiece 41 to the initial laser processing position (S120). Specifically, the workpiece 41 is positioned in the XY plane and in the Z-axis direction. As for the position of the workpiece 41 in the Z-axis direction, the laser processing control unit 32 moves the workpiece 41 to such a position that the pulse laser beam emitted from the light condensing lens 36d is condensed at a desired diameter D on the surface of the workpiece 41. In the present specification, the diameter D of the pulse laser beam is defined to be the diameter of the pulse laser beam incident on the surface of the workpiece 41.

When the positioning of the workpiece 41 ends, laser processing is performed (S130). The laser processing is performed in accordance with a flowchart illustrated in FIG. 3. The laser processing control unit 32 controls the pulse energy of the pulse laser beam so that the pulse laser beam incident on the surface of the workpiece 41 has a desired fluence Fm necessary for the laser processing. Specifically, the laser processing control unit 32 transmits, as the target pulse energy Et, pulse energy Em necessary at the laser processing to the laser control unit 13 of the laser device 3 so that the desired fluence Fm is achieved. Accordingly, the laser control unit 13 sets the target pulse energy Et to be the pulse energy Em necessary at the laser processing (S131).

The fluence F is the energy density of the pulse laser beam on the surface of the workpiece 41 irradiated with the pulse laser beam, and is defined by Expression (1) below when the optical system 36 has a negligible loss.

$$F = Et/S \ [mJ/cm^2] \qquad (1)$$

In the expression, S represents the irradiation area and is given by $S = \pi(D/2)^2$ [$cm^2$] where D represents the diameter.

When Sm represents the irradiation area at the laser processing and Em represents the target pulse energy necessary at the laser processing, the fluence Fm necessary for the laser processing is defined by Expression (2) below.

$$Fm = Em/Sm \ [mJ/cm^2] \qquad (2)$$

The laser processing control unit 32 also transmits, to the laser control unit 13, the light emission trigger Tr as an external trigger that is a timing signal for causing laser oscillation at the master oscillator MO.

When having received the target pulse energy Et from the laser processing control unit 32, the laser control unit 13 closes the shutter 12 and actuates the charger 23. Then, the laser control unit 13 turns on the switch 24a of the pulse power module 24 by an internal trigger (not illustrated). Accordingly, the master oscillator MO performs laser oscillation.

The monitor module 11 samples the pulse laser beam output from the master oscillator MO to measure pulse energy E as the actual value of the pulse energy. The laser control unit 13 controls the charging voltage of the charger 23 so that a difference ΔE between the pulse energy E and the target pulse energy Et approaches to zero. Specifically, the laser control unit 13 controls the charging voltage so that ΔE becomes within an allowable range (S132).

When ΔE becomes within the allowable range (Y at S132), the laser control unit 13 transmits, to the laser processing control unit 32, a reception preparation completion signal notifying completion of preparation for reception of the light emission trigger Tr, and opens the shutter 12. Accordingly, the laser device 3 completes the preparation for reception of the light emission trigger Tr (S133).

Having received the reception preparation completion signal, the laser processing control unit 32 transmits, to the laser control unit 13, the light emission trigger Tr defined by a predetermined repetition frequency f and a predetermined pulse number N. As a result, the pulse laser beam having transmitted through the beam splitter 11a of the monitor module 11 is incident on the laser processing device 4 in synchronization with the light emission trigger Tr.

The pulse laser beam incident on the laser processing device 4 is incident on the light condensing lens 36d through the high reflectance mirrors 36a to 36c. Having transmitted through the light condensing lens 36d, the pulse laser beam is condensed and emitted on the surface of the workpiece 41 through the window 42 and air. In this manner, laser irradiation is performed in accordance with the light emission trigger Tr defined by the repetition frequency f and the pulse number N necessary for the laser processing (S134). Through the laser irradiation, the laser processing is performed on the workpiece 41.

When the laser processing at the initial processing position has ended and there is a next processing position (N at S140), the laser processing control unit 32 sets data of the next processing position to the XYZ stage 34 (S150). Then, the XYZ stage 34 moves the workpiece 41 to the next processing position (S120). At the next processing position, the laser processing is performed on the workpiece 41 (S130). When there is no next processing position, the laser processing ends (Y at S140). This procedure is repeated until the laser processing ends at all processing positions.

2.3 Problem

Figure 4:
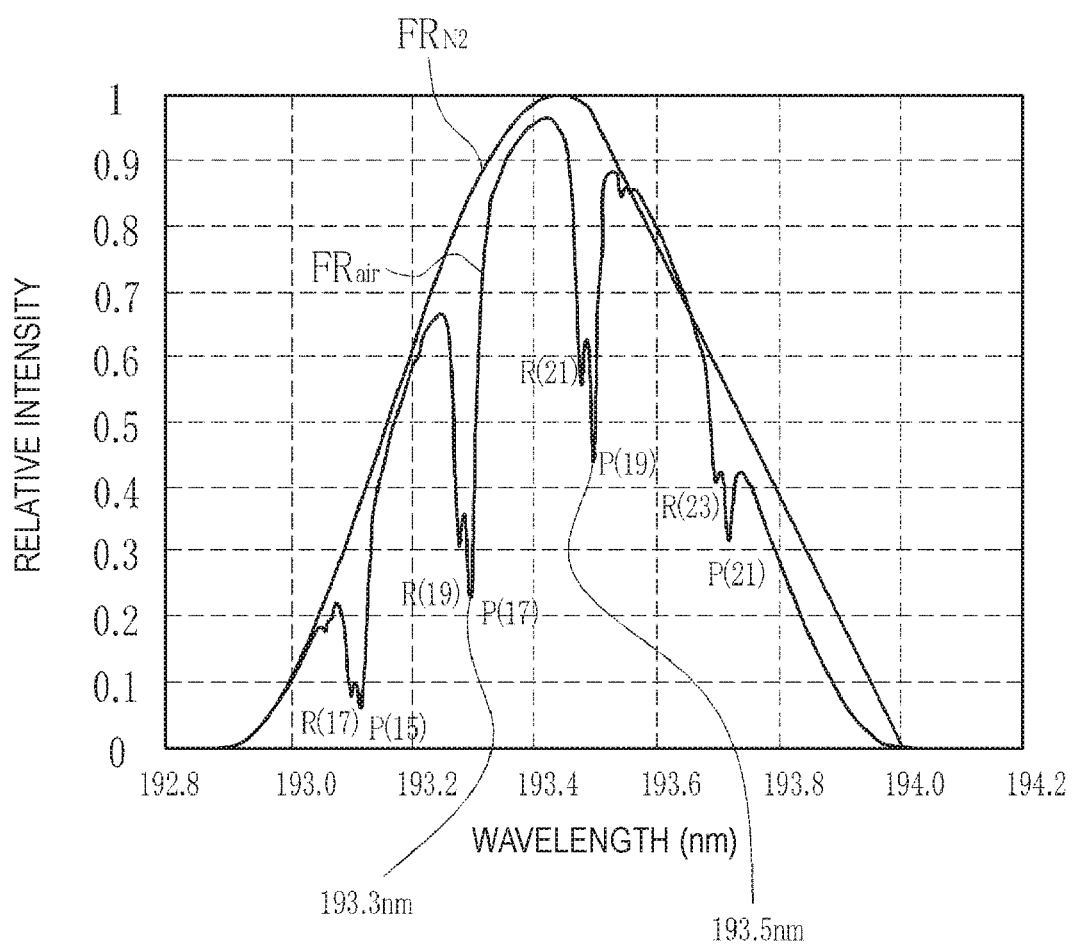
FIG. 4 is a graph illustrating the spectrum waveform of a laser beam in spontaneous oscillation and light absorption by oxygen.

FIG. 4 illustrates a spectrum waveform FR of an ArF excimer laser beam without narrowing of the spectral width in spontaneous oscillation (free running). The spectrum waveform FR has a central wavelength of 193.4 nm approximately and a spectrum line width of 450 pm approximately at full width at half maximum (FWHM). It is known that oxygen has a plurality of absorption lines of an absorption band in which a laser beam is absorbed. Thus, as illustrated in FIG. 4, energy absorption occurs at a plurality of absorption lines on a spectrum waveform FRair when spontaneous oscillation occurs in gas containing oxygen, for example, in air. Accordingly, as compared to a spectrum waveform $FR_{N2}$ in nitrogen gas ($N_2$) not containing oxygen, light intensity I drops at a plurality of absorption lines on the spectrum waveform FRair. In FIG. 4, relative intensity on the vertical axis is a value obtained by normalizing the light intensity I.

For example, as disclosed in Japanese Unexamined Patent Application Publication No. 3-157917, absorption lines at wavelengths of 175 nm to 250 nm are due to absorption transition of the Schumann-Runge band, and correspond to absorption bands expressed by branches P(11), R(13), P(13), R(15), P(15), R(17), P(17), R(19), P(19), R(21), P(21), R(23), P(23), and R(25). As illustrated in FIG. 4, on the spectrum waveform FRair of the ArF excimer laser beam, the light intensity I drops at absorption lines corresponding to these branches.

In this manner, when the ArF excimer laser beam due to spontaneous oscillation transmits through gas containing oxygen, light absorption by oxygen potentially causes the following problems. Firstly, the spectrum waveform FR lacks at some wavelengths due to light absorption by oxygen. As the gas containing oxygen absorbs the pulse laser beam, the temperature of the gas increases, and thus refractive index distribution occurs. As a result, the wavefront of the pulse laser beam is distorted as the pulse laser beam transmits through the gas containing oxygen. When the wavefront of the pulse laser beam is distorted, condensation performance through the light condensing lens 36d decreases, and the diameter D of irradiation on the workpiece 41 increases, which potentially decreases the fluence F. Consequently, the accuracy of processing on the workpiece 41 potentially degrades.

Secondly, the light intensity I of the ArF excimer laser beam decreases when light absorption by oxygen occurs. The laser processing needs pulse energy higher than that needed in laser lithography, and thus the decrease of the light intensity I is required to be reduced as much as possible. To solve this problem, the irradiation optical path of the pulse laser beam arriving at the workpiece 41 on the table 33 from the window 42 may be filled with, for example, nitrogen gas to achieve an atmosphere containing no oxygen. With this configuration, light absorption by oxygen is suppressed, thereby improving the accuracy of processing and reducing decrease of the light intensity I.

In addition to the problems with light absorption by oxygen, the laser processing has requirements as follows. Specifically, irradiation with the pulse laser beam causes ablation at a processing position, and generates debris near the processing position. The debris needs to be removed to achieve the state of a processing surface at high quality. Debris cleaning of removing the debris may be performed by ultraviolet (UV) ozone cleaning. Hereinafter, the UV ozone cleaning is simply referred to as ozone cleaning.

The principle of the ozone cleaning is as follows. Ultraviolet disassembles an oxygen molecule ($O_2$) contained in air or the like into oxygen atoms (O). Each disassembled oxygen atom (O) bonds with an oxygen molecule ($O_2$) in air, thereby generating ozone ($O_3$). When irradiated with ultraviolet, the generated ozone is disassembled to generate active oxygen in an excited state. When the debris is an organic substance, bonding of the organic substance is disassembled by ultraviolet irradiation. The active oxygen generated by the ozone disassembly becomes $CO_2$ gas through bonding with the disassembled organic substance, thereby removing the debris generated at the processing position.

Since the ArF excimer laser beam is ultraviolet, its use for the ozone cleaning has been discussed. In this case, for example, the irradiation optical path of the pulse laser beam arriving at the workpiece 41 from the window 42 needs to be filled with an atmosphere containing oxygen such as air. With this configuration, the pulse laser beam disassembles debris made of oxygen and an organic substance, thereby achieving the ozone cleaning of the debris.

However, as described above, there are problems due to light absorption of part of the ArF excimer laser beam by oxygen in the laser processing. Thus, the following two methods may be applied to solve the problems caused by the light absorption by oxygen and achieve the ozone cleaning. One of the methods uses an ozone cleaning device different from the laser processing system 2, but thus requires cost for preparing the ozone cleaning device in addition to the laser processing system 2. In addition, the workpiece 41 needs to be set at each of the two devices of the laser processing system 2 and the ozone cleaning device, which leads to decrease of the throughput of the laser processing. In the other method, the atmosphere in the irradiation optical path of the pulse laser beam arriving at the workpiece 41 from the window 42 is set to be, for example, gas containing no oxygen, such as nitrogen gas in the laser processing, and replaced with gas containing oxygen, such as air in the ozone cleaning. However, the gas replacing method requires time and work, which leads to decrease of the throughput of the laser processing, too.

3. Laser Processing System of First Embodiment 3.1 Configuration

Figure 5:
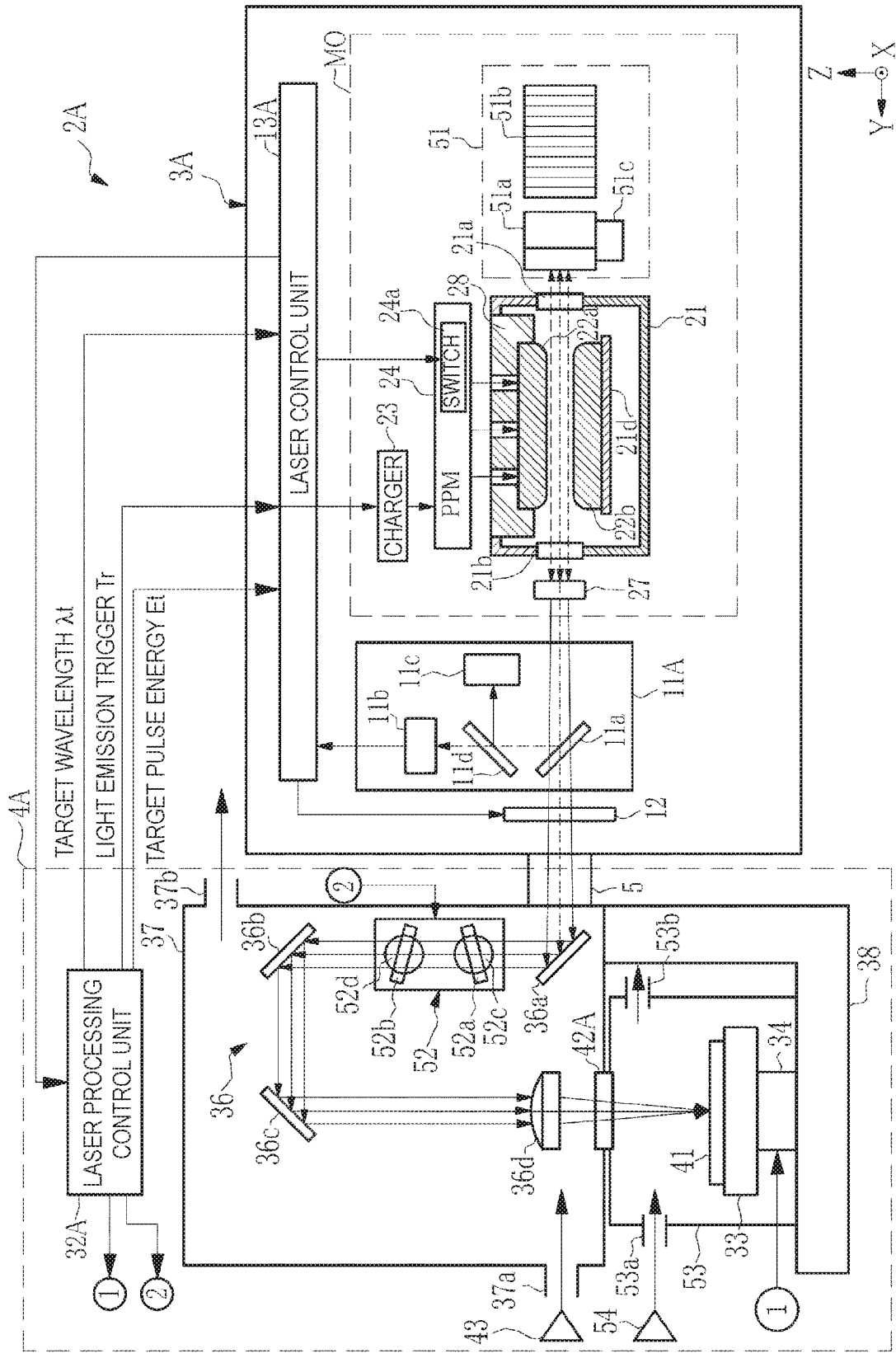
FIG. 5 schematically illustrates the configuration of a laser processing system of a first embodiment.

FIG. 5 schematically illustrates the configuration of a laser processing system 2A according to a first embodiment. The laser processing system 2A of the first embodiment includes a laser device 3A and a laser processing device 4A in place of the laser device 3 and the laser processing device 4 of the laser processing system 2 of the comparative example described with reference to FIG. 1. The following description of the first embodiment will be mainly made on any difference from the laser processing system 2 of the comparative example.

Similarly to the laser device 3 of the comparative example, the laser device 3A of the first embodiment is an ArF excimer laser device that uses ArF laser gas as a laser medium.

In the laser device 3A of the first embodiment, the master oscillator MO includes a line narrowing module (LNM) module 51 in place of the rear mirror 26. The line narrowing module 51 includes a beam expansion prism 51a, a grating 51b, and a rotation stage 51c. The beam expansion prism 51a expands the beam width of light emitted from the window 21a of the laser chamber 21 and causes the light to be incident on the grating 51b. The beam expansion prism 51a reduces the beam width of reflected light from the grating 51b, and returns the light to an electric discharge space in the laser chamber 21 through the window 21a.

The surface of the grating 51b is made of a high reflectance material, and provided with a large number of grooves formed at a predetermined interval. The grating 51b is a dispersion optical element. Each groove has, for example, a right triangular sectional shape. The light incident on the grating 51b from the beam expansion prism 51a is reflected by the grooves and diffracted in a direction in accordance with the wavelength of the light. The grating 51b is Littrow-arranged so that the incident angle of the light incident on the grating 51b from the beam expansion prism 51a is equal to the diffraction angle of diffracted light having a desired wavelength. With this configuration, light having a wavelength near the desired wavelength is returned to the laser chamber 21 through the beam expansion prism 51a.

The rotation stage 51c supports the beam expansion prism 51a and rotates the beam expansion prism 51a about the Z axis. When the beam expansion prism 51a is rotated, the incident angle of light on the grating 51b is changed. Thus, the wavelength of the light returning from the grating 51b to the laser chamber 21 through the beam expansion prism 51a can be selected by rotating the beam expansion prism 51a. Accordingly, the laser device 3A corresponds to a wavelength-variable laser device capable of changing the wavelength of an output pulse laser beam.

The laser processing system 2A has the function of cleaning the surface of the workpiece 41 with ozone in addition to the laser processing on the workpiece 41. The laser processing system 2A can selectively use the wavelength of the pulse laser beam by the line narrowing module 51: the wavelength of a non-absorption line to be described later is selectively used in the laser processing; and the wavelength of an absorption line is selectively used in the ozone cleaning.

Unlike the laser control unit 13 of the comparative example, a laser control unit 13A receives a target wavelength $\lambda t$ from a laser processing control unit 32A in addition to the light emission trigger Tr and the target pulse energy Et. The laser control unit 13A controls the line narrowing module 51 in accordance with the received target wavelength $\lambda t$ to set the wavelength of the pulse laser beam output from the laser device 3A.

When the laser processing is performed on the surface of the workpiece 41, the laser processing control unit 32A transmits a wavelength $\lambda m$ used in the laser processing to the laser control unit 13A as the target wavelength $\lambda t$. When the ozone cleaning is performed on the surface of the workpiece 41, the laser processing control unit 32A transmits a wavelength $\lambda o2abs$ used in the ozone cleaning to the laser control unit 13A as the target wavelength $\lambda t$.

Figure 6:
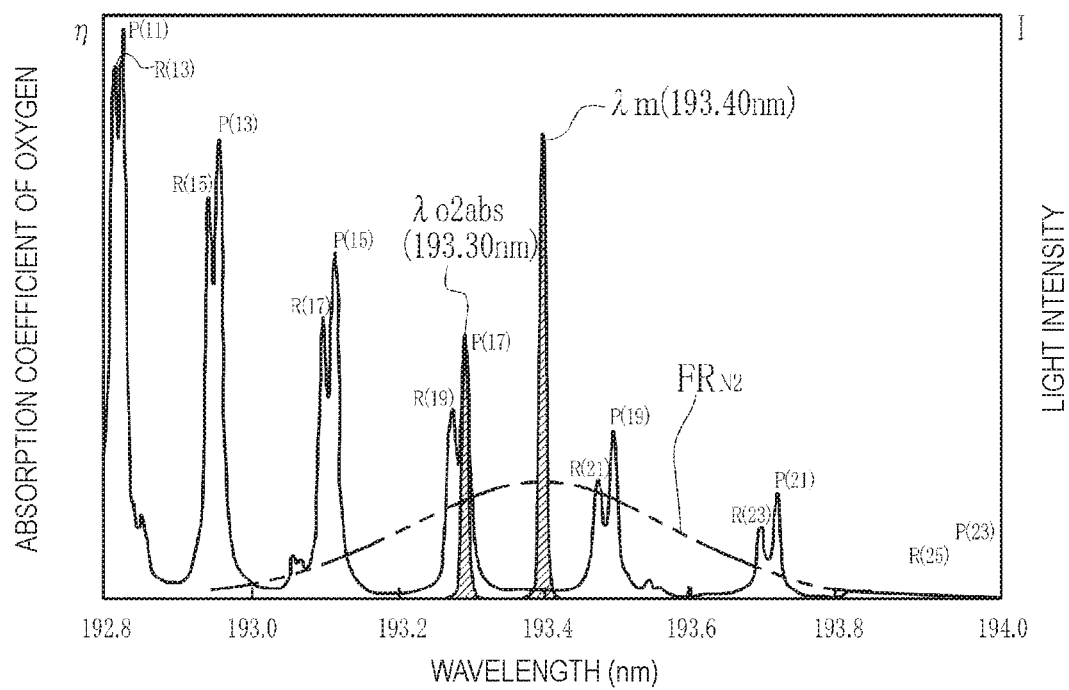
FIG. 6 is a graph illustrating characteristics of light absorption by oxygen.

FIG. 6 is a graph illustrating an absorption characteristic of oxygen that absorbs a laser beam. In FIG. 6, the vertical axis represents an absorption coefficient $\eta$ of laser beam absorption by oxygen, and the horizontal axis represents a wavelength. As illustrated also in FIG. 4, absorption lines expressed by branches P(11), R(13), P(13), R(15), P(15), R(17), P(17), R(19), P(19), R(21), P(21), R(23), P(23), and R(25) exist at wavelengths of 175 nm to 250 nm as the characteristic of laser beam absorption by oxygen. Each absorption line corresponds to a wavelength at which light is absorbed by oxygen, and a wavelength band expressed by a peak curve on which the absorption coefficient $\eta$ abruptly increases from bottom as illustrated in FIG. 6. The absorption lines exist at an interval of 0.1 nm to 0.2 nm approximately. The absorption coefficient $\eta$ at each absorption line is larger at a shorter wavelength.

Each gap between the absorption lines is a wavelength band in which laser beam absorption by oxygen hardly occurs and the laser beam absorption is lower than at the absorption lines. This wavelength band, in other words, a wavelength band overlapping with no absorption line in the gap between absorption lines is referred to as a non-absorption line. The non-absorption line is a wavelength at which the amount of light absorption by oxygen is smaller than at each absorption line.

The wavelength $\lambda m$ used in the laser processing is selected to be a non-absorption line, and the wavelength $\lambda o2abs$ used in the ozone cleaning is selected to be an absorption line. As illustrated with hatching in FIG. 6, in the present example, the wavelength $\lambda m$ is selected to be a non-absorption line having a central wavelength of 193.40 nm between the branch P(17) and the branch R(21). The wavelength $\lambda o2abs$ used in the ozone cleaning is selected to be an absorption line having a central wavelength of 193.30 nm corresponding to the wavelength of branch P(17).

As illustrated with a dashed and double-dotted line in FIG. 6, the spectrum waveform $FR_{N2}$ of spontaneous oscillation has a wide spectrum line width and overlaps with a plurality of absorption lines and non-absorption lines. Unlike the comparative example in which a pulse laser beam of spontaneous oscillation is used, the laser device 3A uses a pulse laser beam having a spectral width narrowed by the line narrowing module 51. The absorption lines and the non-absorption lines are selectively used by the wavelength selection and the line narrowing. A pulse laser beam at a non-absorption line used in the laser processing is preferably narrowed to, for example, a line width of 0.01 nm to 0.02 nm approximately at full width at half maximum to avoid overlapping with adjacent absorption lines at branches P(17) and R(21). The wavelength $\lambda$o2abs used in the ozone cleaning is narrowed to a line width equivalent to that of an absorption line as a wavelength band expressed by a peak curve to avoid overlapping with non-absorption lines.

The laser device 3A of the first embodiment includes a monitor module 11A in place of the monitor module 11 of the comparative example. The monitor module 11A additionally includes a wavelength monitor 11c and a beam splitter 11d in addition to the configuration of the monitor module 11.

In the monitor module 11A, the beam splitter 11d is disposed between the beam splitter 11a and the optical sensor 11b on the reflected light path of the beam splitter 11a. The beam splitter 11d reflects part of light reflected by the beam splitter 11a, and transmits the remaining part. The light having transmitted through the beam splitter 11d is incident on the optical sensor 11b, and the light reflected at the beam splitter 11d is incident on the wavelength monitor 11c.

The wavelength monitor 11c is a publicly known etalon spectrometer. The etalon spectrometer includes, for example, a diffusion plate, an air-gap etalon, a light condensing lens, and a line sensor. The etalon spectrometer generates the interference fringe of an incident laser beam through the diffusion plate and the air-gap etalon, and images the generated interference fringe on a light-receiving surface of the line sensor through the light condensing lens. Then, the interference fringe imaged on the line sensor is measured to determine the wavelength $\lambda$ of the laser beam.

The laser processing device 4A of the first embodiment includes an attenuator 52, a shield 53, and an oxygen gas supply source 54 in addition to the configuration of the laser processing device 4 of the comparative example. The laser processing device 4A also includes the laser processing control unit 32A and a window 42A in place of the laser processing control unit 32 and the window 42, respectively.

The attenuator 52 is disposed on the optical path between the high reflectance mirror 36a and the high reflectance mirror 36b in the housing 37. The attenuator 52 includes, for example, two partially reflective mirrors 52a and 52b, and rotation stages 52c and 52d of the partially reflective mirrors. The two partially reflective mirrors 52a and 52b are each an optical element, the transmittance of which changes with the incident angle of a pulse laser beam. The tilt angles of the partially reflective mirrors 52a and 52b are adjusted by the rotation stages 52c and 52d so that the incident angle of the pulse laser beam is same between the mirrors and each mirror has a desired transmittance.

Accordingly, the pulse energy of the pulse laser beam is reduced to a desired pulse energy as the pulse laser beam passes through the attenuator 52. The transmittance of the attenuator 52 is controlled based on a control signal from the laser processing control unit 32A. Necessary fluence differs between when the laser processing is performed on the workpiece 41 and when the ozone cleaning is performed on the workpiece 41. The fluence can be changed by changing the pulse energy, but in the master oscillator MO, it is difficult to largely change the pulse energy. Thus, the laser processing system 2A uses the attenuator 52 to change the pulse energy between the laser processing and the ozone cleaning.

The shield 53 encloses the workpiece 41 being supported by the table 33. The shield 53 has a size sufficient to entirely enclose the table 33 and the XYZ stage 34, and is fixed to the frame 38.

An opening connected with the window 42A provided to the housing 37 is formed at an upper surface of the shield 53. This opening is sealed by an O ring. The window 42A has, in the housing 37, an entrance surface on which a pulse laser beam from the light condensing lens 36d is incident, and has, in the shield 53, an emission surface from which the pulse laser beam is emitted. With this configuration, the shield 53 surrounds the irradiation optical path of the pulse laser beam between the window 42A and the workpiece 41.

The oxygen gas supply source 54 supplies gas containing oxygen to the shield 53. The gas containing oxygen is, for example, gas as mixture of oxygen and nitrogen at a predetermined mixture ratio. The gas containing oxygen is, for example, clean dry air (CDA). The CDA is obtained by, for example, removing impurities such as particles and water from gas in air through a mechanical filter and molecular sieves. Hereinafter, such gas containing oxygen is simply referred to as oxygen gas.

The oxygen gas always flows through the internal space of the shield 53 while the laser processing system 2A is in operation. The shield 53 is provided with an intake port 53a through which the oxygen gas is taken into the shield 53 from the oxygen gas supply source 54, and a discharge port 53b through which the oxygen gas is discharged out of the shield 53. The intake port 53a corresponds to a gas supply inlet through which the oxygen gas is supplied into the shield 53. The intake port 53a and the discharge port 53b can be connected with an intake pipe and a discharge pipe (not illustrated).

When connected with the intake pipe and the discharge pipe, the intake port 53a and the discharge port 53b are each sealed by an O ring (not illustrated) to prevent outside air from entering into the shield 53. The intake port 53a is connected with the oxygen gas supply source 54. Discharge gas from the discharge pipe is discharged to a predetermined processing device to avoid leakage into air.

The shield 53 can prevent impurities from entering into a processing space in which the workpiece 41 is subjected to the laser processing. The shield 53 can also prevent ozone generated as described later in the shield 53 by the ozone cleaning performed on the workpiece 41 from scattering into air.

The window 42A is made of, for example, $CaF_2$ crystal that transmits an ArF excimer laser beam. A surface of the window 42A on the shield 53 side may be coated with a film that hardly reacts with ozone. The film that hardly reacts with ozone is preferably made of oxide such as aluminum oxide or silicon oxide. The window 42A does not necessarily need to be made of a substrate of $CaF_2$ crystal, but may be made of a substrate of synthetic quartz or sapphire, which are less reactive with ozone.

The workpiece 41 is preferably made of, for example, a material containing carbon atoms. For example, the material is preferably an organic material such as polyimide or fluorine series resin. Alternatively, the material may be carbon fiber reinforced plastics (CFRP) or diamond. Alternatively, the material may be a wide bandgap material such as sapphire or silicon carbide (SiC). Alternatively, the material may be a transparent material such as $CaF_2$ crystal, $MgF_2$ crystal, or glass material.

Similarly to the laser processing control unit 32 of the comparative example, the laser processing control unit 32A transmits the light emission trigger Tr and the target pulse energy Et to the laser control unit 13A. In the laser processing, the pulse energy Em necessary at the laser processing is transmitted as the target pulse energy Et. In the ozone cleaning, a pulse energy Eo3 necessary at the ozone cleaning is transmitted as the target pulse energy Et.

The ozone cleaning includes surface cleaning of removing any object adhering to the surface of the workpiece 41 before the laser processing, and debris cleaning of removing any debris adhering to the surface of the workpiece 41 after the laser processing. In the surface cleaning, a pulse energy Eo3pre necessary at the surface cleaning is transmitted as the target pulse energy Et. In the debris cleaning, a pulse energy Eo3aft necessary at the debris cleaning is transmitted as the target pulse energy Et.

The laser processing control unit 32A controls the fluence of the pulse laser beam by controlling the transmittance T of the attenuator 52 in addition to control of the fluence of the pulse laser beam through the target pulse energy Et. In the surface cleaning, the laser processing control unit 32A controls the transmittance T of the attenuator 52 to achieve a fluence Fo3pre necessary for the surface cleaning. In the laser processing, the laser processing control unit 32A controls the transmittance T of the attenuator 52 to achieve the fluence Fm necessary for the laser processing. In the debris cleaning, the laser processing control unit 32A controls the transmittance T of the attenuator 52 to achieve a fluence Fo3aft necessary for the debris cleaning.

The transmittance T of the attenuator 52 is calculated based on Expression (3) below when there is no light loss of the optical system 36.

$$T = \pi(D/2)^2 (F/Et) \quad (3)$$

In the expression, F represents the fluence, Et represents the target pulse energy, and D represents the diameter of the pulse laser beam on the surface of the workpiece 41.

For example, when the diameter is D in all cases of the surface cleaning, the laser processing, and the debris cleaning, the transmittance T in each case is calculated by an expression as follows. The transmittance T in the surface cleaning is calculated by $T = \pi(D/2)^2 (Fo3pre/Eo3pre)$. The transmittance T in the laser processing is calculated by $T = \pi(D/2)^2 (Fm/Em)$. The transmittance T in the debris cleaning is calculated by $T = \pi(D/2)^2 (Fo3aft/Eo3aft)$.

The fluence Fo3 in the ozone cleaning is lower than the fluence Fm in the laser processing so that the laser processing is not performed on the workpiece 41 in the ozone cleaning. The three fluences of the fluence Fo3pre in the surface cleaning, the fluence Fo3aft in the debris cleaning, and the fluence Fm in the laser processing have, for example, a magnitude relation of Fo3pre<Fo3aft<Fm.

3.2 Operation

Figure 7:
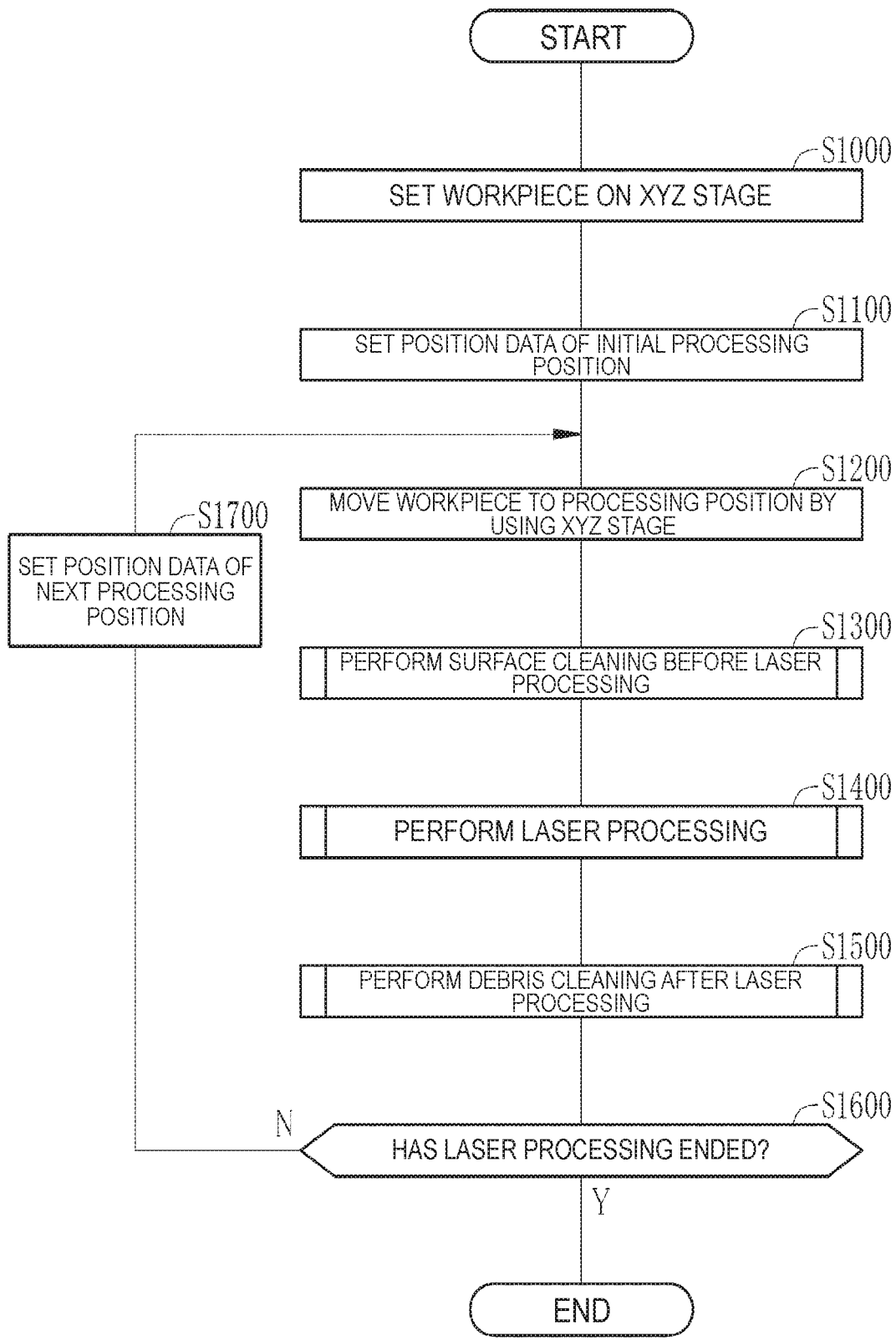
FIG. 7 is a flowchart illustrating a laser processing procedure when laser processing and ozone cleaning of the first embodiment are both performed.

The following describes the operation of the laser processing system 2A with reference to FIGS. 7 to 11F. As illustrated in FIG. 7, when the laser processing is performed, the workpiece 41 is set on the table 33 of the XYZ stage 34 (S1000). The laser processing control unit 32A sets position data of an initial processing position to the XYZ stage 34 (S1100). The XYZ stage 34 moves the workpiece 41 to the initial laser processing position (S1200). Specifically, the workpiece 41 is positioned in the XY plane and in the Z-axis direction. As for the position of the workpiece 41 in the Z-axis direction, the laser processing control unit 32A moves the workpiece 41 to such a position that a pulse laser beam emitted from the light condensing lens 36d is condensed at a desired diameter D on the surface of the workpiece 41. The operation so far is same as S100 to S120 of the operation of the laser processing system 2 of the comparative example illustrated in FIG. 2.

When the positioning of the workpiece 41 ends, the surface cleaning before the laser processing is performed (S1300). As illustrated in FIG. 11A, an adhering object 56 such as an organic substance exists on the surface of the workpiece 41. The surface cleaning removes the adhering object 56 by the ozone cleaning.

Figure 8:
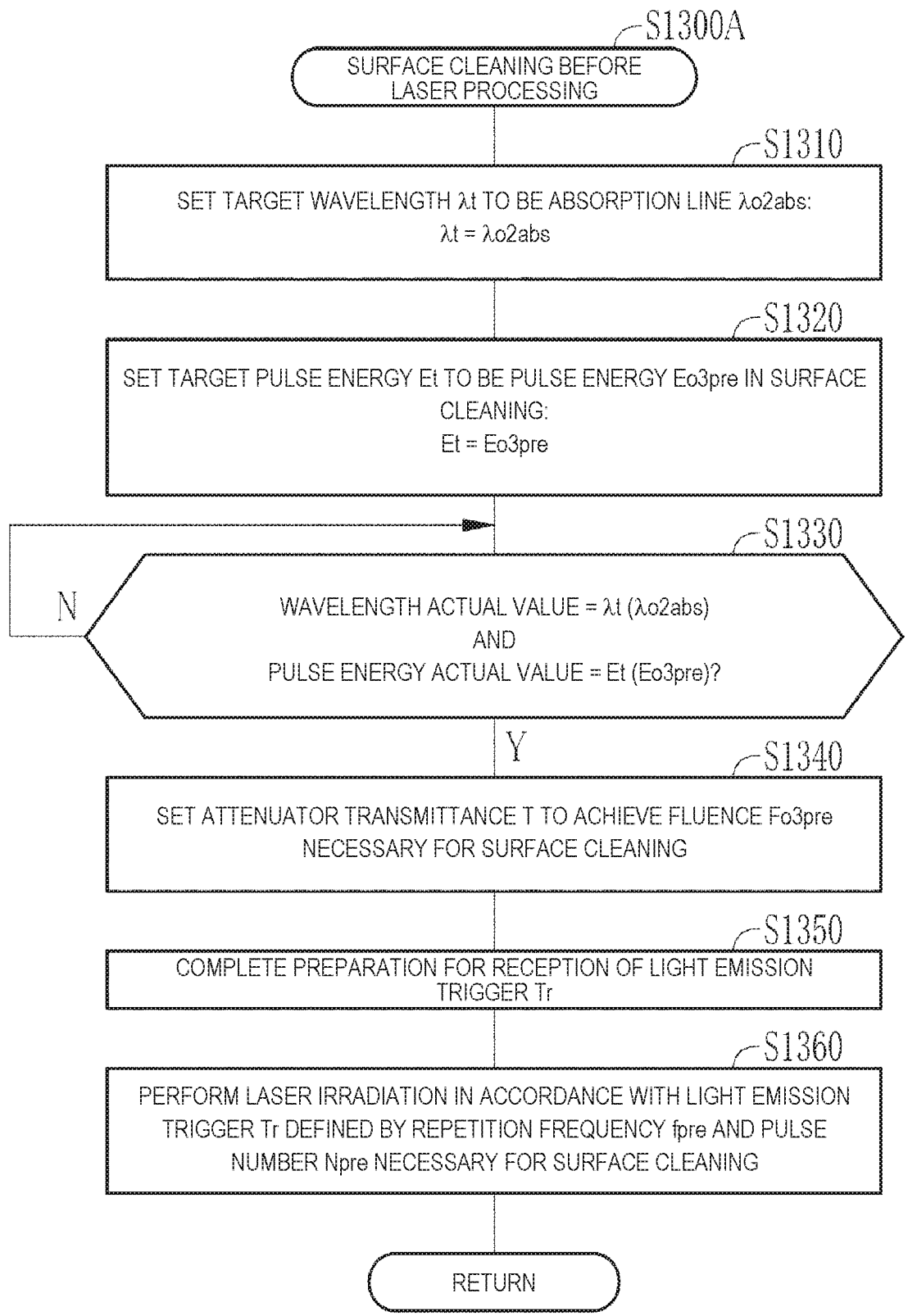
FIG. 8 is a flowchart illustrating the processing procedure of surface cleaning of the first embodiment.

In the present example, the surface cleaning is performed in accordance with a flowchart of S1300A illustrated in FIG. 8. In FIG. 8, the laser processing control unit 32A transmits the wavelength λo2abs of an absorption line used in the surface cleaning to the laser control unit 13A as the target wavelength λt. The laser control unit 13A controls the line narrowing module 51 to set the wavelength of the pulse laser beam to be the wavelength λo2abs of an absorption line (S1310).

The laser processing control unit 32A transmits the pulse energy Eo3pre for the surface cleaning to the laser control unit 13A as the target pulse energy Et. The laser control unit 13A sets the target pulse energy Et to be the pulse energy Eo3pre (S1320). The laser control unit 13A controls the master oscillator MO to perform laser oscillation based on an internal trigger while the shutter 12 is closed. The monitor module 11 measures the wavelength actual value and the pulse energy actual value of the pulse laser beam output from the master oscillator MO.

The laser control unit 13A monitors the wavelength actual value and the pulse energy actual value transmitted from the monitor module 11, and controls the master oscillator MO so that the actual values become equal to target values (S1330). Specifically, the laser control unit 13A controls the line narrowing module 51 so that the wavelength actual value transmitted from the monitor module 11 becomes equal to λto2abs as the target wavelength λt for the surface cleaning. In addition, the laser control unit 13A controls the charging voltage of the pulse power module 24 so that the pulse energy actual value transmitted from the monitor module 11 becomes equal to Eo3pre as the target pulse energy Et for the surface cleaning.

When the wavelength actual value has reached the target wavelength λt and the pulse energy actual value has reached the target pulse energy Et (Y at S1330), the laser control unit 13A opens the shutter 12. The laser processing control unit 32A sets the transmittance T of the attenuator 52 to achieve the fluence Fo3pre necessary for the surface cleaning (S1340).

When the wavelength actual value and the pulse energy actual value have reached the target values (Y at S1330), the laser control unit 13A transmits, to the laser processing control unit 32A, a signal indicating completion of preparation for reception of the light emission trigger Tr as an external trigger from the laser processing control unit 32A (S1350).

The laser processing control unit 32A transmits, to the laser control unit 13A, the light emission trigger Tr defined by a repetition frequency fpre and a pulse number Npre necessary for the surface cleaning. The laser control unit 13A actuates the master oscillator MO in accordance with the received light emission trigger Tr to output a pulse laser beam to the laser processing device 4A. The pulse laser beam input to the laser processing device 4A is emitted out of the window 42A through the optical system 36, and incident on the workpiece 41 in the shield 53 (S1360).

As illustrated in FIG. 11B, in the surface cleaning, the workpiece 41 is irradiated with a pulse laser beam PL having the wavelength λo2abs as an absorption line. The pulse laser beam is absorbed by oxygen in the shield 53. Accordingly, ozone is generated in the shield 53. The ozone cleaning is performed by the effects of the pulse laser beam and the ozone, thereby removing the adhering object 56 on the surface of the workpiece 41.

Figure 9:
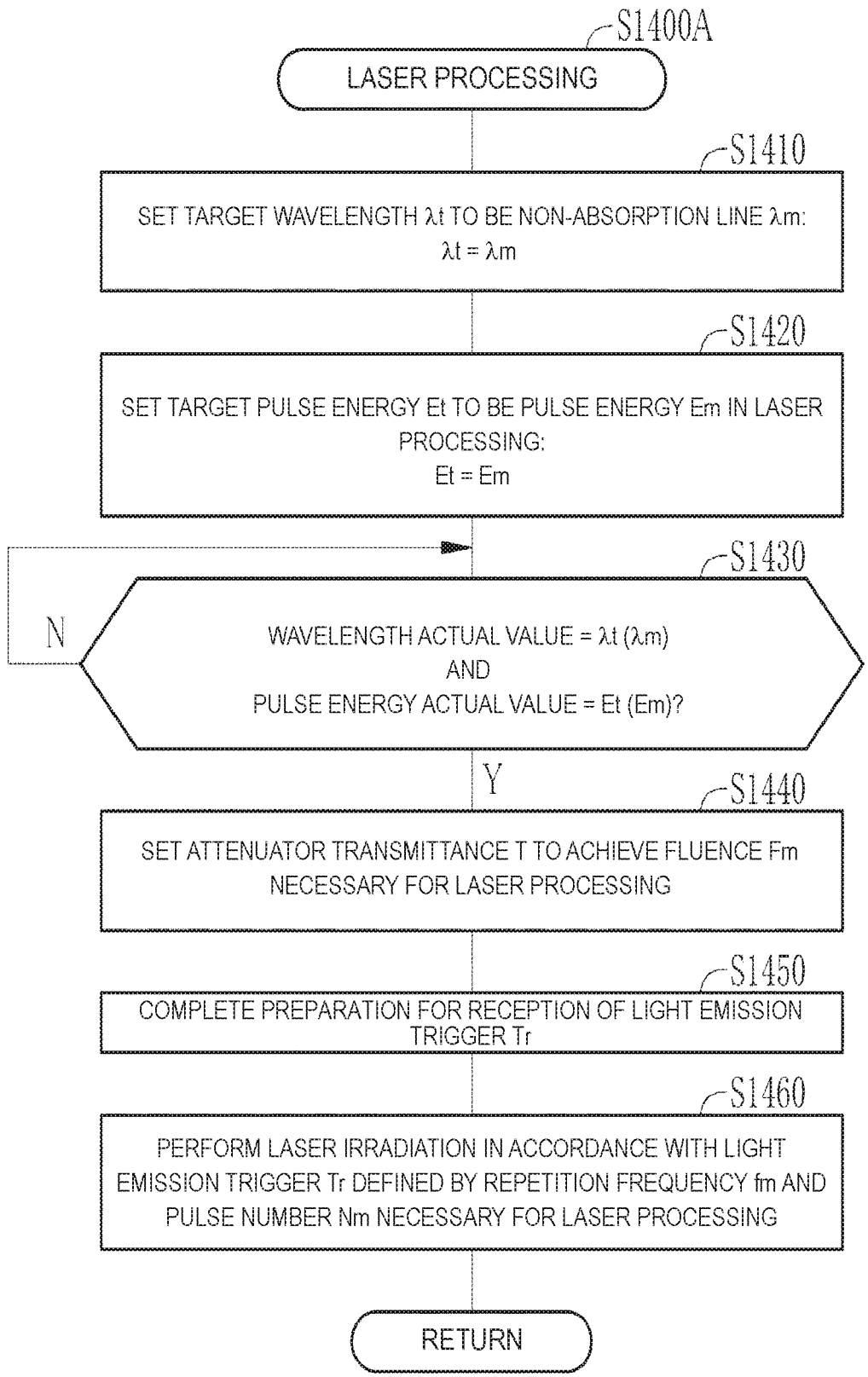
FIG. 9 is a flowchart illustrating the processing procedure of the laser processing of the first embodiment.

In FIG. 7, after the surface cleaning (S1300) ends, the laser processing is performed (S1400). In the present example, the laser processing is performed in accordance with the flowchart of S1400A illustrated in FIG. 9. In FIG. 9, the laser processing control unit 32A transmits the wavelength λm as a non-absorption line of oxygen used in the laser processing to the laser control unit 13A as the target wavelength λt. The laser control unit 13A controls the line narrowing module 51 to set the wavelength of the pulse laser beam to be the wavelength λm as a non-absorption line (S1410).

The laser processing control unit 32A transmits the pulse energy Em for the laser processing to the laser control unit 13A as the target pulse energy Et. The laser control unit 13A sets the target pulse energy Et to be the pulse energy Em (S1420). The laser control unit 13A controls the master oscillator MO to perform laser oscillation based on an internal trigger while the shutter 12 is closed. The monitor module 11 measures the wavelength actual value and the pulse energy actual value of the pulse laser beam output from the master oscillator MO.

The laser control unit 13A monitors the wavelength actual value and the pulse energy actual value transmitted from the monitor module 11, and controls the master oscillator MO so that the actual values become equal to target values (S1430). Specifically, the laser control unit 13A controls the line narrowing module 51 so that the wavelength actual value transmitted from the monitor module 11 becomes equal to λm as the target wavelength λt for the laser processing. In addition, the laser control unit 13A controls the charging voltage of the pulse power module 24 so that the pulse energy actual value transmitted from the monitor module 11 becomes equal to Em as the target pulse energy Et for the laser processing.

When the wavelength actual value has reached the target wavelength λt and the pulse energy actual value has reached the target pulse energy Et (Y at S1430), the laser control unit 13A opens the shutter 12. The laser processing control unit 32A sets the transmittance T of the attenuator 52 to achieve the fluence Fm necessary for the laser processing (S1440).

When the wavelength actual value and the pulse energy actual value have reached the target values (Y at S1430), the laser control unit 13A transmits, to the laser processing control unit 32A, a signal indicating completion of preparation for reception of the light emission trigger Tr from the laser processing control unit 32A (S1450).

The laser processing control unit 32A transmits, to the laser control unit 13A, the light emission trigger Tr defined by a repetition frequency fm and a pulse number Nm necessary for the laser processing. The laser control unit 13A actuates the master oscillator MO in accordance with the received light emission trigger Tr to output a pulse laser beam to the laser processing device 4A. The pulse laser beam input to the laser processing device 4A is emitted out of the window 42A through the optical system 36, and incident on the workpiece 41 in the shield 53 (S1460).

As illustrated in FIG. 11C, in the laser processing, the workpiece 41 is irradiated with the pulse laser beam PL of the wavelength λm as a non-absorption line. Accordingly, as illustrated in FIG. 11D, the laser processing is performed on the surface of the workpiece 41. Similarly to the surface cleaning, in the laser processing, oxygen gas is supplied into the shield 53. However, since a pulse laser beam at a non-absorption line is used in the laser processing, the pulse laser beam is hardly absorbed by oxygen. Accordingly, ozone is hardly generated. As illustrated in FIG. 11D, when the laser processing is performed, irradiation with the pulse laser beam causes ablation at a processing position, and generates debris 57 near the processing position.

Figure 10:
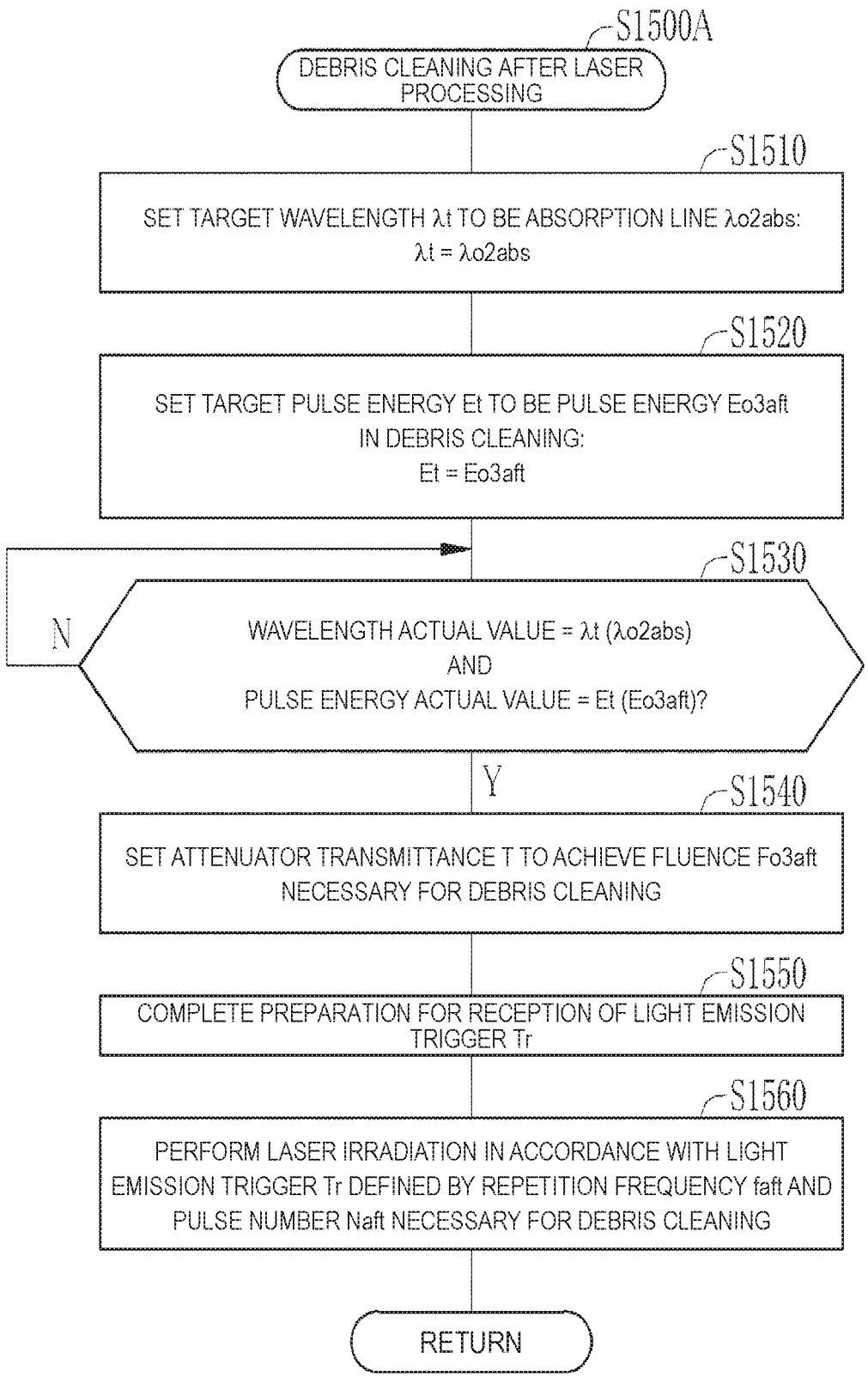
FIG. 10 is a flowchart illustrating the processing procedure of debris cleaning of the first embodiment.

In FIG. 7, after the laser processing (S1400) ends, the debris cleaning after the laser processing is performed (S1500). In the present example, the debris cleaning is performed in accordance with the flowchart of S1500A illustrated in FIG. 10. In FIG. 10, the laser processing control unit 32A transmits the wavelength λo2abs of an absorption line used in the debris cleaning to the laser control unit 13A as the target wavelength λt. The laser control unit 13A controls the line narrowing module 51 to set the wavelength of the pulse laser beam to be the absorption line λo2abs (S1510).

The laser processing control unit 32A transmits the pulse energy Eo3aft for the debris cleaning to the laser control unit 13A as the target pulse energy Et. The laser control unit 13A sets the target pulse energy Et to be the pulse energy Eo3aft (S1520). The laser control unit 13A controls the master oscillator MO to perform laser oscillation based on an internal trigger while the shutter 12 is closed. The monitor module 11 measures the wavelength actual value and the pulse energy actual value of the pulse laser beam output from the master oscillator MO.

The laser control unit 13A monitors the wavelength actual value and the pulse energy actual value transmitted from the monitor module 11, and controls the master oscillator MO so that the actual values become equal to target values (S1530). Specifically, the laser control unit 13A controls the line narrowing module 51 so that the wavelength actual value transmitted from the monitor module 11 becomes equal to the wavelength λo2abs as the target wavelength λt for the debris cleaning. In addition, the laser control unit 13A controls the charging voltage of the pulse power module 24 so that the pulse energy actual value transmitted from the monitor module 11 becomes equal to Eo3aft as the target pulse energy Et for the debris cleaning.

When the wavelength actual value has reached the target wavelength λt and the pulse energy actual value has reached the target pulse energy Et (Y at S1530), the laser control unit 13A opens the shutter 12. The laser processing control unit 32A sets the transmittance T of the attenuator 52 to achieve the fluence Fo3aft necessary for the debris cleaning (S1540).

When the wavelength actual value and the pulse energy actual value have reached the target values (Y at S1530), the laser control unit 13A transmits, to the laser processing control unit 32A, a signal indicating completion of preparation for reception of the light emission trigger Tr (S1550).

The laser processing control unit 32A transmits, to the laser control unit 13A, the light emission trigger Tr defined by a repetition frequency faft and a pulse number Naft necessary for the debris cleaning. The laser control unit 13A actuates the master oscillator MO in accordance with the received light emission trigger Tr to output a pulse laser beam to the laser processing device 4A. The pulse laser beam input to the laser processing device 4A is emitted out of the window 42A through the optical system 36, and incident on the workpiece 41 in the shield 53 (S1560).

As illustrated in FIG. 11E, in the debris cleaning, the workpiece 41 is irradiated with the pulse laser beam PL having the wavelength λo2abs as an absorption line. The pulse laser beam is absorbed by oxygen in the shield 53, and ozone is generated in the shield 53. The ozone cleaning is performed by the effects of the pulse laser beam and the ozone, thereby removing the debris 57 adhering to the surface of the workpiece 41. When the debris 57 is removed, the workpiece 41 can be cleanly finished at the processing position as illustrated in FIG. 11F.

When there is a next processing position (N at S1600) after the process up to the debris cleaning in FIG. 7 has ended at the initial processing position, the laser processing control unit 32A sets data of the next processing position to the XYZ stage 34 (S1700). Then, the XYZ stage 34 moves the workpiece 41 to the next processing position (S1200). The surface cleaning (S1300), the laser processing (S1400), and the debris cleaning (S1500) are performed on the workpiece 41 at the next processing position. When there is no next processing position, the laser processing ends (Y at S1600). This procedure is repeated until the laser processing ends at all processing positions.

3.3 Effect

In the laser processing, the laser processing system 2A uses a non-absorption line as the wavelength of the pulse laser beam. Thus, light absorption by oxygen hardly occurs when the workpiece 41 is in gas containing oxygen, which leads to reduction of condensation performance degradation due to distortion of the wavefront of the pulse laser beam. Accordingly, fluence destabilization and processing accuracy degradation caused by the condensation performance degradation are reduced. In addition, decrease of the light intensity I is reduced.

In the ozone cleaning such as the surface cleaning or the debris cleaning, an absorption line is used as the wavelength of the pulse laser beam. The workpiece 41 is irradiated with the pulse laser beam at an absorption line in gas containing oxygen. Accordingly, the ozone cleaning is performed by the effects of the pulse laser beam and the oxygen.

In this manner, by using the laser device 3A as a wavelength-variable laser device, the laser processing system 2A selectively uses a non-absorption line as the wavelength of a pulse laser beam emitted on the workpiece 41 in the laser processing, and selectively uses an absorption line as the wavelength in the ozone cleaning. Since the spectral width of the pulse laser beam at a non-absorption line is narrowed to avoid overlapping with absorption lines, the pulse laser beam is hardly affected by light absorption by oxygen.

Thus, when both of the laser processing and the ozone cleaning are performed by the single laser processing system 2A, it is not needed to perform gas replacement of replacing an atmosphere in the processing space in which the workpiece 41 is placed, such as the irradiation optical path of the pulse laser beam, with nitrogen gas in the laser processing or with oxygen gas in the ozone cleaning. Accordingly, the laser processing and the ozone cleaning can be performed by the single laser processing system 2A without decrease of the laser processing throughput unlike a case in which the gas replacement is performed.

In addition, the laser control unit 13A can change the pulse energy of the pulse laser beam output from the laser device 3A between the laser processing and the ozone cleaning. Thus, appropriate control of the fluence of the pulse laser beam can be performed in each of the laser processing and the ozone cleaning.

The laser processing system 2A includes the attenuator 52 configured to change the energy of the pulse laser beam by changing the transmittance T for the pulse laser beam output from the laser device 3A. With the laser device 3A, it is difficult to largely change the pulse energy, for example, change the pulse energy in the ozone cleaning to be ⅒ of the pulse energy in the laser processing. However, it is possible to largely change the pulse energy by using the attenuator 52.

Thus, when the attenuator 52 is provided, more appropriate control of the fluence of the pulse laser beam can be performed than when fluence control is performed only by pulse energy control at the laser device 3A. Alternatively, the attenuator 52 does not need to be provided. However, the attenuator 52 is preferably provided since more appropriate fluence control can be performed.

The laser processing system 2A also includes the shield 53 that encloses the workpiece 41, and the intake port 53a as a gas supply inlet through which gas containing oxygen is supplied into the shield 53. This configuration can prevent impurities from entering into the processing space in which the workpiece 41 is subjected to laser processing. In addition, it is possible to prevent ozone generated in the shield 53 by the ozone cleaning from scattering into air.

Alternatively, the shield 53 and the intake port 53a do not need to be provided. Since oxygen is contained in air, the laser processing and the ozone cleaning can be performed by the single laser processing system 2A without the throughput decrease as described above. However, the shield 53 and the intake port 53a are preferably provided since the incoming impurities reduction and the ozone scattering prevention can be achieved.

In the present example, the laser device 3A is an ArF excimer laser device configured to output a pulse laser beam having a central wavelength of 193.4 nm by using ArF laser gas as a laser medium, but may be another laser device. As illustrated in FIG. 6, the amount of light absorption by oxygen is large in the wavelength range of 175 nm to 200 nm. Thus, the present invention is effective for a laser device to output a laser beam having a wavelength in this range.

In the present example, the ozone cleaning executes both of the surface cleaning before the laser processing, and the debris cleaning after the laser processing, but may execute at least the debris cleaning after the laser processing. This is because an adhering object as a cleaning target in the surface cleaning can be removed by the laser processing in some cases.

In the present example, the wavelength of 193.40 nm is used as a non-absorption line, and the wavelength of 193.30 nm is used as an absorption line, but any other wavelengths may be used. For example, the wavelengths of 193.20 nm and 193.60 nm may be used as non-absorption lines. Absorption lines having peaks at 193.10 nm and 193.50 nm may be used.

3.4 Modification

Figure 12:
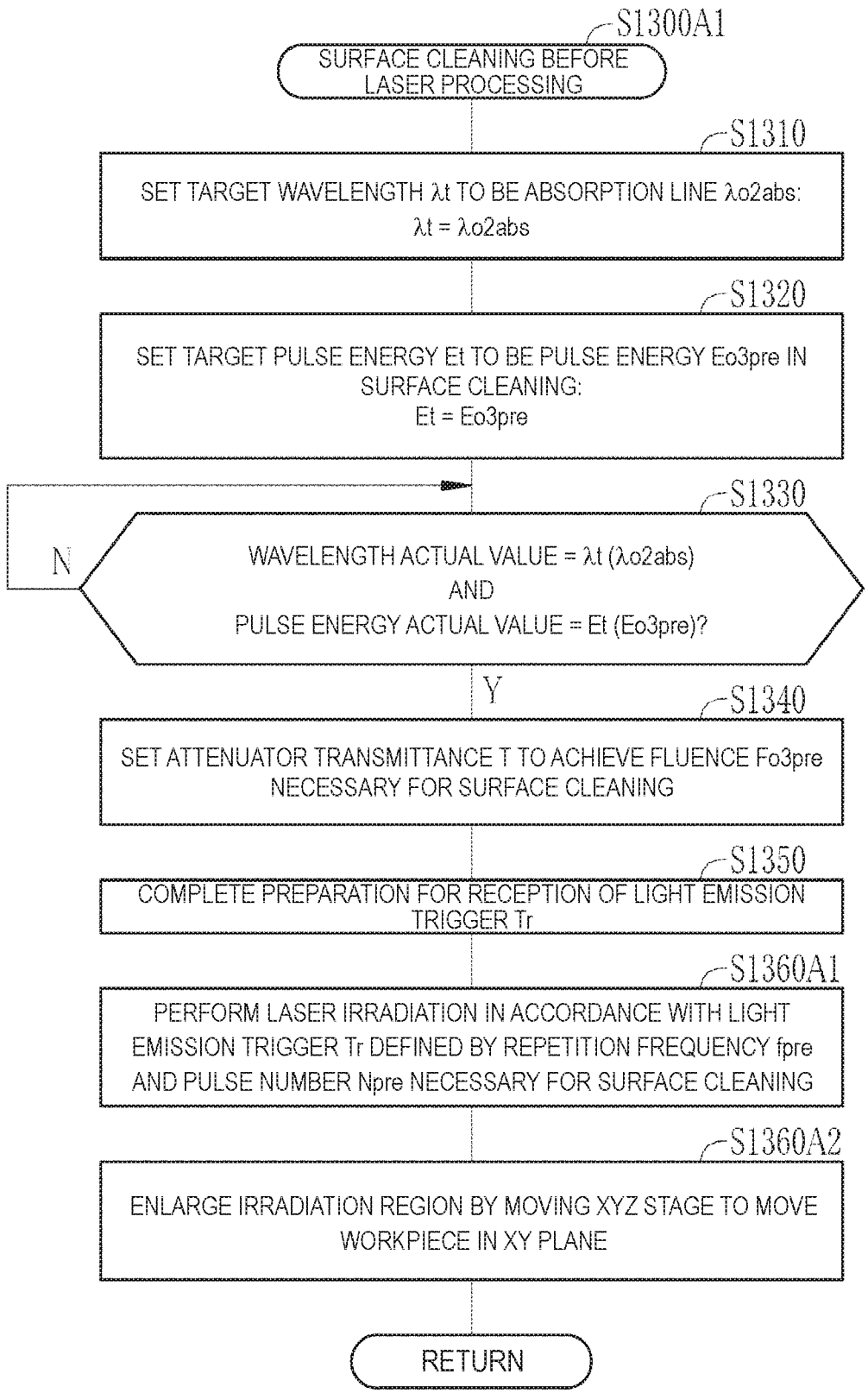
FIG. 12 is a flowchart illustrating a modification of the surface cleaning of the first embodiment.
Figure 13:
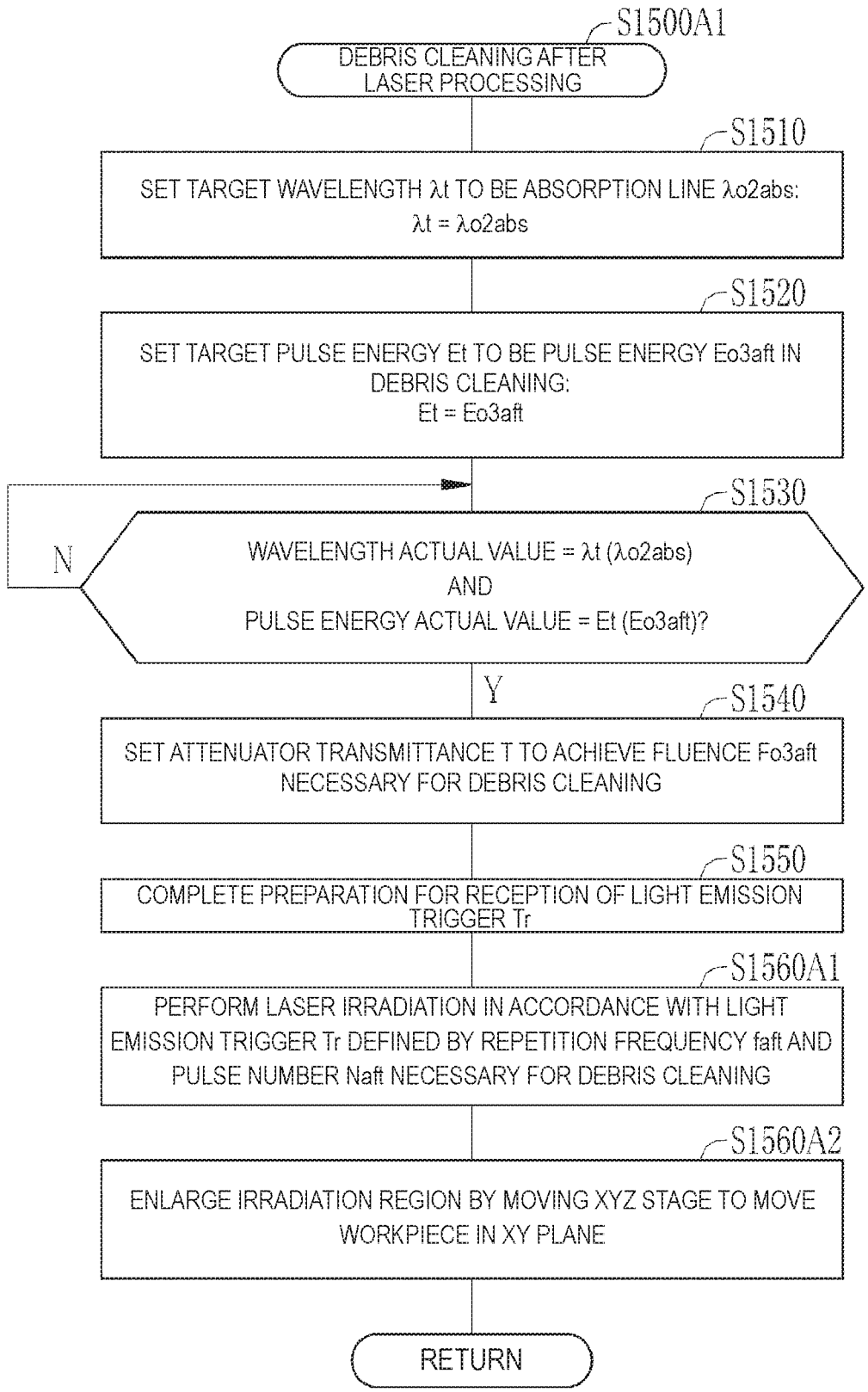
FIG. 13 is a flowchart illustrating a modification of the debris cleaning of the first embodiment.

In the above example, the surface cleaning and the debris cleaning are performed while the position of the workpiece 41 is fixed, but the workpiece 41 may be moved in the surface cleaning and the debris cleaning to enlarge the irradiation region of the pulse laser beam as in modifications illustrated in flowcharts in FIGS. 12 and 13.

FIG. 12 is a flowchart of Modification S1300A1 of the surface cleaning, which is different from the flowchart in FIG. 8 in that step S1360 is replaced with steps S1360A1 and S1360A2. The other steps are same as the corresponding steps of the flowchart in FIG. 8. In S1360A1, the workpiece 41 is irradiated with the pulse laser beam in accordance with the light emission trigger Tr, thereby performing the surface cleaning. In this case, the laser processing control unit 32A controls the XYZ stage 34 to move the workpiece 41 in the XY plane. Accordingly, the irradiation region is enlarged (S1360A2).

FIG. 13 is a flowchart of Modification S1500A1 of the debris cleaning, which is different from the flowchart in FIG. 10 in that step S1560 is replaced with steps S1560A1 and S1560A2. The other steps are same as the corresponding steps of the flowchart in FIG. 10. In S1560A1, the workpiece 41 is irradiated with the pulse laser beam in accordance with the light emission trigger Tr, thereby performing the debris cleaning. In this case, the laser processing control unit 32A controls the XYZ stage 34 to move the workpiece 41 in the XY plane. Accordingly, the irradiation region is enlarged (S1560A2).

The laser irradiation in S1360A1 and S1560A1 and the movement of the workpiece 41 in S1360A2 and S1560A2 may be performed in parallel to each other. Specifically, the laser irradiation may be performed while moving the workpiece 41. Alternatively, the laser irradiation may be performed in such a step-by-step manner that the workpiece 41 is stopped at rest, and after the laser irradiation has ended at one position, the workpiece 41 is moved by a predetermined amount and the laser irradiation is performed while the workpiece 41 is stopped at the next position.

4. Laser Processing System of Second Embodiment 4.1 Configuration

Figure 14:
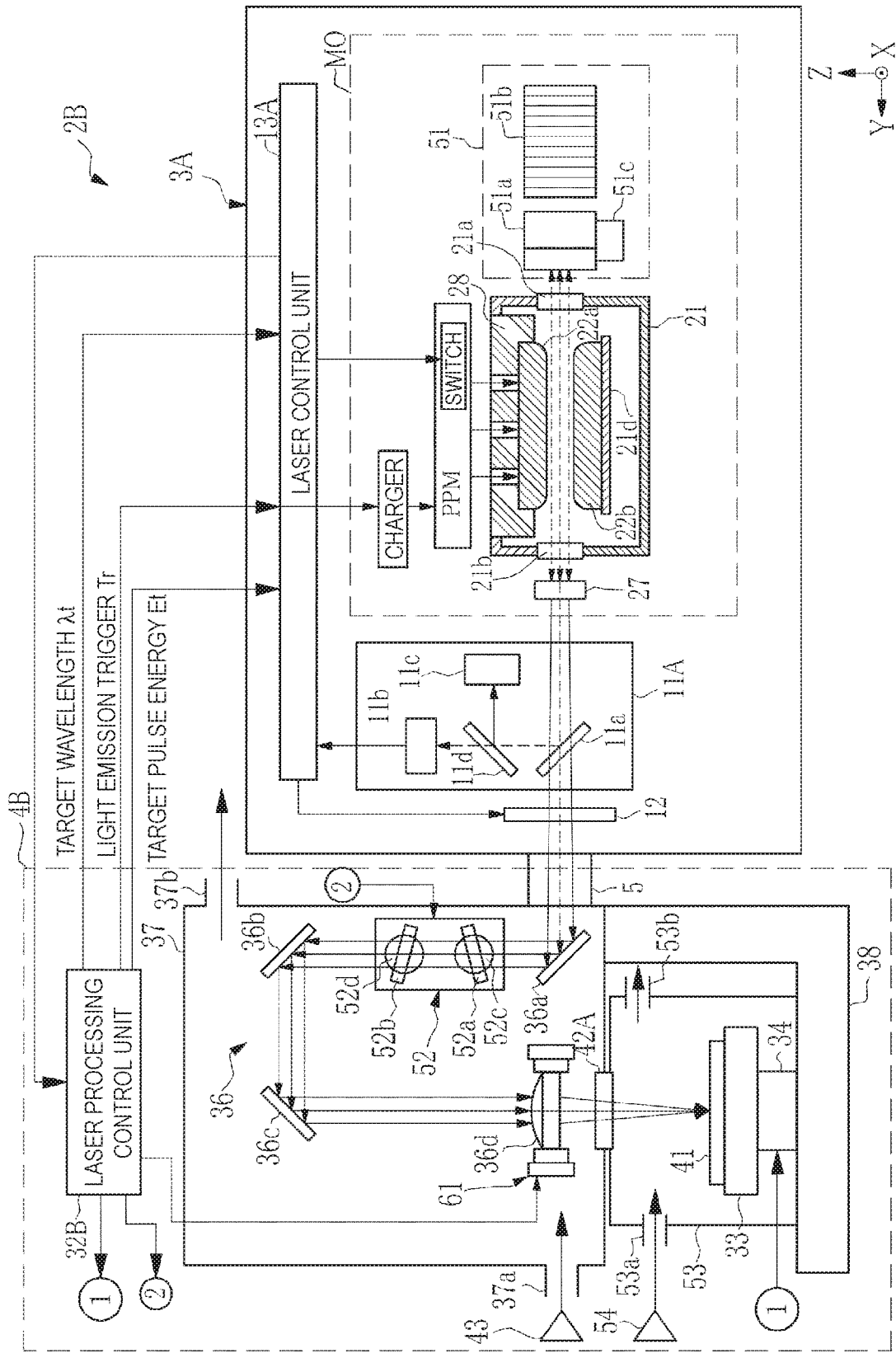
FIG. 14 schematically illustrates the configuration of a laser processing system of a second embodiment.

FIGS. 14 to 17F illustrate a laser processing system 2B of a second embodiment. As illustrated in FIG. 14, the laser processing system 2B of the second embodiment includes the laser device 3A and a laser processing device 4B. The laser device 3A is same as that of the first embodiment. The laser processing device 4B includes an irradiation-area-changing mechanism 61 in addition to the configuration of the laser processing device 4A of the first embodiment. A laser processing control unit 32B is the laser processing control unit 32A of the first embodiment additionally having the function of controlling the irradiation-area-changing mechanism 61. The other configuration of the laser processing system 2B is same as that of the laser processing system 2A of the first embodiment, and thus the following description will be mainly made on any difference therebetween.

The irradiation-area-changing mechanism 61 changes the irradiation area of the pulse laser beam emitted from the optical system 36 on the surface of the workpiece 41. Specifically, the irradiation-area-changing mechanism 61 changes the diameter D of the pulse laser beam incident on the surface of the workpiece 41 by moving the light condensing lens 36d in an optical axis direction along the Z-axis direction. The irradiation-area-changing mechanism 61 is, for example, a one-axis stage configured to linearly move the light condensing lens 36d along the optical axis. The one-axis stage includes, for example, a stage holding the light condensing lens 36d and movable in one direction by rotation of a ball screw, and a motor configured to rotate the ball screw.

The diameter D is minimum in a focus state in which the focal position of the pulse laser beam through the light condensing lens 36d coincides with the position of the surface of the workpiece 41, and thus the irradiation area is minimum in this state. In the laser processing, the laser processing control unit 32B moves the light condensing lens 36d to the focus position relative to the surface of the workpiece 41 and sets the focus state to reduce the diameter D.

In the ozone cleaning, the laser processing control unit 32B sets a defocus state by shifting the focal position of the pulse laser beam in the optical axis direction from the surface of the workpiece 41. Specifically, in the surface cleaning, the light condensing lens 36d in the focus state is shifted downward in the optical axis direction by ΔLpre so that the distance between the light condensing lens 36d and the workpiece 41 decreases. Similarly, in the debris cleaning, the light condensing lens 36d is shifted by ΔLaft in the optical axis direction.

The fluence F of the pulse laser beam on the surface of the workpiece 41 is inversely proportional to the irradiation area of the pulse laser beam as indicated by Expression (1) above. Thus, the fluence F decreases when the diameter D is increased to increase the irradiation area while the pulse energy is constant. Thus, in the ozone cleaning, the fluence F of the pulse laser beam can be reduced without changing the pulse energy by setting the defocus state.

4.2 Operation

The overall operation of the laser processing system 2B of the second embodiment is same as that of the flowchart of the first embodiment in FIG. 7 except for operations in the surface cleaning and the debris cleaning. In the second embodiment, the surface cleaning is executed in accordance with the flowchart of S1300B illustrated in FIG. 15, and the debris cleaning is executed in accordance with the flowchart of S1500B illustrated in FIG. 16.

Figure 15:
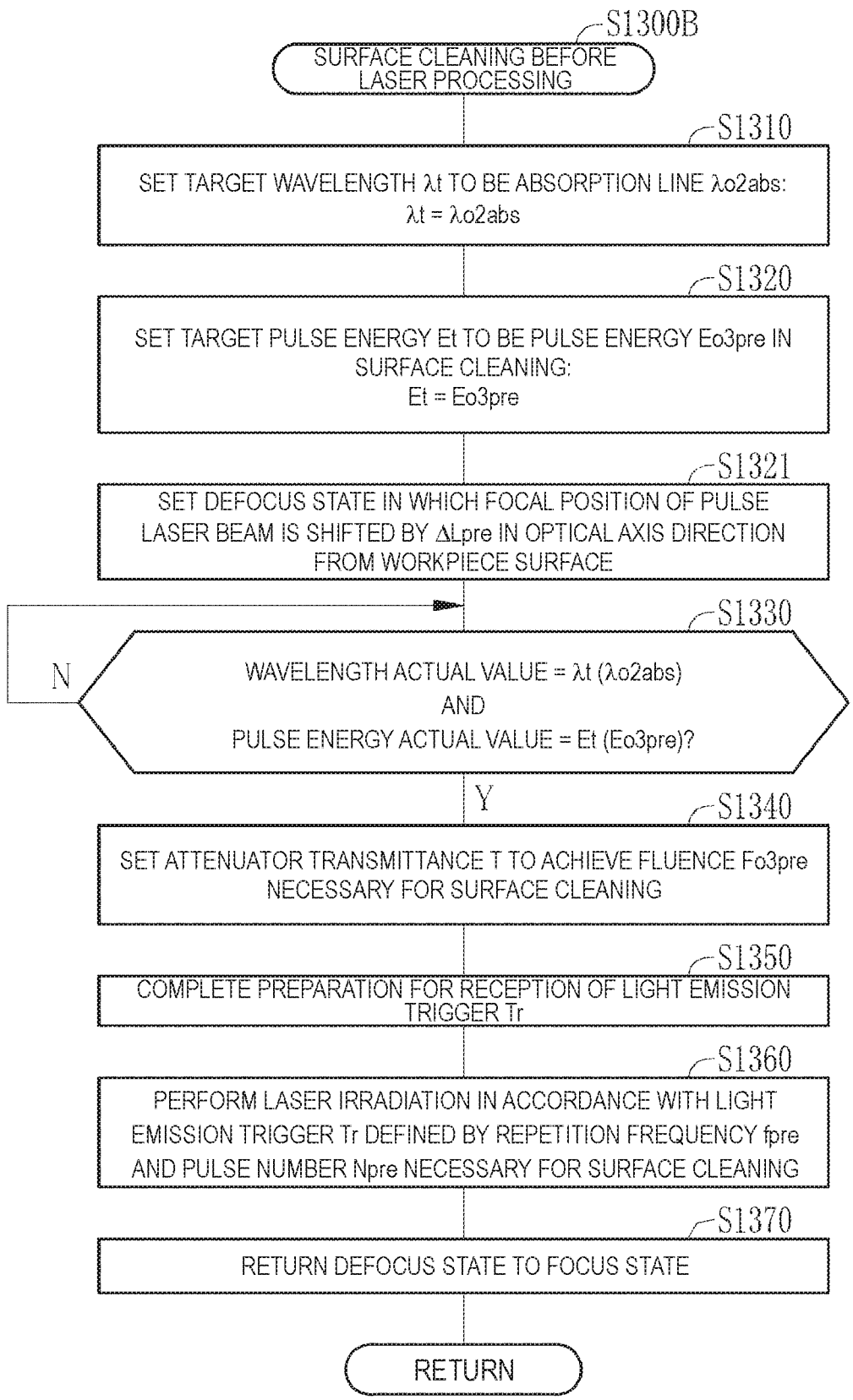
FIG. 15 is a flowchart illustrating the processing procedure of surface cleaning of the second embodiment.
Figure 16:
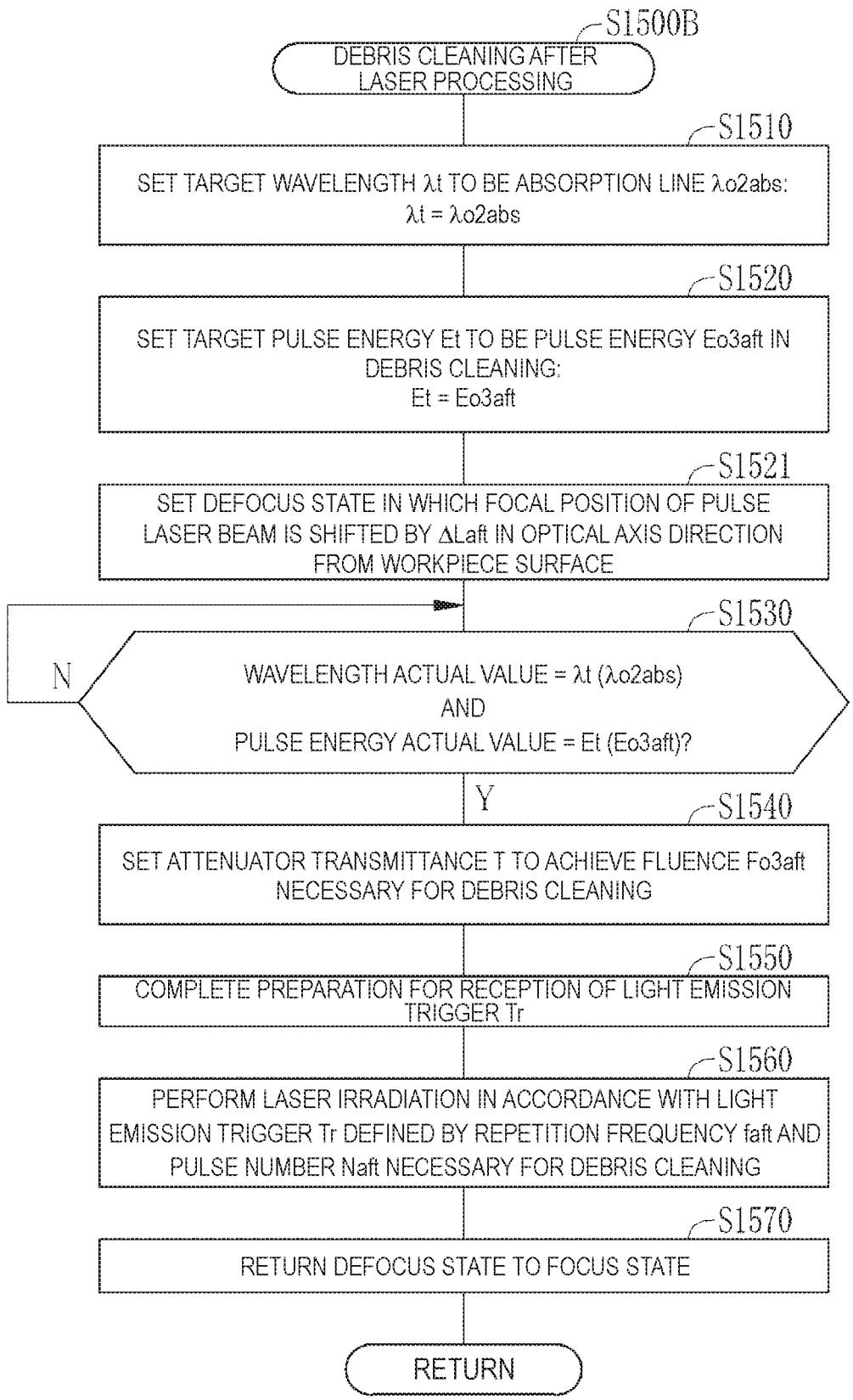
FIG. 16 is a flowchart illustrating the processing procedure of debris cleaning of the second embodiment.
Figure 17:
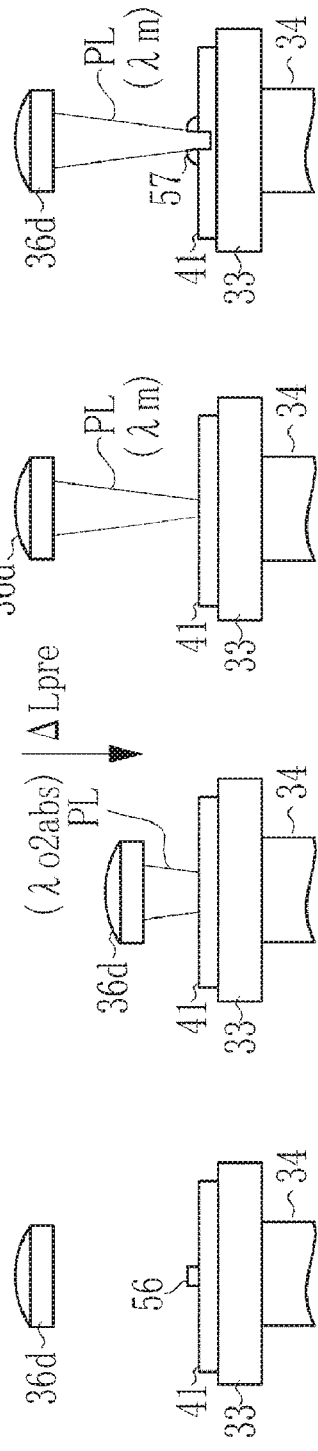
FIGS. 17A to 17F illustrate transition of the state of a workpiece and a light condensing lens when laser processing and ozone cleaning are performed in the second embodiment.

The flowchart in FIG. 15 is different from the flowchart of S1300A of the surface cleaning of the first embodiment illustrated in FIG. 8 in that additional steps S1321 and S1370 are provided, and is otherwise same as the flowchart of S1300A illustrated in FIG. 8. Similarly, the flowchart in FIG. 16 is different from the flowchart of S1500A of the debris cleaning of the first embodiment illustrated in FIG. 10 in that additional steps S1521 and S1570 are provided, and is otherwise same as the flowchart of S1500A illustrated in FIG. 10.

As illustrated in FIG. 15, in the surface cleaning of the second embodiment, the optical system 36 is set to the defocus state after the setting of the target wavelength λt at S1310 and the setting of the target pulse energy Et at S1320. Specifically, the laser processing control unit 32B controls the irradiation-area-changing mechanism 61 to set the defocus state in which the focal position of the pulse laser beam is shifted by ΔLpre in the optical axis direction from the surface of the workpiece 41 (S1321).

In the defocus state, since the diameter D of the pulse laser beam is changed, the formula for calculating the transmittance T of the attenuator 52 at S1340 is as follows. Specifically, the transmittance T is given by $\pi(Dpre/2)^2(Fo3pre/Eo3pre)$, where Dpre represents the diameter in the defocus state when the shift is made by ΔLpre.

In this state, the surface cleaning through irradiation with the pulse laser beam at S1360 is performed. This operation is described with reference to transition diagrams illustrated in FIGS. 17A and 17B. First, in the focus state illustrated in FIG. 17A, the distance between the light condensing lens 36d and the workpiece 41 is reduced by shifting the light condensing lens 36d by ΔLpre as illustrated in FIG. 17B. In this state, the workpiece 41 is irradiated with the pulse laser beam PL at an absorption line as the wavelength λo2abs to perform the surface cleaning and remove the adhering object 56.

Then, after the laser irradiation, the laser processing control unit 32B controls the irradiation-area-changing mechanism 61 to execute a step of returning the defocus state to the focus state (S1370). Accordingly, the light condensing lens 36d is returned to the focus state illustrated in FIG. 17C. In the state illustrated in FIG. 17C, the laser processing is performed with the pulse laser beam PL at a non-absorption line as the wavelength λm.

After the laser processing ends, the debris cleaning is performed. As illustrated in FIG. 16, in the debris cleaning of the second embodiment, the optical system 36 is set to the defocus state after the setting of the target wavelength λt at S1510 and the setting of the target pulse energy Et at S1520. For example, the laser processing control unit 32B controls the irradiation-area-changing mechanism 61 to set the defocus state in which the focal position of the pulse laser beam is shifted by ΔLaft in the optical axis direction from the surface of the workpiece 41 (S1521).

Similarly to the surface cleaning, in the defocus state, since the diameter D of the pulse laser beam is changed, the formula for calculating the transmittance T of the attenuator 52 at S1540 is as follows. Specifically, the transmittance T is given by $\pi(Daft/2)^2(Fo3aft/Eo3aft)$, where Daft represents the diameter in the defocus state when the shift is made by ΔLaft.

In this state, the irradiation with the pulse laser beam at S1560 is performed. This operation is described with reference to transition diagrams illustrated in FIGS. 17D and 17E. In the focus state illustrated in FIG. 17D, the distance between the light condensing lens 36d and the workpiece 41 is reduced by shifting the light condensing lens 36d by ΔLaft as illustrated in FIG. 17E. In this state, the workpiece 41 is irradiated with the pulse laser beam PL at an absorption line as the wavelength λo2abs to perform the debris cleaning and remove the debris 57.

Then, after the laser irradiation, the laser processing control unit 32B controls the irradiation-area-changing mechanism 61 to execute a step of returning the defocus state to the focus state (S1570). Accordingly, the light condensing lens 36d is returned to the focus state illustrated in FIG. 17F.

4.3 Effect

When the irradiation-area-changing mechanism 61 is provided as in the second embodiment, the irradiation area of the pulse laser beam can be changed between the laser processing and the ozone cleaning. Accordingly, the cleaning area can be increased in the ozone cleaning. In addition, the fluence F can be changed by changing the irradiation area, which leads to high efficiency.

Moreover, unlike a case in which the workpiece 41 is moved in the XY plane as in the modifications of the first embodiment, the movement needs to be performed only in one axial direction, which leads to a simplified operation.

4.4 Modification

In the second embodiment, the light condensing lens 36d is moved, but the XYZ stage 34 may be controlled to move the table 33 on which the workpiece 41 is fixed in the optical axis direction in place of the light condensing lens 36d. With this configuration, the irradiation area can be also changed. In this case, the XYZ stage 34 is included in the irradiation-area-changing mechanism 61.

5. Laser Processing System of Third Embodiment

A laser processing system 2C of a third embodiment illustrated in FIGS. 18 to 27 performs preprocessing before main processing of the laser processing on the workpiece 41 to search for an optimum wavelength λopt of the pulse laser beam used for the main processing between an absorption line and a non-absorption line. Then, the main processing is performed by using the pulse laser beam having the searched optimum wavelength λopt.

When the pulse laser beam at a non-absorption line is used in the laser processing, the laser processing is accurately performed, but debris is generated near the processing position. When the pulse laser beam at an absorption line is used in the laser processing, the light intensity I is decreased and the fluence is destabilized due to light absorption by oxygen, but the effect of ozone cleaning of removing debris is obtained. Thus, the laser processing system of the third embodiment searches for an optimum wavelength at which less debris is generated and a desirable processing state is achieved between an absorption line and a non-absorption line, and uses the pulse laser beam having the optimum wavelength in the main processing. Accordingly, the laser processing and the ozone cleaning can be performed in one process, which leads to reduction of decrease of the laser processing throughput.

5.1 Configuration

Figure 18:
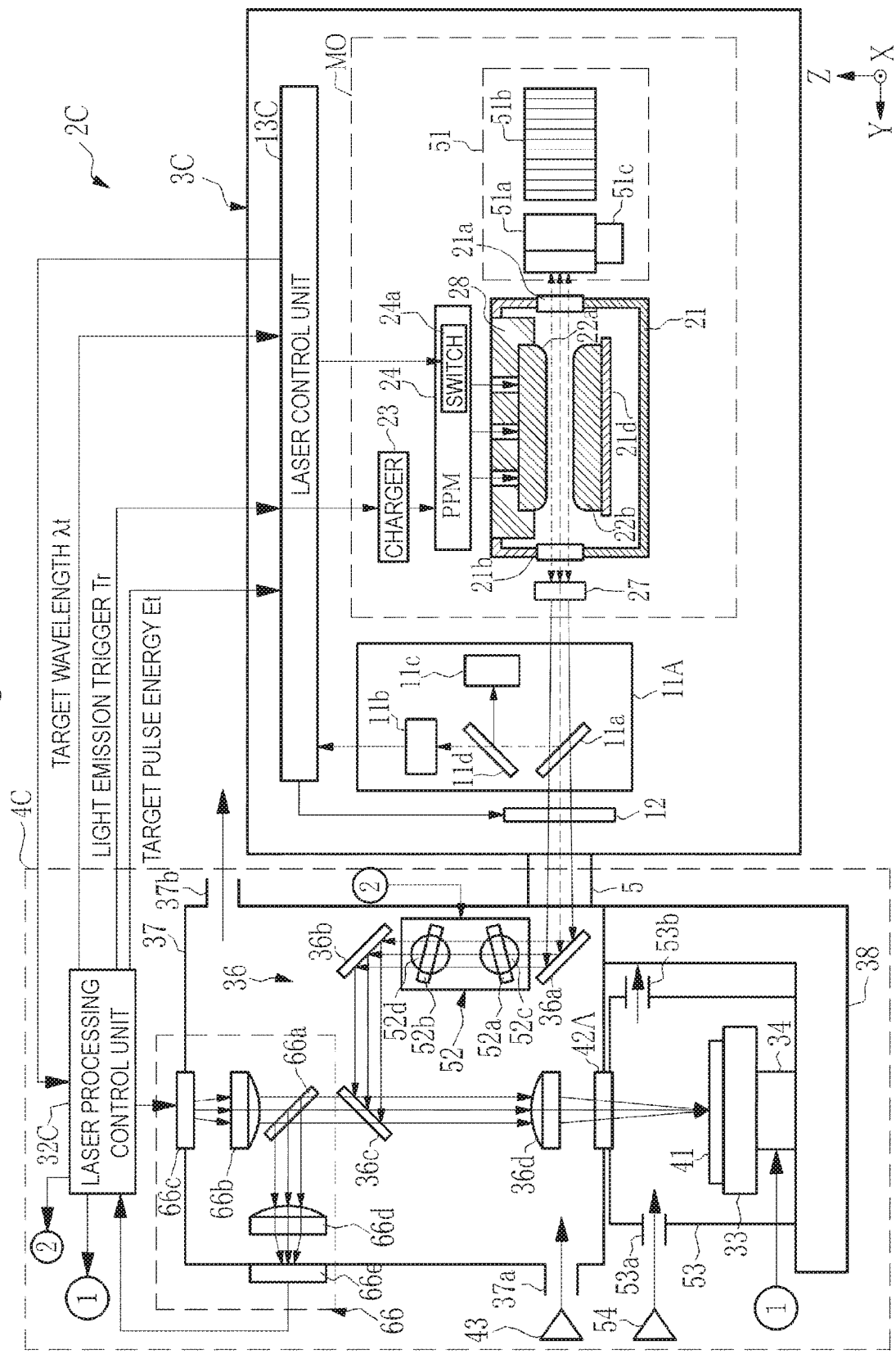
FIG. 18 schematically illustrates the configuration of a laser processing system of a third embodiment.

As illustrated in FIG. 18, the laser processing system 2C includes a laser device 3C and a laser processing device 4C. The laser device 3C includes a laser control unit 13C in place of the laser control unit 13A of the first embodiment. The other configuration of the laser device 3C is same as that of the laser device 3A of the first embodiment. The laser processing device 4C is different from the laser processing device 4A in that an observation device 66 is included and a laser processing control unit 32C is included in place of the laser processing control unit 32A. The other configuration of the laser processing device 4C is same as that of the laser processing device 4A. The following description will be mainly made on any difference from the first embodiment.

In the laser processing system 2C, the laser device 3C is a wavelength-variable laser device capable of changing the wavelength of the pulse laser beam between an absorption line and a non-absorption line and outputting the pulse laser beam. In the preprocessing, the laser control unit 13C changes the wavelength of the laser beam output from the laser device 3C between an absorption line and a non-absorption line. Then, the laser control unit 13C controls the wavelength-variable laser device so that the surface of the workpiece 41 is irradiated with the pulse laser beam at a plurality of wavelengths, while changing the wavelength of the laser beam.

In the laser processing device 4C, the laser processing control unit 32C transmits a control signal to the laser control unit 13C so that the laser control unit 13C outputs the pulse laser beam while changing the wavelength in the preprocessing.

The observation device 66 captures an image of the surface of the workpiece 41 to record an observation image indicating the processing state for each wavelength in the preprocessing performed at the wavelengths. The observation device 66 includes a semi-reflective mirror 66a, a collimator lens 66b, an illumination light source 66c, an imaging lens 66d, and an image sensor 66e. The high reflectance mirror 36c highly reflects the pulse laser beam and transmits visible light emitted by the illumination light source 66c.

The illumination light source 66c emits illumination light that illuminates the surface of the workpiece 41. The illumination light is collimated through the collimator lens 66b. The semi-reflective mirror 66a, the high reflectance mirror 36c, and the light condensing lens 36d are disposed on the optical path of the collimated illumination light. With this configuration, the illumination light is incident on the workpiece 41.

The semi-reflective mirror 66a is disposed to reflect, to the imaging lens 66d, reflected light having been reflected on the surface of the workpiece 41 on the table 33 and transmitted through the light condensing lens 36d and the high reflectance mirror 36c. The imaging lens 66d is disposed so that the incident reflected light is formed on a light-receiving surface of the image sensor 66e. The image sensor 66e is a two-dimensional image sensor.

Figure 19:
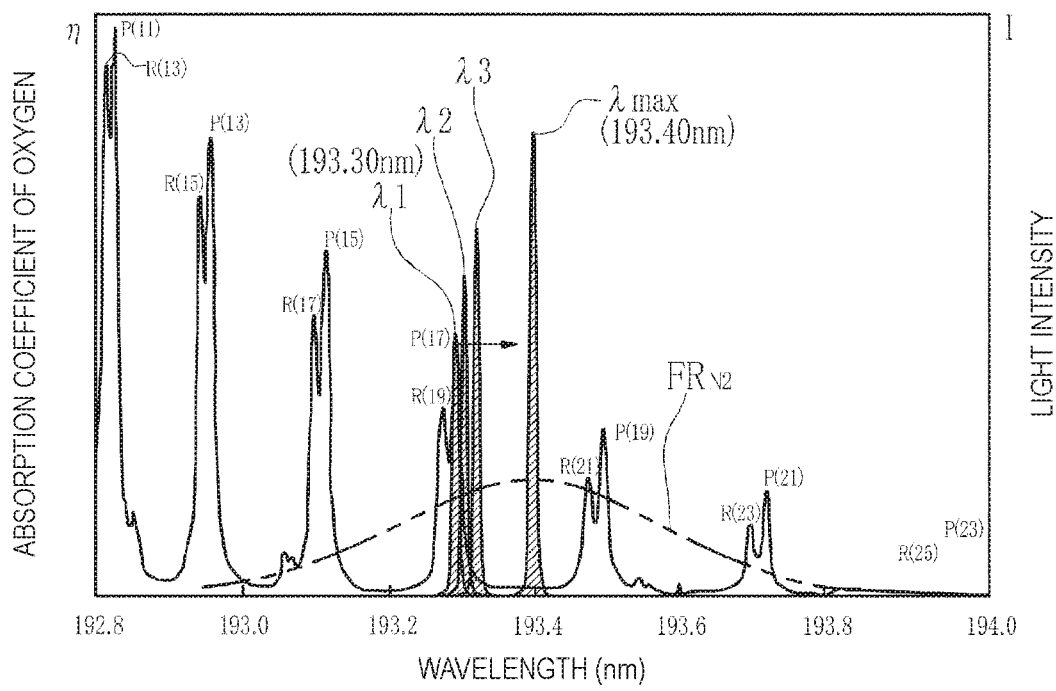
FIG. 19 is an explanatory diagram of optimum wavelength search.

In the preprocessing, the laser processing control unit 32C sequentially transmits a plurality of wavelengths to the laser control unit 13C as the target wavelength $\lambda t$. The wavelengths are, for example, wavelengths $\lambda 1$, $\lambda 2$, $\lambda 3$, . . . , and $\lambda$ max illustrated in FIG. 19. As illustrated in FIG. 19, $\lambda 1$, $\lambda 2$, $\lambda 3$, . . . , and $\lambda$ max are wavelengths shifted from each other by 0.01 nm between the absorption line $\lambda 1$ at 193.30 nm and the non-absorption line $\lambda$ max at 193.40 nm. In this manner, the width $\Delta \lambda$ of wavelength change is set to be 0.01 nm in the present example. The laser control unit 13C controls the laser device 3C to sequentially output the pulse laser beam at the received wavelengths.

5.2 Operation

Figure 20:
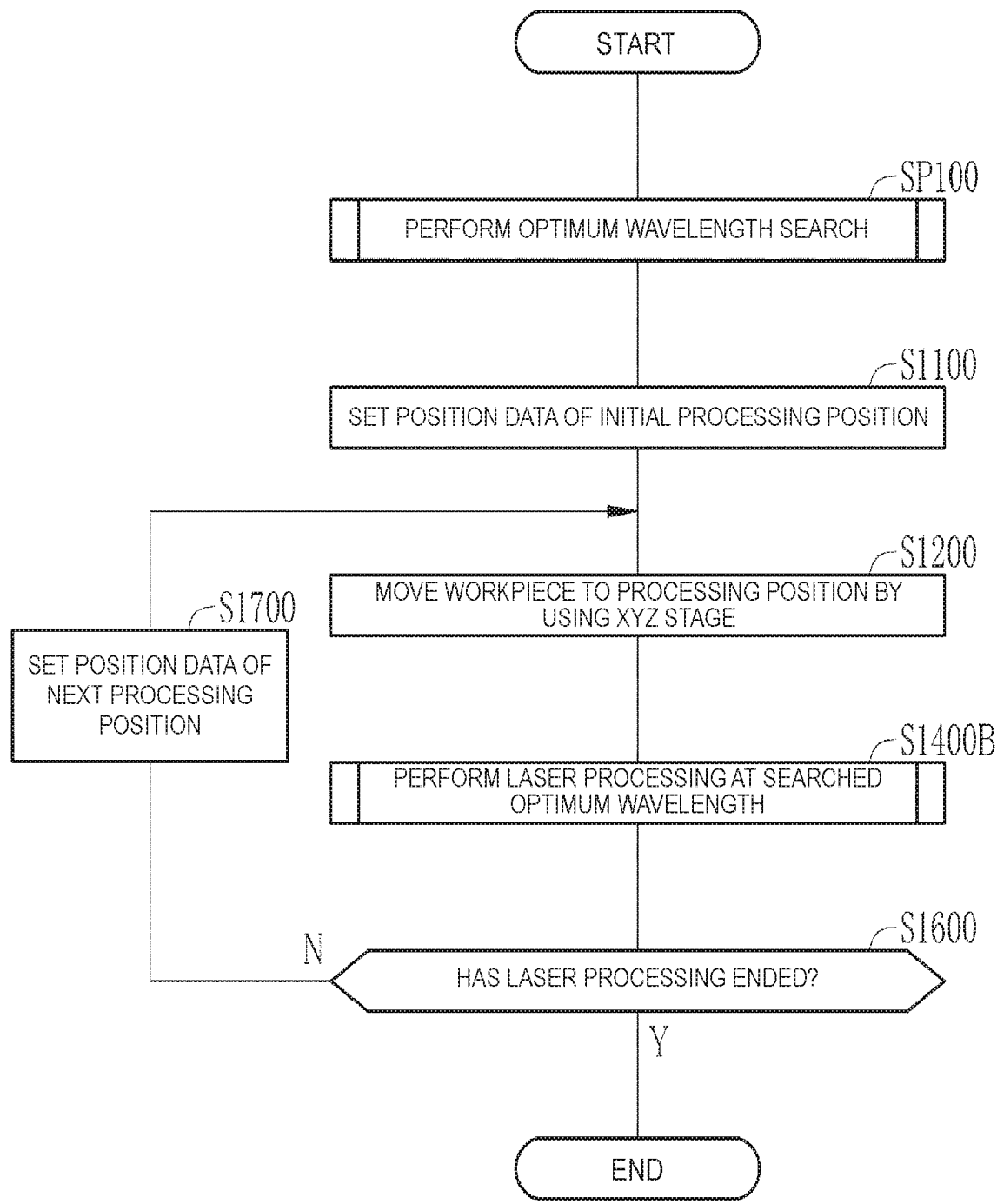
FIG. 20 is a flowchart illustrating a laser processing procedure of the third embodiment.

As illustrated in FIG. 20, the overall operation of the laser processing system 2C starts with an operation to search for an optimum wavelength used in the main processing of the laser processing (SP100).

Figure 21:
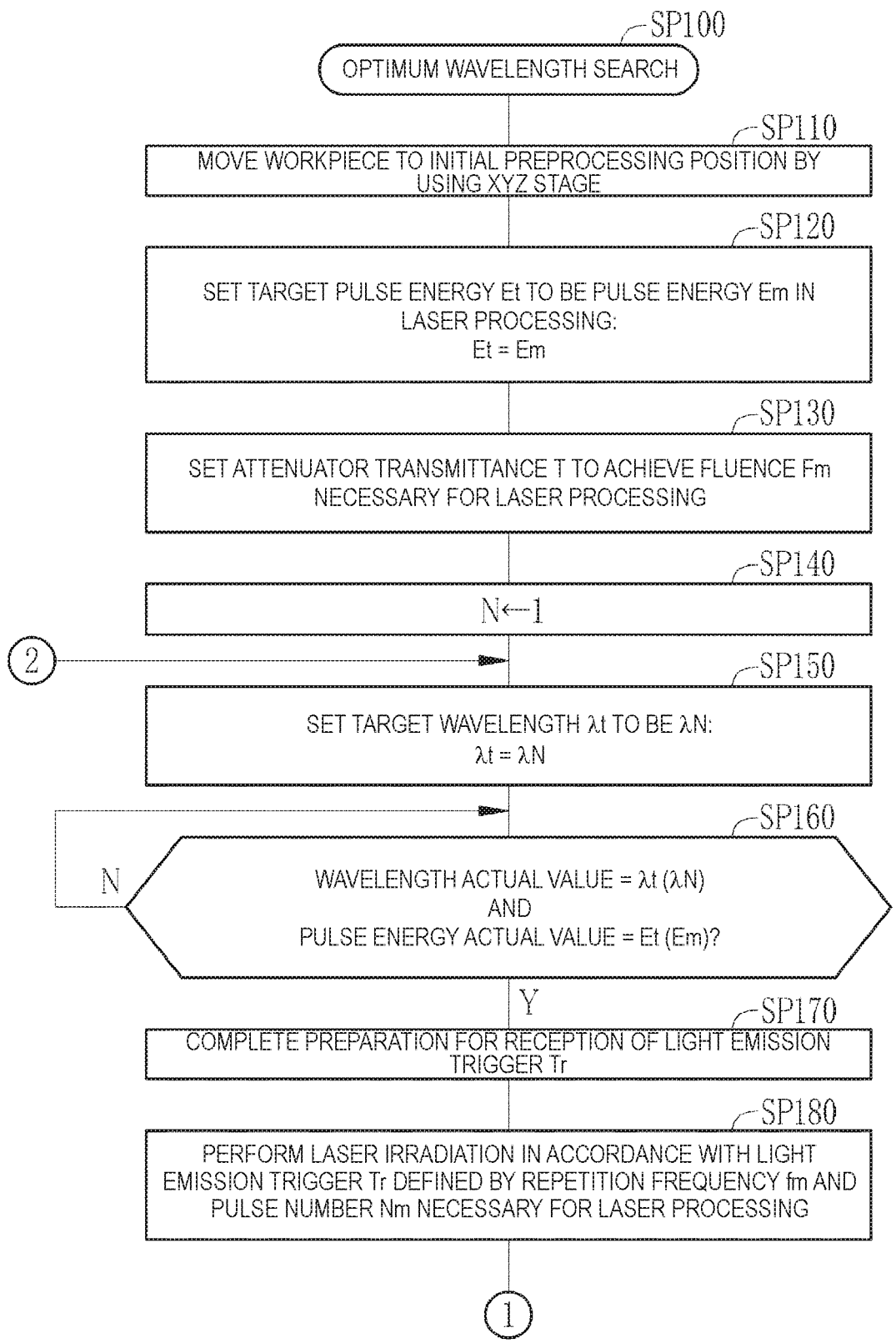
FIG. 21 is the first half of a flowchart illustrating the processing procedure of the optimum wavelength search.
Figure 22:
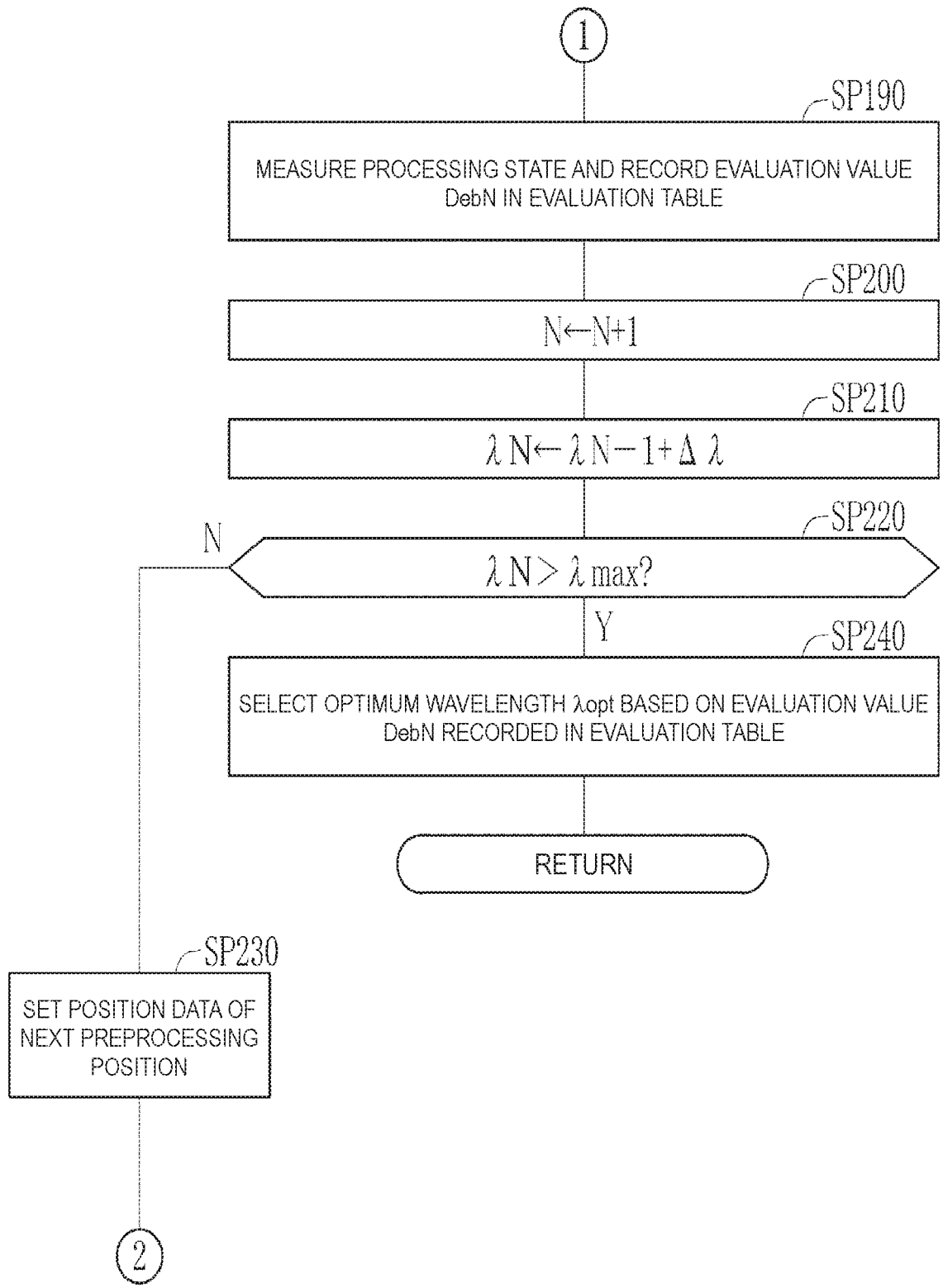
FIG. 22 is the second half of the flowchart illustrating the processing procedure of the optimum wavelength search.

The optimum wavelength search is performed in accordance with a flowchart of SP100 illustrated in FIGS. 21 and 22. At SP110, the laser processing control unit 32C moves the workpiece 41 to an initial preprocessing position by using the XYZ stage 34. A region in which the preprocessing is performed on the surface of the workpiece 41 is a region other than a part at which the main processing is performed on the workpiece 41, such as a peripheral region of the workpiece 41. The preprocessing position is a position at which this region coincides with the irradiation position of the pulse laser beam.

Subsequently at SP120, the laser control unit 13C sets the target pulse energy Et to be the pulse energy Em for the laser processing based on data transmitted from the laser processing control unit 32C. At SP130, the laser processing control unit 32C sets the transmittance T of the attenuator 52 to achieve the fluence Fm necessary for the laser processing.

At SP140, the laser processing control unit 32C sets one to a wavelength number N for a plurality of wavelengths used in the preprocessing. At SP150, the laser control unit 13C sets $\lambda 1$ as the target wavelength $\lambda t$ to be 193.30 nm as the wavelength of an absorption line based on the data from the laser processing control unit 32C. At SP160, the laser control unit 13C closes the shutter 12 and uses an internal trigger to cause the master oscillator MO to perform laser oscillation. Then, when the wavelength actual value is equal to $\lambda 1$ and the pulse energy actual value is equal to Em (Y at SP160), the laser control unit 13 opens the shutter 12 and transmits, to the laser processing control unit 32C, a signal indicating completion of preparation for reception of the light emission trigger Tr (SP170).

Having received the reception preparation completion signal, the laser processing control unit 32C transmits, to the laser control unit 13C, the light emission trigger Tr defined by the repetition frequency fm and the pulse number Nm necessary for the laser processing. In accordance with the light emission trigger Tr, the laser control unit 13C controls the master oscillator MO to output the pulse laser beam at $\lambda 1$. Accordingly, the pulse laser beam at $\lambda 1$ is input to the laser processing device 4C. The workpiece 41 is irradiated with the pulse laser beam at $\lambda 1$, thereby performing the preprocessing (SP180).

As illustrated in FIG. 22, after the preprocessing is performed, the observation device 66 measures the processing state in the preprocessing with the pulse laser beam at $\lambda 1$. The observation device 66 captures an image of the surface of the workpiece 41 through the image sensor 66e to record an observation image indicating the processing state of the preprocessing. The observation image is stored in a data storage such as a memory (not illustrated). Then, the laser processing control unit 32C evaluates the processing state of the preprocessing with the pulse laser beam at $\lambda 1$ based on the recorded observation image, and records an evaluation value Deb1 in an evaluation value table produced in the memory (SP190).

After the recording of the evaluation value Deb1 for $\lambda 1$ ends, the laser processing control unit 32C adds one to the wavelength number N (SP200). At SP210, the laser processing control unit 32C sets the wavelength $\lambda N$ to be a wavelength obtained by adding $\Delta \lambda$ to the wavelength $\lambda N-1$. For example, after the recording of the evaluation value Deb1 for $\lambda 1$ ends, one is added to N. The wavelength number N is 1 right after the preprocessing at the initial processing position ends, and becomes 2 through the addition of one. Then, since the wavelength number N is 2, the value N−1 is 1 (=2−1) at SP210. Thus, the wavelength $\lambda 2$ is set to be a wavelength obtained by adding $\Delta \lambda$ to the wavelength $\lambda 1$. Since $\lambda 1$ is 193.30 nm and $\Delta \lambda$ is 0.01 nm, $\lambda 2$ is 193.31 nm.

When $\lambda N$ set at SP210 is equal to or smaller than $\lambda$ max (N at SP220), the laser processing control unit 32C sets position data of the next preprocessing position (SP230). Then, the laser processing control unit 32C controls the XYZ stage 34 to move the workpiece 41 to the next preprocessing position. At the next preprocessing position, steps SP150 to SP190 are executed. In a case of $\lambda N=\lambda 2$, the laser processing control unit 32C records an evaluation value Deb2 for $\lambda 2$ in the evaluation value table.

Figure 23A:
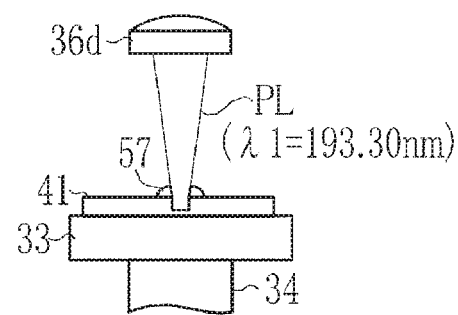
FIGS. 23A to 23D are explanatory diagrams illustrating wavelength change in the optimum wavelength search. Wavelength $\lambda 1$ is used in FIG. 23A, wavelength $\lambda 2$ is used in FIG. 23B, wavelength $\lambda 3$ is used in FIG. 23C, and wavelength $\lambda 4$ is used in FIG. 23D.
Figure 23B:
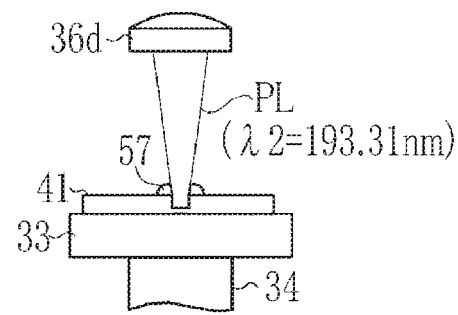
Figure 23C:
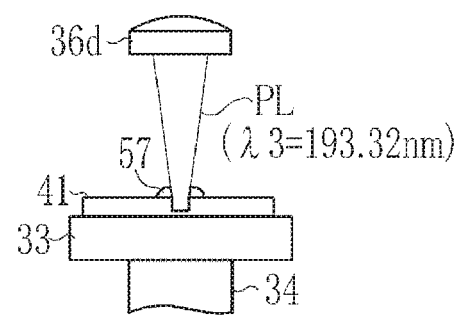
Figure 23D:
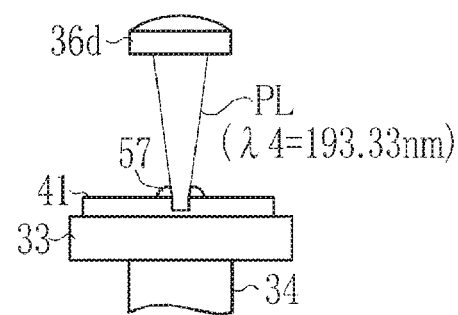

The preprocessing is performed each time the wavelength is changed by 0.01 nm to, for example, $\lambda 1=193.30$ nm illustrated in FIG. 23A, $\lambda 2=193.31$ nm illustrated in FIG. 23B, $\lambda 3=193.32$ nm illustrated in FIG. 23C, and $\lambda 4=193.33$ nm illustrated in FIG. 23D. As a result, the evaluation value Deb1, Deb2, Deb3, Deb4, . . . for the respective wavelengths are recorded in an evaluation value table 67 as illustrated in FIG. 24. In the preprocessing, the recording of the evaluation value DebN is repeated until $\lambda N$ exceeds $\lambda$ max (Y at SP220).

In this manner, the XYZ stage 34 moves, under control of the laser processing control unit 32C, the irradiation position of the laser beam with which the surface of the workpiece 41 is irradiated each time the wavelength changes in the preprocessing. Since the preprocessing position is automatically changed, the evaluation value recording is easily performed.

Figure 25:
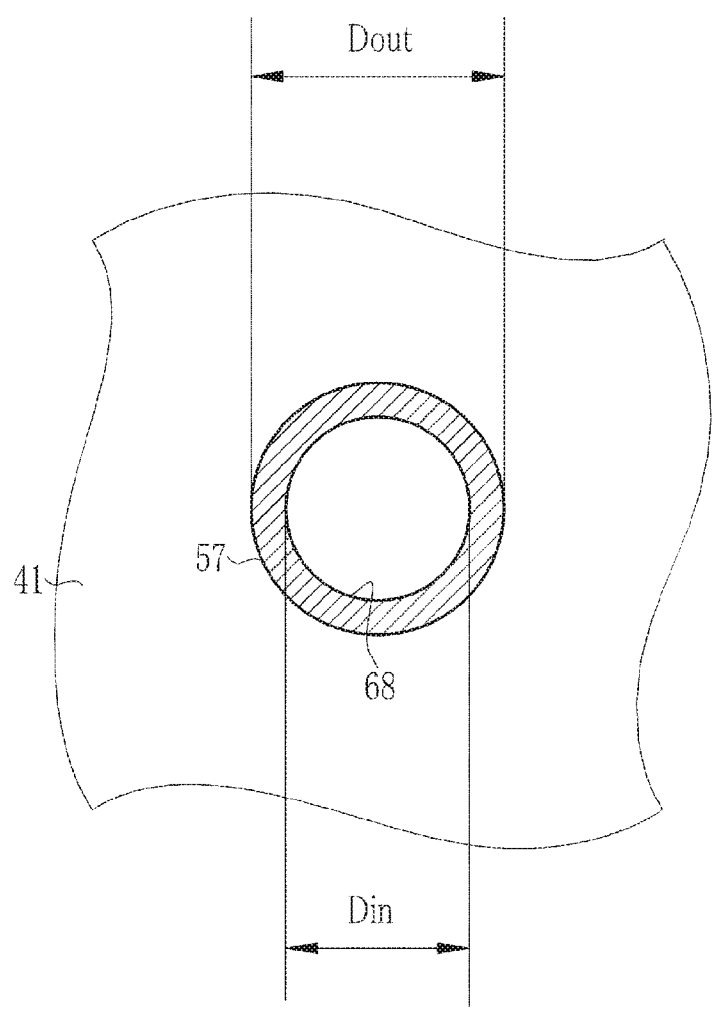
FIG. 25 is an explanatory diagram illustrating an exemplary evaluation value calculation method.

In FIG. 25, reference sign 68 denotes a processing hole processed on the surface of the workpiece 41 through irradiation with the pulse laser beam, and reference sign 57 denotes debris generated around the processing hole 68. The evaluation value DebN is defined by, for example, Expression (4) below.

$$\text{Evaluation value } DebN=(Dout-Din)/D0 \qquad (4)$$

In the expression, D0 represents the diameter of the pulse laser beam, Din represents the diameter of the processing hole 68, and Dout represents the diameter of the debris 57 generated around the processing hole 68.

The value Dout−Din represents the difference between the diameter of the debris 57 and the diameter of the processing hole 68, and indicates the width of the debris 57. The smaller width of the debris 57 indicates a more desirable processing state. Thus, higher evaluation is obtained as the evaluation value DebN calculated by Expression (4) is smaller.

The laser processing control unit 32C selects the optimum wavelength λopt used in the main processing to be a wavelength with which the evaluation value DebN is minimum with reference to the evaluation value table 67 (SP240). The laser processing control unit 32C corresponds to an optimum wavelength selection unit configured to select the optimum wavelength λopt used in the main processing based on the observation image.

In FIG. 20, after the optimum wavelength search (SP100) ends, the laser processing control unit 32C performs the main processing. Similarly to S1100 and S1200 illustrated in FIG. 7, the laser processing control unit 32C sets position data of an initial processing position to the XYZ stage 34 (S1100), and moves the workpiece 41 to the initial laser processing position by using the XYZ stage 34 (S1200). After the positioning of the workpiece 41 ends, the main processing of the laser processing is performed at the searched optimum wavelength λopt (S1400B).

Figure 26:
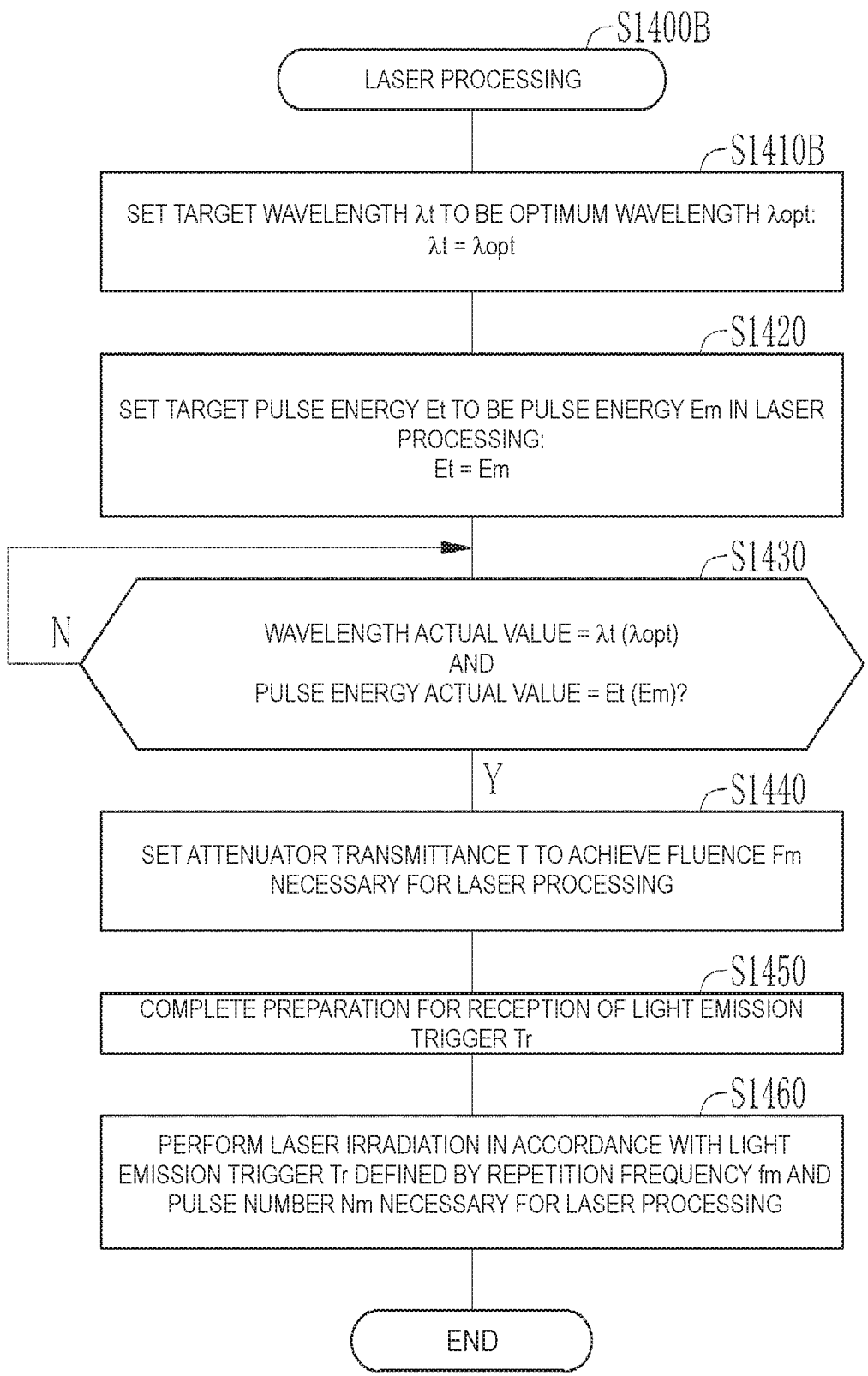
FIG. 26 is a flowchart illustrating the processing procedure of laser processing at an optimum wavelength.

FIG. 26 is a flowchart illustrating the procedure of the laser processing at S1400B. The laser control unit 13C sets the target wavelength λt to be the optimum wavelength λopt at S1410B, and sets the target pulse energy Et to be the pulse energy Em for the laser processing at S1420. The procedure of S1420 to S1460 is same as that in the flowchart of the first embodiment illustrated in FIG. 9.

5.3 Effect

Since the optimum wavelength λopt at which less debris is generated and a desirable processing state is achieved is searched between an absorption line and a non-absorption line and the main processing of the laser processing is performed at the optimum wavelength λopt, the laser processing and the ozone cleaning can be performed in one process. Accordingly, decrease of the laser processing throughput can be reduced.

Since the optimum wavelength λopt is searched while the wavelength is changed between an absorption line and a non-absorption line, the amount of light absorption by oxygen can be adjusted through the wavelength selection. Thus, the generation amount of ozone can be adjusted without adjusting the concentration of oxygen in the processing space for the workpiece 41. Accordingly, distortion of the wavefront of the pulse laser beam due to light absorption by oxygen can be reduced through the wavelength selection. For this reason, the present example is effective when CDA in which the mixture ratio of oxygen cannot be changed is used as oxygen gas. A CDA supply source may be, for example, a gas supply source configured to remove impurity gas of, for example, particles and water from gas in air through a mechanical filter and molecular sieves, and supply the remaining gas as CDA.

Since the optimum wavelength λopt is selected by evaluating the processing state of the preprocessing, a clean processing state can be achieved.

In the present example, Δλ as the width of wavelength change is 0.01 nm, but may be larger or smaller than 0.01 nm.

5.4 Others

In the present example, the observation device 66 is used to measure the processing state, but the processing state may be measured by using a microscope in place of the observation device 66. The microscope may be included in the laser processing system 2C. In this case, after provided with the preprocessing in the laser processing system 2C, the workpiece 41 is positioned to the position of measurement by the microscope, for example, under control of the XYZ stage 34. After the workpiece 41 is positioned to the measurement position, the processing state of the workpiece 41 is measured by the microscope. When the microscope is used, a high-definition observation image indicating the processing state can be obtained unlike a case in which the observation device 66 is used, and thus the evaluation can be performed at higher accuracy.

In the present example, the evaluation value DebN is evaluated based on the diameter of the processing hole 68 and the diameter of the debris 57, but may be evaluated based on area. An evaluation value Deb#ar#N based on area is defined by Expression (5) below.

$$\text{Evaluation value Deb\#ar\#}N = Sm/Snd \quad (5)$$

Figure 27:
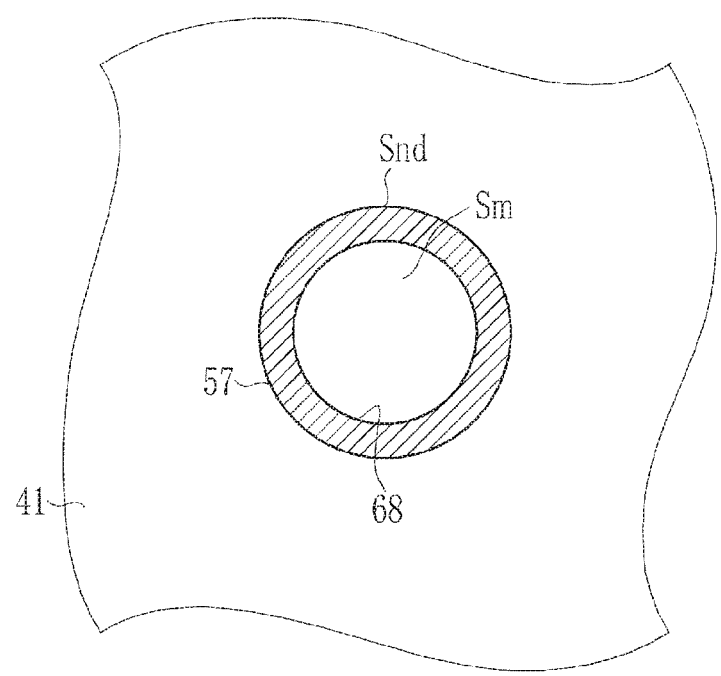
FIG. 27 is an explanatory diagram illustrating another exemplary evaluation value calculation method.

In the expression, as illustrated in FIG. 27, Sm represents a processing area Sm of the processing hole 68, and Snd represents the total area of the processing area Sm and the area of the debris 57.

In this case, the area of the debris 57 is smaller as the processing area Sm is larger relative to the total area Snd, and thus a larger evaluation value indicates higher evaluation. The laser processing control unit 32C selects the optimum wavelength λopt to be a wavelength at which the evaluation value is maximum.

Through this evaluation based on area, the processing state can be appropriately evaluated when a processing shape is a non-circular shape such as a rectangular shape or a line shape.

6. Modification of Laser Processing Device

The laser processing device in each above-described embodiment can be modified in various manners. For example, the laser processing device may be laser processing devices illustrated in FIGS. 28 to 31.

6.1 Modification 1

Figure 28:
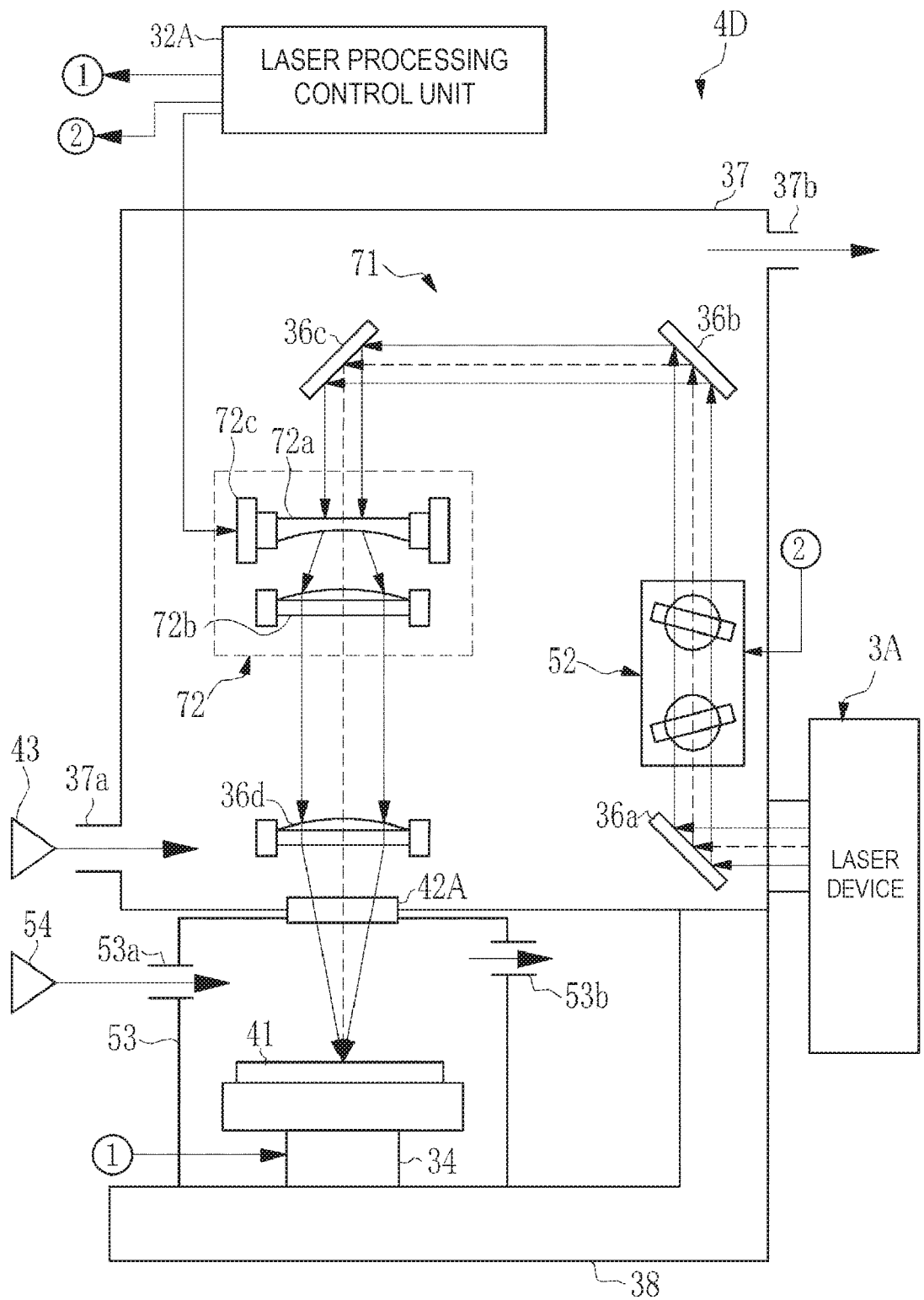
FIG. 28 is an explanatory diagram of Modification 1 of a laser processing device.

A laser processing device 4D of Modification 1 illustrated in FIG. 28 includes an optical system 71 in place of the optical system 36 of the laser processing device 4A of the first embodiment, and the other configuration thereof is same as that of the laser processing device 4A. The following description will be mainly made on any difference from the first embodiment.

The optical system 71 includes an irradiation-area-changing mechanism 72 in addition to the configuration of the optical system 36. The irradiation-area-changing mechanism 72 includes a concave lens 72a, a convex lens 72b, and a one-axis stage 72c. The one-axis stage 72c holds the concave lens 72a, and adjusts the distance between the concave lens 72a and the convex lens 72b by moving the concave lens 72a in the optical axis direction. The concave lens 72a and the convex lens 72b are disposed on the optical path of the pulse laser beam between the high reflectance mirror 36c and the light condensing lens 36d. The pulse laser beam reflected at the high reflectance mirror 36c is incident on the light condensing lens 36d through the concave lens 72a and the convex lens 72b.

The diameter D of a pulse laser beam incident on the surface of the workpiece 41 can be changed by adjusting the distance between the concave lens 72a and the convex lens 72b. When the laser processing is performed on the workpiece 41, the laser processing control unit 32A moves the concave lens 72a through the one-axis stage 72c so that the focal positions of the concave lens 72a and the convex lens 72b coincide with each other. When the ozone cleaning is performed on the workpiece 41, the laser processing control unit 32A moves the concave lens 72a through the one-axis stage 72c so that the distance between the concave lens 72a and the convex lens 72b is shorter than the distance therebetween in the laser processing by a predetermined distance.

Accordingly, the diameter D in the ozone cleaning can be made larger than the diameter D in the laser processing. Since the irradiation area is changed by adjusting the diameter, a cleaning region can be increased in the ozone cleaning. In addition, the fluence can be controlled by changing the irradiation area.

6.2 Modification 2

Figure 29:
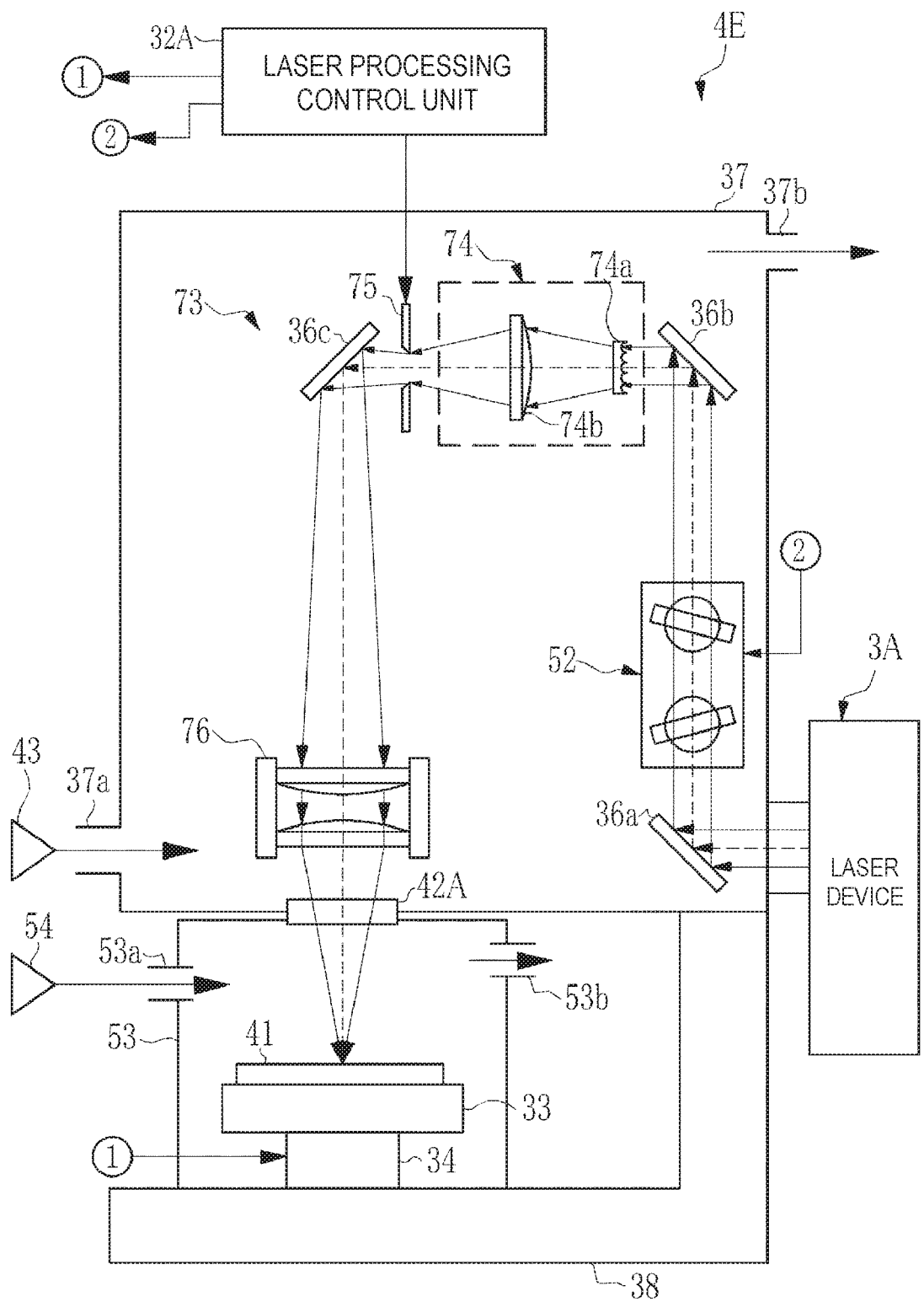
FIG. 29 is an explanatory diagram of Modification 2 of the laser processing device.

A laser processing device 4E of Modification 2 illustrated in FIG. 29 includes an optical system 73 in place of the optical system 36 of the laser processing device 4A of the first embodiment, and the other configuration thereof is same as that of the laser processing device 4A. The following description will be mainly made on any difference from the first embodiment.

The optical system 73 has a configuration in which a beam homogenizer 74 and a variable slit 75 are additionally provided to the configuration of the optical system 36 and a transfer lens 76 is provided in place of the light condensing lens 36d. With this configuration, the optical system 73 functions as a transfer optical system.

The beam homogenizer 74 and the variable slit 75 are disposed on the optical path between the high reflectance mirrors 36b and 36c. The beam homogenizer 74 includes a fly-eye lens 74a and a condenser lens 74b. The beam homogenizer 74 is disposed to perform Koehler illumination of the variable slit 75 by homogenizing light intensity distribution of the pulse laser beam reflected at the high reflectance mirror 36b. The variable slit 75 includes a slit that transmits light and is capable of changing the size of the slit. The variable slit 75 can adjust the size of the slit in accordance with the dimension of processing on the workpiece 41. The size of the slit of the variable slit 75 is controlled by the laser processing control unit 32A.

The pulse laser beam, the light intensity of which is homogenized by the beam homogenizer 74 is incident on the variable slit 75. As the pulse laser beam transmits through the slit of the variable slit 75, image light is formed in accordance with the shape of the slit. This image light is incident on the transfer lens 76 through the high reflectance mirror 36c. The transfer lens 76 transfers a slit image in accordance with the shape of the slit of the variable slit 75 by forming the slit image on the surface of the workpiece 41 through the window 42A. Accordingly, the surface of the workpiece 41 can be processed into a shape in accordance with the slit of the variable slit 75.

In the present example, the variable slit 75 may be replaced with, for example, a mask on which a plurality of holes having desired shapes are formed. In this case, the holes can be simultaneously processed on the surface of the workpiece 41.

In the present example, the size of the slit of the variable slit 75 in, for example, the ozone cleaning may be increased from that in the laser processing to increase the irradiation area of the pulse laser beam. When a mask is used in the laser processing, the mask may be removed in the ozone cleaning to increase the irradiation area of the pulse laser beam. The mask removal is performed through, for example, a mask stage controllable by the laser processing control unit 32A. The fluence in the ozone cleaning can be controlled by adjusting the transmittance T of the attenuator 52 in accordance with the increased irradiation area.

6.3 Modification 3

Figure 30:
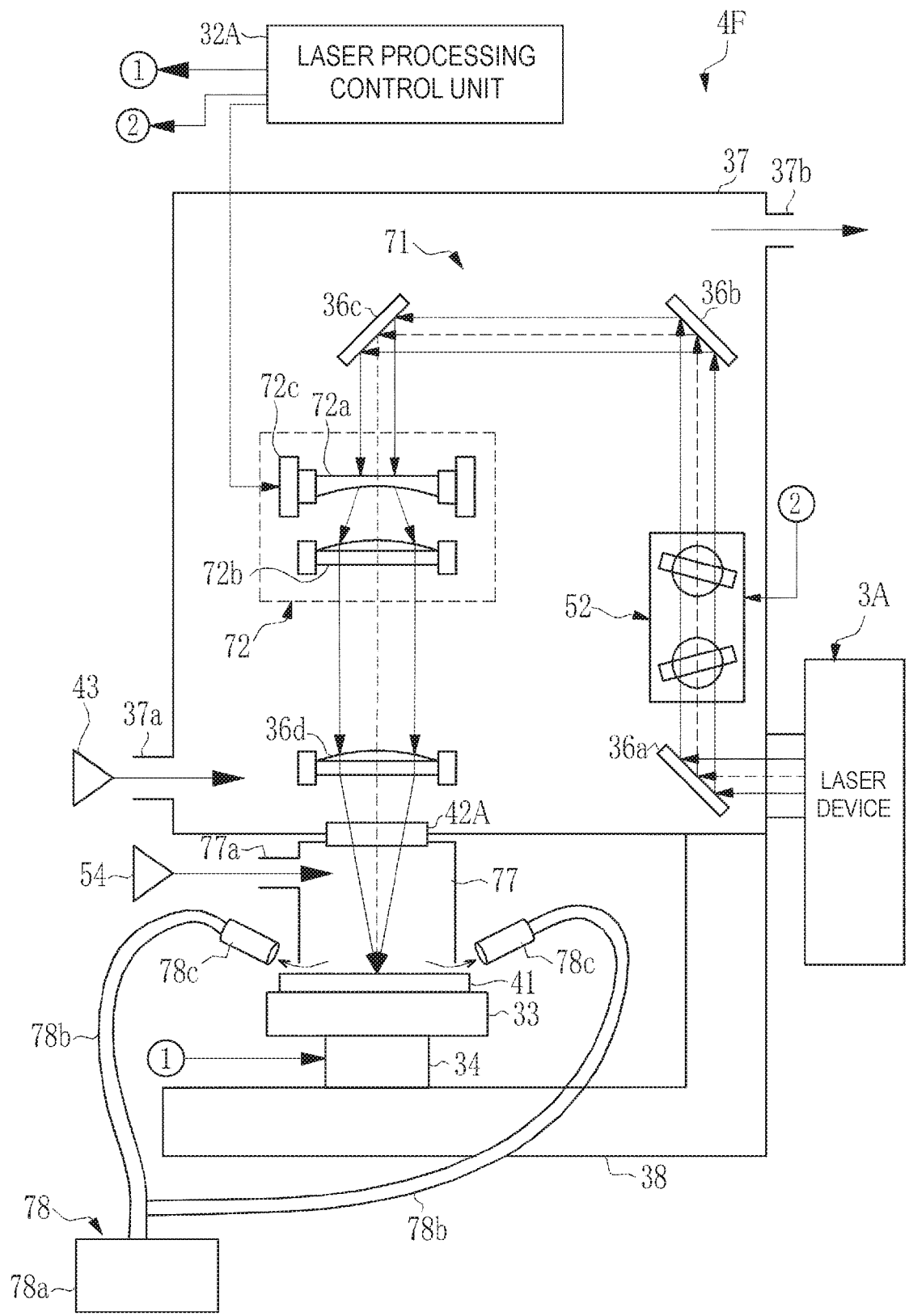
FIG. 30 is an explanatory diagram of Modification 3 of the laser processing device.

A laser processing device 4F of Modification 3 illustrated in FIG. 30 includes a small-sized shield 77 in place of the shield 53 of the laser processing device 4D of Modification 1 illustrated in FIG. 28, and additionally includes an exhaust device 78. The other configuration is same as that of the laser processing device 4D illustrated in FIG. 28, and the following description will be mainly made on any difference from the laser processing device 4D.

Unlike the shield 53, the shield 77 does not entirely enclose the table 33 and the XYZ stage 34, but encloses a part of the workpiece 41 including a processing position. The shield 77 is provided with an intake port 77a. Similarly to the intake port 53a, the intake port 77a corresponds to a gas supply inlet of oxygen gas from the oxygen gas supply source 54. The shield 77 has, for example, a cylindrical shape. In the shield 77, a cutout is formed at part of a lower end part of the cylinder shape so that a gap is provided between the part and the surface of the workpiece 41. The gap functions as a discharge port through which gas in the shield 77 is discharged.

The exhaust device 78 includes a body unit 78a including a suction pump, a pipe 78b, and a suction nozzle 78c provided at a leading end of the pipe 78b. The suction nozzle 78c is disposed so that a suction port thereof faces to the gap that functions as a discharge port.

Oxygen gas is supplied from the oxygen gas supply source 54 to the shield 77 through the intake port 77a. In the ozone cleaning in which the pulse laser beam at an absorption line is used, ozone is generated in the shield 77 through reaction between the pulse laser beam and oxygen. The exhaust device 78 sucks gas containing ozone in the shield 77 through the suction nozzle 78c disposed at the discharge port. The sucked gas is collected by the body unit 78a. The exhaust device 78 is provided to reliably collect ozone.

Figure 31:
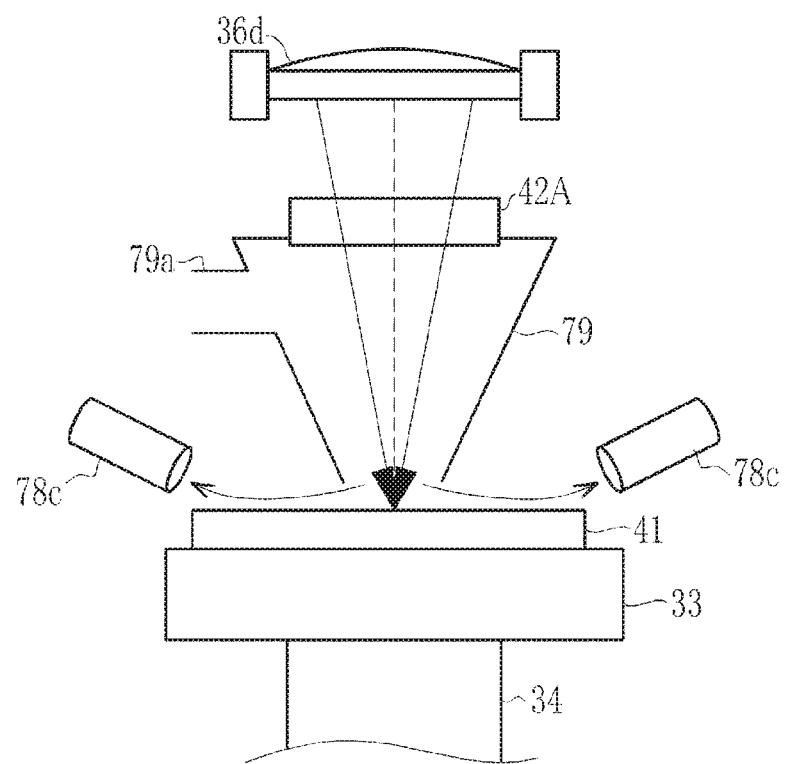
FIG. 31 is an explanatory diagram of a modification of a shield.

In the laser processing device 4F illustrated in FIG. 30, the shield 77 having a cylindrical shape is used, but a shield 79 having a circular cone shape as illustrated in FIG. 31 may be used. The shield 79 includes a suction port 79a, and has a diameter tapered toward a lower end part facing to the surface of the workpiece 41.

7. Modifications of Laser Device

In each above-described embodiment, the laser device corresponding to the wavelength-variable laser device can be modified in various manners. For example, the laser device may be laser devices illustrated in FIGS. 32 to 34.

7.1 Modification 1

Figure 32:
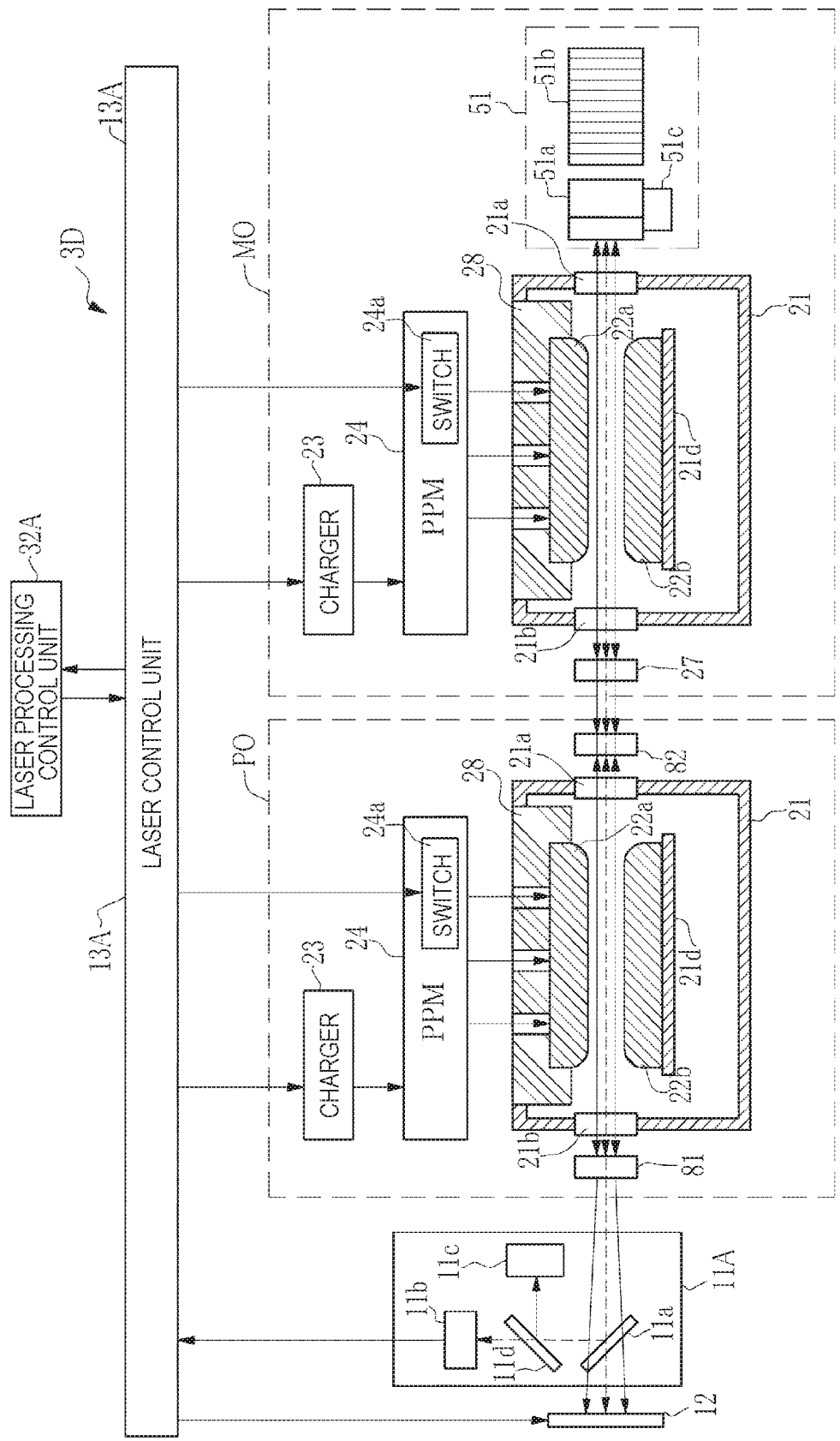
FIG. 32 is an explanatory diagram of Modification 1 of a laser device.

A laser device 3D of Modification 1 illustrated in FIG. 32 includes a power oscillator PO corresponding to an amplifier in addition to the configuration of the laser device 3A of the first embodiment, and the other configuration thereof is same as that of the laser device 3A. The power oscillator PO is disposed on the optical path of the pulse laser beam between the master oscillator MO and the monitor module 11. The power oscillator PO is an amplifier configured to amplify the energy of the pulse laser beam output from the master oscillator MO.

The power oscillator PO has a basic configuration same as that of the master oscillator MO, and similarly to the master oscillator MO, includes the laser chamber 21, the charger 23, and the pulse power module (PPM) 24. The power oscillator PO includes a Fabry-Perot optical resonator including an output coupling mirror 81 and a rear mirror 82. The output coupling mirror 81 and the rear mirror 82 reflect part of the pulse laser beam and transmit part thereof. The reflectance of the output coupling mirror 81 is, for example, 10% to 30% approximately, and the reflectance of the rear mirror 82 is, for example, 80% to 90% approximately.

When having received data of the target pulse energy Et and the target wavelength λt from the laser processing control unit 32A, the laser control unit 13A controls the charging voltage of the charger 23 and the line narrowing module 51 so that laser oscillation is performed at the target values.

When having received the light emission trigger Tr from the laser processing control unit 32A, the laser control unit 13A controls the master oscillator MO to perform laser oscillation. In addition, the laser control unit 13A controls the power oscillator PO to operate in synchronization with the master oscillator MO. The laser control unit 13A turns on the switch 24a of the pulse power module 24 of the power oscillator PO so that electric discharge occurs when the pulse laser beam output from the master oscillator MO is incident on the electric discharge space in the laser chamber 21 of the power oscillator PO. As a result, the pulse laser beam incident on the power oscillator PO is subjected to amplified oscillation at the power oscillator PO.

The pulse energy and the wavelength of the pulse laser beam output after the amplification at the power oscillator PO are measured by the monitor module 11. The laser control unit 13A controls the charging voltage of the charger 23 and the line narrowing module 51 of the master oscillator MO so that the measured pulse energy actual value and the measured wavelength actual value become closer to the target pulse energy Et and the target wavelength λt, respectively.

When the shutter 12 is opened, the pulse laser beam having transmitted through the beam splitter 11a of the monitor module 11 is incident on the laser processing device 4.

When the power oscillator PO is provided as an amplifier like the laser device 3D, the pulse laser beam can have high pulse energy. The high pulse energy is needed in the laser processing in many cases. When the pulse laser beam subjected to line narrowing is used in the laser processing as in the present example, the pulse energy decreases as compared to a case in which the pulse laser beam of spontaneous oscillation is used. Thus, it is effective to provide an amplifier capable of increasing the pulse energy.

In the present example, an amplifier including a Fabry-Perot resonator as an optical resonator is used, but an amplifier including a ring resonator may be used.

7.2 Modification 2

Figure 33:
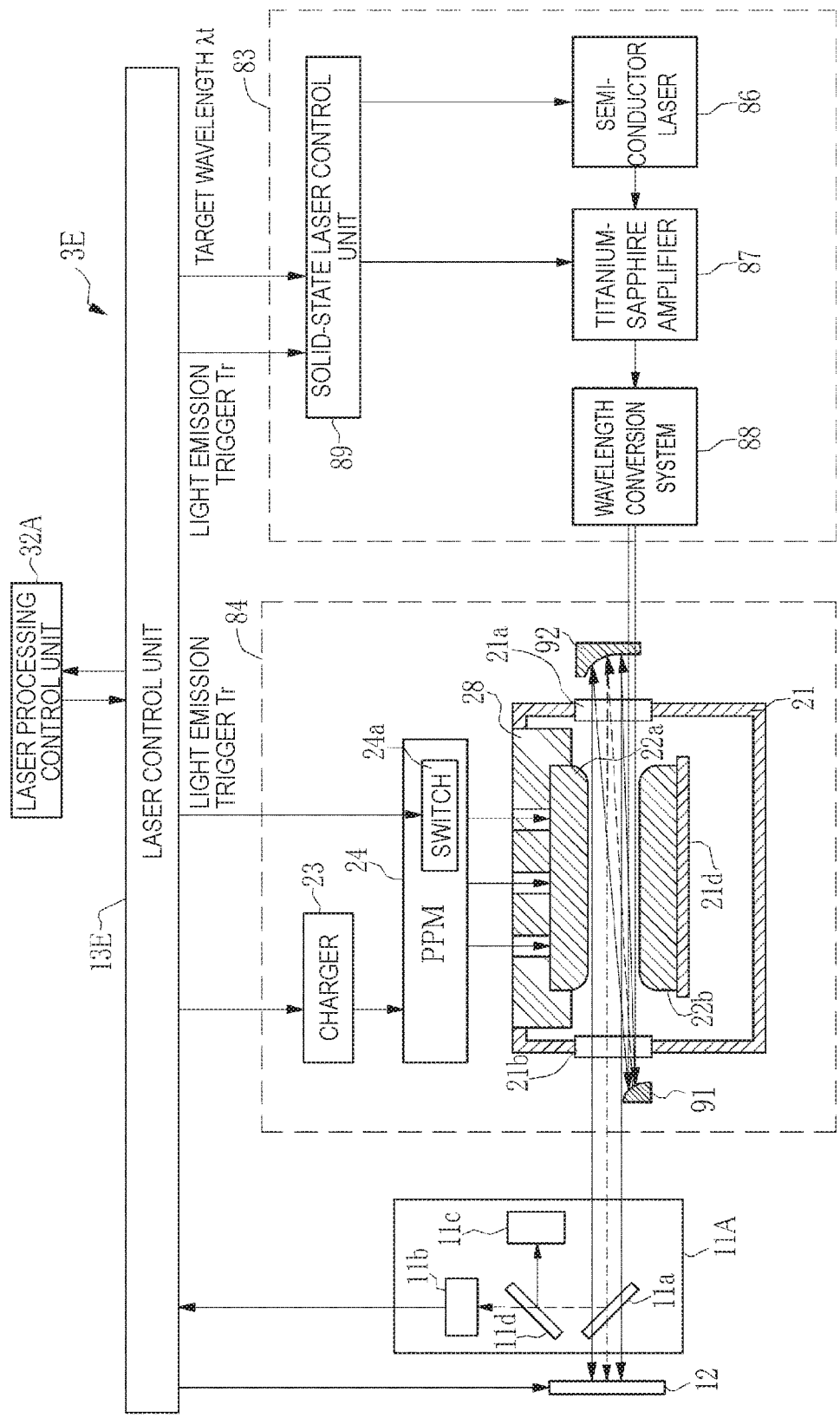
FIG. 33 is an explanatory diagram of Modification 2 of the laser device.

A laser processing system may include a laser device 3E of Modification 2 illustrated in FIG. 33. The laser device 3E includes a master oscillator 83 and an amplifier 84. The monitor module 11 is same as that of the laser device 3A of the first embodiment. The master oscillator 83 is a solid-state laser device including a semiconductor laser 86 configured to output a seed beam, a titanium-sapphire amplifier 87 configured to amplify the seed beam, and a wavelength conversion system 88.

The semiconductor laser 86 is a distributed-feedback semiconductor laser configured to output, as the seed beam, a continuous wave (CW) laser beam that is a continuously oscillating laser beam having a wavelength of 773.6 nm. The oscillation wavelength can be changed by changing temperature setting of the semiconductor laser 86.

The titanium-sapphire amplifier 87 includes a titanium-sapphire crystal (not illustrated) and a pumping pulse laser device (not illustrated). The titanium-sapphire crystal is disposed on the optical path of the seed beam. The pumping pulse laser device outputs the second harmonic light of a YLF laser.

The wavelength conversion system 88 generates the fourth harmonic light and includes an LBO ($LiB_3O_5$) crystal and a KBBF ($KBe_2BO_3F_2$) crystal. Each crystal is disposed on a rotation stage (not illustrated) so that the incident angle of the seed beam on the crystal can be changed.

Similarly to the power oscillator PO illustrated in FIG. 32, the amplifier 84 includes the pair of electrodes 22a and 22b, the laser chamber 21 containing ArF laser gas as a laser medium, the pulse power module 24, and the charger 23. Unlike the power oscillator PO, the amplifier 84 includes a convex mirror 91 and a concave mirror 92 in place of the output coupling mirror 81 and the rear mirror 82.

The convex mirror 91 and the concave mirror 92 are disposed so that the pulse laser beam output from the master oscillator 83 is enlarged while passing through the electric discharge space of the laser chamber 21 three times through reflection at the convex mirror 91 and the concave mirror 92.

When having received the target wavelength λt and the target pulse energy Et from the laser processing control unit 32A, a laser control unit 13E transmits the target wavelength λt to a solid-state laser control unit 89 of the master oscillator 83. The charging voltage of the charger 23 of the amplifier 84 is set so that the target pulse energy is achieved.

When having received the target wavelength λt from the laser control unit 13E, the solid-state laser control unit 89 changes an oscillation wavelength λa1 of the semiconductor laser 86 so that the wavelength of the seed beam output from the wavelength conversion system 88 becomes equal to the target wavelength λt. The oscillation wavelength λa1 is set to be four times longer than the target wavelength λt, that is, λa1=4λt. Since the target wavelength λt is 193.40, λa1 is 773.6 nm (=193.4×4).

The solid-state laser control unit 89 controls the rotation stages (not illustrated) to set the incident angles of the laser beam on the LBO crystal and the KBBF crystal so that the wavelength conversion efficiencies of the crystals are maximum in the wavelength conversion system 88.

When having received the light emission trigger Tr from the laser control unit 13E, the solid-state laser control unit 89 transmits a trigger signal to the pumping pulse laser device of the titanium-sapphire amplifier 87. In the titanium-sapphire amplifier 87, the pumping pulse laser device converts a CW laser beam as the input seed beam into a pulse laser beam based on the trigger signal, and outputs the pulse laser beam. The pulse laser beam output from the titanium-sapphire amplifier 87 is input to the wavelength conversion system 88. The wavelength conversion system 88 performs wavelength conversion of the pulse laser beam at λa1 into a pulse laser beam at the target wavelength λt as the fourth harmonic light, and outputs the converted pulse laser beam.

When having received the light emission trigger Tr from the laser processing control unit 32A, the laser control unit 13E turns on the switch 24a of the pulse power module 24 so that electrical discharge occurs when the pulse laser beam output from the master oscillator 83 is incident on the electric discharge space of the laser chamber 21 of the amplifier 84.

As a result, the pulse laser beam incident on the amplifier 84 from the master oscillator 83 is amplified in the laser chamber 21 while passing through the electric discharge space three times by the effects of the convex mirror 91 and the concave mirror 92. In addition, the beam diameter of the pulse laser beam is increased through the three-time passing.

The amplified pulse laser beam is sampled by the monitor module 11A to measure the pulse energy actual value and the wavelength actual value. The laser control unit 13E controls the charging voltage of the charger 23 and the oscillation wavelength λa1 of the semiconductor laser so that the difference between each measured actual value and the corresponding one of the target pulse energy Et and the target wavelength λt becomes closer to zero. The pulse laser beam having transmitted through the beam splitter 11a of the monitor module 11A is incident on the laser processing device when the shutter 12 is opened.

In the present example, the amplifier 84 is a multipass amplifier but not limited thereto. For example, the amplifier 84 may be an amplifier including a Fabry-Perot resonator or a ring resonator described with reference to FIG. 32.

In the present example, the master oscillator 83 is a solid-state laser device, and the laser device 3E is composed of a combination of the solid-state laser device and the amplifier 84 that uses ArF laser gas as a laser medium. However, the amplifier 84 does not need to be provided, and the laser device may be composed of the master oscillator 83 as a solid-state laser device alone.

When the solid-state laser device is used alone as a wavelength-variable laser device, a laser beam does not need to be oscillated in an ArF laser amplification region, but may be oscillated in the wavelength range of 175 nm to 200 nm, in which absorption by oxygen occurs.

8. Modification of Solid-State Laser Device in Modification 2 of 7.2

Figure 34:
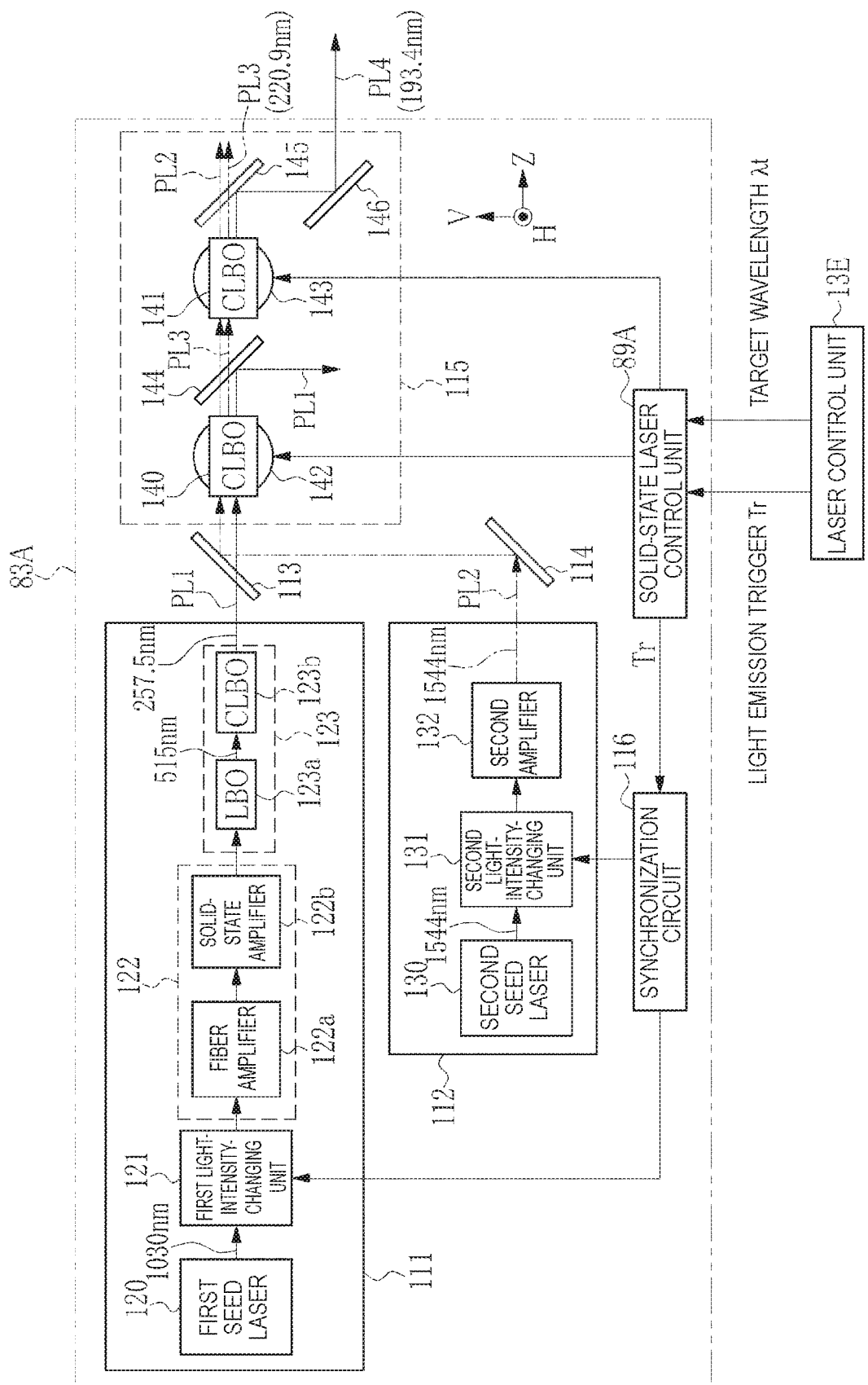
FIG. 34 is an explanatory diagram of a modification of a solid-state laser device in the laser device illustrated in FIG. 33.

A solid-state laser system 83A illustrated in FIG. 34 is a modification of the solid-state laser device provided as the master oscillator 83 in the laser device 3E illustrated in FIG. 33. The solid-state laser system 83A includes a first solid-state laser device 111, a second solid-state laser device 112, a dichroic mirror 113, a high reflectance mirror 114, a wavelength conversion system 115, a synchronization circuit 116, and a solid-state laser control unit 89A.

The first solid-state laser device 111 includes a first seed laser 120, a first light-intensity-changing unit 121, a first amplifier 122, and a wavelength conversion unit 123. The first amplifier 122 includes a fiber amplifier 122a, a solid-state amplifier 122b, and a CW excitation semiconductor laser (not illustrated). The wavelength conversion unit 123 includes an LBO ($LiB_3O_5$) crystal 123a and a CLBO ($CsLiB_6O_{10}$) crystal 123b. The LBO crystal 123a and the CLBO crystal 123b are nonlinear crystals.

The first seed laser 120 outputs, as a first seed beam, CW light or pulse beam of the single longitudinal mode having a wavelength of 1030 nm approximately. The first seed laser 120 is, for example, a distributed-feedback semiconductor laser. The first light-intensity-changing unit 121 includes a semiconductor element on which the first seed beam from the first seed laser 120 is incident. The first light-intensity-changing unit 121 converts the first seed beam into a laser beam having a predetermined pulse width through application of pulse current to the semiconductor element by a current control unit (not illustrated). Hereinafter, the first seed beam converted by the first light-intensity-changing unit 121 is referred to as a first seed pulse beam.

The fiber amplifier 122a is composed of a plurality of Yb-doped quartz fibers connected with each other in a multi-stage manner. The solid-state amplifier 122b is a Yb-doped YAG crystal. The fiber amplifier 122a and the solid-state amplifier 122b are optically excited by CW excitation light input from the CW excitation semiconductor laser (not illustrated). The first amplifier 122 amplifies the first seed pulse beam incident from the first light-intensity-changing unit 121.

The wavelength conversion unit 123 converts the first seed pulse beam amplified by the first amplifier 122 into harmonic, and outputs the converted light as a first pulse laser beam PL1. Specifically, since the wavelength conversion unit 123 includes the LBO crystal 123a and the CLBO crystal 123b, the wavelength conversion unit 123 generates the fourth harmonic having a wavelength of 257.5 nm approximately from the first seed pulse beam, and outputs the fourth harmonic as the first pulse laser beam PL1.

The second solid-state laser device 112 includes a second seed laser 130, a second light-intensity-changing unit 131, and a second amplifier 132. The second amplifier 132 includes an Er fiber amplifier (not illustrated) composed of a plurality of Er—Yb-doped quartz fibers connected with each other in a multi-stage manner, and a CW excitation semiconductor laser (not illustrated).

The second seed laser 130 outputs, as a second seed beam, CW light or pulse beam of the single longitudinal mode having a wavelength of 1554 nm approximately. The second seed laser 130 is, for example, a distributed-feedback semiconductor laser. The second light-intensity-changing unit 131 includes a semiconductor element on which the second seed beam from the second seed laser 130 is incident. The second light-intensity-changing unit 131 converts the second seed beam into a laser beam having a predetermined pulse width through application of pulse current to the semiconductor element by a current control unit (not illustrated). Hereinafter, the second seed beam converted by the second light-intensity-changing unit 131 is referred to as a second seed pulse beam.

The Er fiber amplifier included in the second amplifier 132 is optically excited by CW excitation light input from the CW excitation semiconductor laser (not illustrated). The second amplifier 132 amplifies the second seed pulse beam incident from the second light-intensity-changing unit 131. The second amplifier 132 outputs the amplified second seed pulse beam as a second pulse laser beam PL2.

The dichroic mirror 113 is disposed at a position where the first pulse laser beam PL1 output from the first solid-state laser device 111 is incident. The high reflectance mirror 114 is disposed to highly reflect the second pulse laser beam PL2 output from the second solid-state laser device 112 so that the highly reflected second pulse laser beam PL2 is incident on the dichroic mirror 113.

The dichroic mirror 113 is coated with a film that highly transmits the first pulse laser beam PL1 having a wavelength of 257.5 nm approximately and highly reflects the second pulse laser beam PL2 having a wavelength of 1554 nm approximately. The dichroic mirror 113 is disposed so that the optical path axis of the highly transmitted first pulse laser beam PL1 coincides with the optical path axis of the highly reflected second pulse laser beam PL2.

The wavelength conversion system 115 includes a first CLBO crystal 140, a second CLBO crystal 141, a first θ stage 142, a second θ stage 143, a first dichroic mirror 144, a second dichroic mirror 145, and a high reflectance mirror 146. The first CLBO crystal 140 and the second CLBO crystal 141 are nonlinear crystals.

The first CLBO crystal 140, the first dichroic mirror 144, the second CLBO crystal 141, and the second dichroic mirror 145 are disposed on the optical path of the first and second pulse laser beams PL1 and PL2 in the stated order. The first pulse laser beam PL1 and the second pulse laser beam PL2 are incident on the first CLBO crystal 140.

At the first CLBO crystal 140, the first pulse laser beam PL1 and the second pulse laser beam PL2 overlap with each other to generate a third pulse laser beam PL3 having a wavelength of 220.9 nm approximately corresponding to a sum frequency of the wavelength of 257.5 nm approximately and the wavelength of 1554 nm approximately. The first and second pulse laser beams PL1 and PL2 transmit through the first CLBO crystal 140.

The first dichroic mirror 144 is coated with a film that highly reflects the first pulse laser beam PL1 and highly transmits the second pulse laser beam PL2 and the third pulse laser beam PL3. The second and third pulse laser beams PL2 and PL3 having highly transmitted through the first dichroic mirror 144 are incident on the second CLBO crystal 141.

At the second CLBO crystal 141, the second pulse laser beam PL2 and the third pulse laser beam PL3 overlap with each other to generate a fourth pulse laser beam PL4 having a wavelength of 193.4 nm approximately corresponding to a sum frequency of the wavelength of 1554 nm approximately and the wavelength of 220.9 nm approximately. The second and third pulse laser beams PL2 and PL3 transmit through the second CLBO crystal 141.

The second dichroic mirror 145 is coated with a film that highly reflects the fourth pulse laser beam PL4 and highly transmits the second pulse laser beam PL2 and the third pulse laser beam PL3. The high reflectance mirror 146 is disposed at a position for highly reflecting the fourth pulse laser beam PL4 highly reflected by the second dichroic mirror 145 so that the fourth pulse laser beam PL4 is output from the wavelength conversion system 115.

The first CLBO crystal 140 is attached to the first θ stage 142 through a holder and held by the first θ stage 142. The first θ stage 142 rotates the first CLBO crystal 140 in a θ direction as the rotational direction about the H axis. The first θ stage 142 is rotated by, for example, a drive unit composed of a stepping motor (not illustrated).

The H axis, the V axis, and the Z axis are orthogonal to each other. The Z-axis direction is the direction of the optical path axis of the first and second pulse laser beams PL1 and PL2 incident on the wavelength conversion system 115.

The configurations of the second CLBO crystal 141 and the second θ stage 143 are same as those of the first CLBO crystal 140 and the first θ stage 142. The second θ stage 143 rotates the second CLBO crystal 141 in the θ direction.

The solid-state laser control unit 89A is electrically connected with the drive units of the first and second θ stages 142 and 143, and controls movement of the first and second θ stages 142 and 143. The solid-state laser control unit 89A is also electrically connected with the synchronization circuit 116. The synchronization circuit 116 is electrically connected with the first and second light-intensity-changing units 121 and 131. The synchronization circuit 116 controls the first and second light-intensity-changing units 121 and 131 based on the light emission trigger Tr input from the solid-state laser control unit 89A, and synchronizes the generation timings of the first and second seed pulse beams. The solid-state laser control unit 89A is also electrically connected, through a signal line (not illustrated), with each of the first and second seed lasers 120 and 130, and the CW excitation semiconductor lasers included in the first and second amplifiers 122 and 132.

The solid-state laser control unit 89A receives the light emission trigger Tr and the target wavelength λt from the laser processing control unit 32A included in a laser processing device (not illustrated) through the laser control unit 13E. The solid-state laser control unit 89A controls the first and second θ stages 142 and 143, the synchronization circuit 116, the first and second seed lasers 120 and 130, and the like based on the light emission trigger Tr and the target wavelength λt thus received.

The following describes the operation of the solid-state laser system 83A. When having received a laser oscillation preparation signal from the laser processing control unit 32A, the laser control unit 13E transmits the received laser oscillation preparation signal to the solid-state laser control unit 89A. The solid-state laser control unit 89A starts, based on the laser oscillation preparation signal, oscillation operation of the first and second seed lasers 120 and 130, and the CW excitation semiconductor lasers included in the first and second amplifiers 122 and 132.

Accordingly, the first seed beam is output from the first seed laser 120 and input to the first light-intensity-changing unit 121. Until a control signal to be described later is input to the first light-intensity-changing unit 121, amplification of the first seed beam is prevented by the first light-intensity-changing unit 121. Similarly, the second seed beam is output from the second seed laser 130 and input to the second light-intensity-changing unit 131. Until a control signal to be described later is input to the second light-intensity-changing unit 131, amplification of the second seed beam is prevented by the second light-intensity-changing unit 131. The first and second amplifiers 122 and 132 are each optically excited by the CW excitation light input from the CW excitation semiconductor laser (not illustrated).

When having received the light emission trigger Tr from the laser processing control unit 32A through the laser control unit 13E, the solid-state laser control unit 89A transmits the light emission trigger Tr to the synchronization circuit 116. Having received the light emission trigger Tr, the synchronization circuit 116 transmits a control signal to each of the first and second light-intensity-changing units 121 and 131. Having received the control signal, the first light-intensity-changing unit 121 generates the first seed pulse beam having a predetermined pulse width by amplifying the first seed beam for a predetermined duration, and emits the first seed pulse beam onto the first amplifier 122. Similarly, having received the control signal, the second light-intensity-changing unit 131 generates the second seed pulse beam having a predetermined pulse width by amplifying the second seed beam for a predetermined duration, and emits the second seed pulse beam onto the second amplifier 132.

Having been incident on the first and second amplifiers 122 and 132, respectively, the first and second seed pulse beams are amplified through stimulated emission. The first seed pulse beam amplified by the first amplifier 122 is incident on the wavelength conversion unit 123. The first seed pulse beam incident on the wavelength conversion unit 123 is converted into the fourth harmonic and output from the first solid-state laser device 111 as the first pulse laser beam PL1. The second seed pulse beam amplified by the second amplifier 132 is output from the second solid-state laser device 112 as the second pulse laser beam PL2.

The first pulse laser beam PL1 output from the first solid-state laser device 111 highly transmits through the dichroic mirror 113 and is incident on the wavelength conversion system 115. The second pulse laser beam PL2 output from the second solid-state laser device 112 is highly reflected by the high reflectance mirror 114 and the dichroic mirror 113 and incident on the wavelength conversion system 115.

The synchronization circuit 116 adjusts the input timings of the control signals to the first and second light-intensity-changing units 121 and 131 so that the first and second pulse laser beams PL1 and PL2 incident on the wavelength conversion system 115 are substantially simultaneously incident on the first CLBO crystal 140.

The first and second pulse laser beams PL1 and PL2 overlap with each other on the first CLBO crystal 140 to generate the third pulse laser beam PL3 as a sum frequency light of the beams. The first pulse laser beam PL1 having transmitted through the first CLBO crystal 140 is highly reflected by the first dichroic mirror 144. The second pulse laser beam PL2 having transmitted through the first CLBO crystal 140 and the third pulse laser beam PL3 highly transmit through the first dichroic mirror 144 and are incident on the second CLBO crystal 141.

The second and third pulse laser beams PL2 and PL3 overlap with each other on the second CLBO crystal 141 to generate the fourth pulse laser beam PL4 as a sum frequency light of the beams. The second and third pulse laser beams PL2 and PL3 having transmitted through the second CLBO crystal 141 highly transmit through the second dichroic mirror 145. The fourth pulse laser beam PL4 is highly reflected by the second dichroic mirror 145 and then the high reflectance mirror 146, and output from the wavelength conversion system 115.

The fourth pulse laser beam PL4 output from the wavelength conversion system 115 is output from the solid-state laser system 83A. In the present example, since the solid-state laser system 83A is a modification of the solid-state laser device as the master oscillator 83 illustrated in FIG. 33, the pulse laser beam PL4 output from the solid-state laser system 83A is input to the amplifier 84 illustrated in FIG. 33. Then, the pulse laser beam PL4 is amplified by the amplifier 84, passes through the monitor module 11A and the shutter 12, and is input to the laser processing device 4A illustrated in FIG. 5, for example. The pulse laser beam PL4 input to the laser processing device 4A is used in the laser processing.

The solid-state laser control unit 89A transmits the light emission trigger Tr to the synchronization circuit 116 at each reception of the light emission trigger Tr through the laser processing control unit 32A and the laser control unit 13E. Accordingly, the outputting of the fourth pulse laser beam PL4 from the solid-state laser system 83A is repeatedly performed.

The solid-state laser control unit 89A changes the oscillation wavelength of the first seed laser 120 or the second seed laser 130 in accordance with the target wavelength λt received through the laser processing control unit 32A and the laser control unit 13E. In addition, the solid-state laser control unit 89A rotates the first and second θ stages 142 and 143 in the θ direction in accordance with the target wavelength λt. Specifically, the solid-state laser control unit 89A rotates the first and second CLBO crystals 140 and 141 in the θ direction so that the incident angle of a laser beam incident on each of the first and second CLBO crystals 140 and 141 is equal to a phase matching angle corresponding to the target wavelength λt. Accordingly, when the target wavelength λt is changed, the incident angle of the laser beam is always equal to the phase matching angle, and thus sum frequency light having high intensity is generated at the first and second CLBO crystals 140 and 141.

The above description is intended to provide not restriction but examples. Thus, the skilled person in the art would clearly understand that the embodiments of the present disclosure may be changed without departing from the scope of the claims.

Terms used throughout the present specification and the claims should be understood as non-limiting terms. For example, it should be understood that the terms "include" and "included" mean that "the present invention is not limited to a subject described as being included". It should be understood that the term "have" means that "the present invention is not limited to a subject described as being had". It should be understood that the indefinite article "a (an)" in the present specification and the claims means "at least one" or "one or more".

What is claimed is:

1. A laser processing system configured to perform laser processing by irradiating a workpiece with a laser beam, the laser processing system comprising:
    A. a wavelength-variable laser device configured to output each of a laser beam at an absorption line as a wavelength at which light is absorbed by oxygen and a laser beam at a non-absorption line as a wavelength at which an amount of light absorption by oxygen is smaller than at the absorption line;
    B. an optical system configured to irradiate the workpiece with the laser beam; and
    C. a laser control unit configured to control the wavelength-variable laser device, set a wavelength of the laser beam output from the wavelength-variable laser device to be the non-absorption line when the laser processing is performed on a surface of the workpiece in gas containing oxygen, and set the wavelength of the laser beam output from the wavelength-variable laser device to be the absorption line when ozone cleaning is performed on the surface of the workpiece in gas containing oxygen.

2. The laser processing system according to claim 1, wherein the ozone cleaning includes debris cleaning of removing debris from the surface of the workpiece after the laser processing.

3. The laser processing system according to claim 2, wherein the ozone cleaning further includes surface cleaning of removing an adhering object on the surface of the workpiece before the laser processing.

4. The laser processing system according to claim 1, wherein the laser beam is an ArF excimer laser beam.

5. The laser processing system according to claim 1, further comprising:
    D: an irradiation-area-changing mechanism configured to change irradiation area of the laser beam emitted from the optical system on the surface of the workpiece; and
    E: a laser processing control unit configured to control the irradiation-area-changing mechanism so that the irradiation area in the ozone cleaning is larger than the irradiation area in the laser processing.

6. The laser processing system according to claim 1, wherein the wavelength-variable laser device includes a master oscillator, and an amplifier configured to amplify the laser beam output from the master oscillator.

7. The laser processing system according to claim 1, wherein the laser control unit changes energy of the laser beam between the laser processing and the ozone cleaning.

8. The laser processing system according to claim 1, further comprising:
    F: an attenuator configured to change the energy of the laser beam by changing transmittance for the laser beam output from the wavelength-variable laser device.

9. The laser processing system according to claim 1, further comprising:
    G: a shield enclosing the workpiece; and
    H: a gas supply inlet through which the gas containing oxygen is supplied inside the shield.

10. The laser processing system according to claim 9, further comprising:
   I: an exhaust device configured to exhaust gas inside the shield by suction.

\* \* \* \* \*